United States Patent
Gresh et al.

(10) Patent No.: US 12,442,478 B2
(45) Date of Patent: Oct. 14, 2025

(54) PIPE ISOLATION DEVICE WITH SEAL

(71) Applicant: Team Industrial Services, Inc., Sugar Land, TX (US)

(72) Inventors: Brian Michael Gresh, Sugar Land, TX (US); David Benjamin Aldren, Sugar Land, TX (US)

(73) Assignee: Team Industrial Services, Inc., Sugar Land, TX (US)

( * ) Notice: Subject to any disclaimer, the term of this patent is extended or adjusted under 35 U.S.C. 154(b) by 643 days.

(21) Appl. No.: 17/784,943

(22) PCT Filed: Dec. 16, 2020

(86) PCT No.: PCT/US2020/065221
§ 371 (c)(1),
(2) Date: Jun. 13, 2022

(87) PCT Pub. No.: WO2021/126913
PCT Pub. Date: Jun. 24, 2021

(65) Prior Publication Data
US 2023/0022125 A1    Jan. 26, 2023

Related U.S. Application Data

(60) Provisional application No. 62/949,089, filed on Dec. 17, 2019.

(51) Int. Cl.
*F16L 55/105*    (2006.01)

(52) U.S. Cl.
CPC .................................. *F16L 55/105* (2013.01)

(58) Field of Classification Search
CPC ...... B66F 13/005; F16H 21/44; F16H 25/183; F16K 1/08; F16K 3/182; F16K 3/184;
(Continued)

(56) References Cited

U.S. PATENT DOCUMENTS 762,436 A * 6/1904 Osgood .................. F16K 3/186
                                                              251/195
791,173 A * 5/1905 Anglim .................. F16K 3/186
                                                              251/167
(Continued)

FOREIGN PATENT DOCUMENTS

EP    2543425 B1    3/2015
GB    1340431 A * 12/1973 ............ F16L 55/105
(Continued)

OTHER PUBLICATIONS

International Search Report and Written Opinion in related Application PCT/US2020/065221 dated Mar. 12, 2021.
(Continued)

*Primary Examiner* — Kenneth Rinehart
*Assistant Examiner* — Richard K. Durden
(74) *Attorney, Agent, or Firm* — Patterson + Sheridan, LLP

(57) ABSTRACT

A pipe isolation device and method of using the same. The pipe isolation device includes a control bar head, a first sealing head, and a second sealing head. The first sealing head has a first seal element and a first sliding engagement. The first sliding engagement permits the first sealing head to slide relative to the control bar head along a first fixed path and traverse a right angle to gain access to an interior space of a pipe. The second sealing head has a second seal element and a second sliding engagement. The second sliding engagement permits the second sliding head to slide relative to the first sealing head along a second fixed path and traverse the right angle to gain access to an interior space of the pipe. A first seal element and a second seal element are disposed on the sealing heads and have axially-offset configurations.

23 Claims, 33 Drawing Sheets

(58) Field of Classification Search
CPC ......... F16K 3/186; F16K 3/312; F16L 41/06; F16L 55/10; F16L 55/1018; F16L 55/105; F16L 55/11; F16L 55/124; F16L 55/128; F16L 55/1283; F16L 55/132; F16L 55/136; F16L 55/179; F16L 55/265; G05G 7/02; G05G 15/08
USPC ..... 74/110; 138/92, 94, 94.3, 94.5; 251/158, 251/203, 204; 254/104; 403/75, 80, 403/109.5
See application file for complete search history.

(56) References Cited

U.S. PATENT DOCUMENTS

| | | | |
|---|---|---|---|
| 936,454 A * | 10/1909 | Jefferson | F16K 3/186 251/167 |
| 1,000,617 A * | 8/1911 | Messer | F16K 51/02 251/158 |
| 1,686,057 A * | 10/1928 | Williston | F16K 3/186 251/158 |
| 1,985,078 A * | 12/1934 | Collison | F16K 3/186 251/158 |
| 2,328,661 A * | 9/1943 | Maloney | E21C 37/04 299/23 |
| 2,600,115 A * | 6/1952 | Kliewer, Sr. | F16K 3/186 251/167 |
| 2,906,295 A * | 9/1959 | Ver Nooy | F16L 55/105 138/94 |
| 3,025,885 A * | 3/1962 | Ver Nooy | F16L 55/105 138/94 |
| 4,682,631 A | 7/1987 | Wilger et al. | |
| 5,730,444 A | 3/1998 | Notter | |
| 5,797,603 A | 8/1998 | Voirol et al. | |
| 6,074,184 A | 6/2000 | Imai | |
| 6,289,935 B1 * | 9/2001 | Tash | F16L 55/124 138/97 |
| 6,659,133 B2 | 12/2003 | Russell | |
| 7,416,164 B2 | 8/2008 | Eggleston et al. | |
| 7,766,047 B1 | 8/2010 | Garrison et al. | |
| 7,841,364 B2 | 11/2010 | Yeazel et al. | |
| 7,849,882 B1 | 12/2010 | Lee et al. | |
| 8,307,856 B2 | 11/2012 | Yeazel et al. | |
| 8,404,029 B2 | 3/2013 | Lundgren et al. | |
| 9,494,245 B1 | 11/2016 | Tinholt | |
| 11,603,956 B2 * | 3/2023 | Gresh | F16L 55/105 |
| 2002/0106247 A1 * | 8/2002 | Russell | F16L 55/124 137/317 |
| 2006/0243326 A1 | 11/2006 | Calkins et al. | |
| 2009/0114302 A1 * | 5/2009 | Yeazel | F16L 55/124 138/91 |
| 2014/0283926 A1 * | 9/2014 | Duell | F16L 1/221 137/315.42 |
| 2017/0284521 A1 * | 10/2017 | Sorimoto | B29C 45/332 |
| 2019/0390814 A1 * | 12/2019 | McKone | F16K 7/20 |
| 2021/0325004 A1 * | 10/2021 | Gresh | F16L 55/105 |

FOREIGN PATENT DOCUMENTS

| | | | | |
|---|---|---|---|---|
| KR | 20110128057 A | * | 11/2011 | ......... F16L 55/1604 |
| WO | 2002063196 A2 | | 8/2002 | |
| WO | 2020047265 A1 | | 3/2020 | |

OTHER PUBLICATIONS

European Office Action dated Dec. 8, 2023 for Application No. 20902764.8.

* cited by examiner

PIPE ISOLATION DEVICE WITH SEAL

CROSS-REFERENCE TO RELATED APPLICATION

The present document is based on and claims priority to U.S. Provisional Application Ser. No. 62/949,089, filed Dec. 17, 2019, which is incorporated herein by reference in its entirety.

FIELD OF DISCLOSURE

In general, the disclosure describes a pipe isolation device for use in pipes. The pipe isolation device may be used in pipelines carrying fluids such as pressurized fluids, high or low temperature fluids, steam, or hazardous fluids.

BACKGROUND OF DISCLOSURE

When performing pipeline maintenance or servicing, such as during hot tapping procedures, it is necessary to provide isolation of a "live" section of pipe. One such technique is using a "double isolation-and-bleed" apparatus, also referred to as a double block-and-bleed apparatus. As the term double isolation-and-bleed is known in the art, it refers to the setting of two seals in a pipe with a bleed port located therebetween. If fluid leaks past the first seal, it is contained by the second seal and forced to exit the pipe through the bleed port. The double isolation-and-bleed pipe isolation devices known in the industry generally comprise a series of pivoting arms. Due to the challenging environment, the pivoting arms represent points of potential failure. Another technique is using a pipe isolation device having a single sealing head having a pivoting arm to provide isolation of a "live" section of pipe.

What is needed is an improved, simplified, pipe isolation device that can accommodate a wide range of pipe sizes and thicknesses, as well as a wide range of pressurized fluids.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limiting the scope of the claimed subject matter.

An embodiment of the present disclosure provides a pipe isolation device including a control bar head and a first sealing head. The first sealing head has a first seal element and a first sliding engagement. The first sliding engagement permits the first sealing head to slide relative to the control bar head along a first fixed path and traverse at an angle, e.g. a right angle, to gain access to an interior space of a pipe. The pipe isolation device further includes a second sealing head having a second seal element and a second sliding engagement. The second sliding engagement permits the second sliding head to slide relative to the first sealing head along a second fixed path and traverse the angle (e.g. the right angle) to gain access to an interior space of the pipe. A first seal element is disposed on the first sealing head and the first sealing element has a first axially-offset configuration. A second seal element is disposed on the second sealing head and the second sealing element has a second axially-offset configuration.

Another embodiment of the present disclosure provides a method of isolating a pipe including conveying a first sealing head and a second sealing head in a fully retracted position through a lateral access opening in the pipe. The first sealing head is slidably connected to a control bar head and the second sealing head is slidably connected to the first sealing head. The method further includes sliding the first sealing head along a first sliding engagement and sliding the second sealing head along a second sliding engagement to a fully set position as the control bar head continues its travel through the lateral access opening. The first sealing head and the second sealing head each form a seal in the pipe in the fully set position. The method further includes locking the first sealing head and the second sealing head in the fully retracted position with a locking mechanism in a locked state as the first sealing head and the second sealing head travel through the lateral access opening. The method further includes releasing the locking mechanism from the locked state to the unlocked state in response to an applied force as the control bar head is conveyed through the lateral access opening so as to permit the first sliding head and the second sliding head to move to the fully set position. A first seal element is disposed on the first sealing head and the first sealing element has a first axially-offset configuration. A second seal element is disposed on the second sealing head and the second sealing element has a second axially-offset configuration.

Another embodiment of the present disclosure provides a pipe isolation device including a control bar head, a first sealing head, and a second sealing head. The first sealing head and the second sealing head are positionable between a fully retracted position and a fully set position. The first sealing head and the second sealing head have an in-line orientation with the control bar head in the fully retracted position and have a linear orientation with one another in a direction transverse to the control bar head when in the fully set position. The pipe isolation device further includes a first sliding engagement slidably connecting the first sealing head to the control bar head, and a second sliding engagement slidably connecting the second sealing head to the first sealing head. The first sliding engagement and the second sliding engagement are configured to slide the first sealing head and the second sealing head from the fully retracted position to the fully set position during a linear travel of the control bar head. A first seal element is disposed on the first sealing head and the first sealing element has a first axially-offset configuration.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
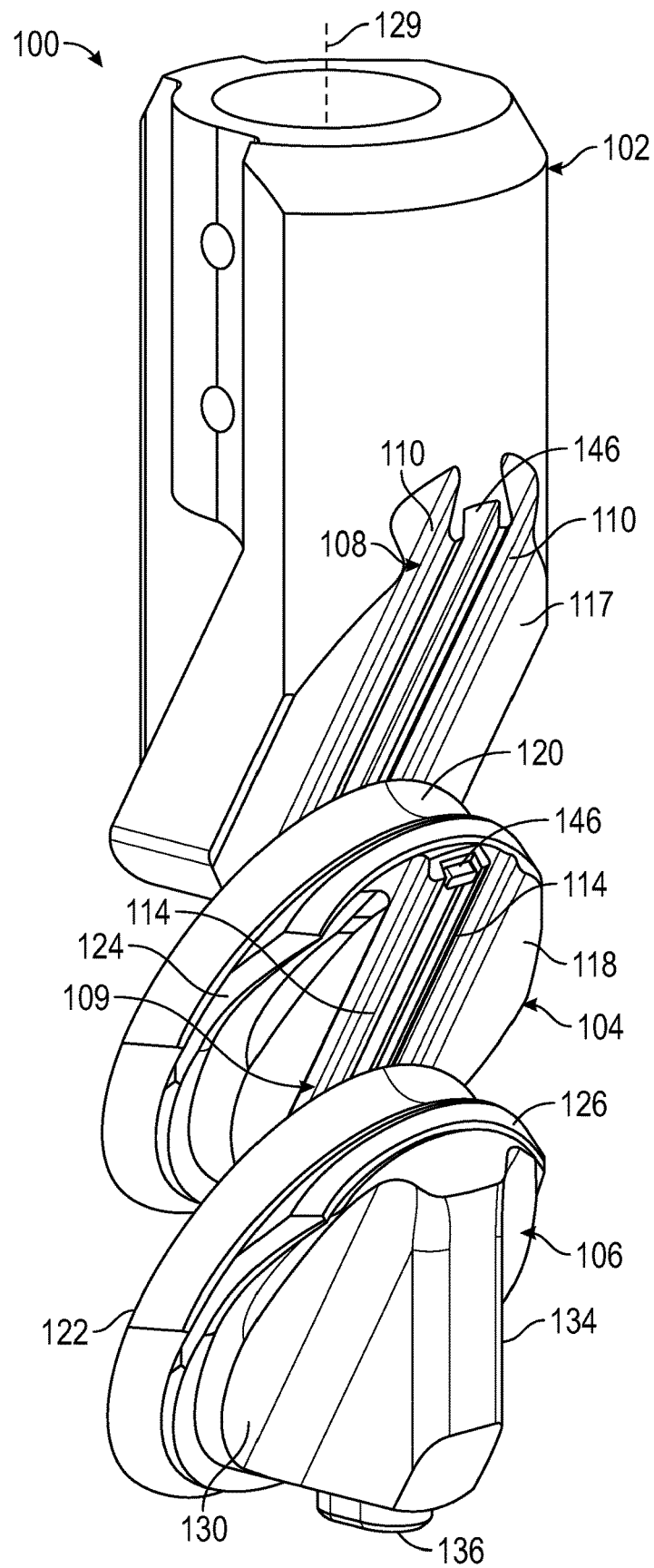
FIG. 1 is a perspective view of a pipe isolation device in a fully retracted position in accordance with embodiments of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

The present disclosure generally relates to achieving at least one seal in a pipe. Embodiments may have multiple seals in a pipe with a depressurized zone between the seals. This increases the safety of plugging a pipe by having a back-up seal and allows for any leakage past the primary seal to be vented out the bleed port. Some embodiments of the pipe isolation device of the present disclosure achieve the multiple seals through one branch opening in the pipe so that it reduces the amount of equipment involved in safely sealing or isolating the pipe.

Embodiments of the pipe isolation device of the present disclosure may be a tool that has a first sealing head and a second sealing head and provides a means to achieve two (or more) seals inside a pipe between the sealing heads. The pressure in the space between the two seals can be bled so that one seal is a primary seal and the other is a secondary backup seal. The tool is set by traveling through a tapped hole forming a lateral access opening inside a fitting branch on the pipe and product flow can continue through this fitting if a bypass line is set up. The pipe isolation device is configured to traverse at an angle, e.g. a right angle, as the pipe isolation device moves through the lateral access opening. The pipe isolation device uses sliding engagements to move the sealing heads of the pipe isolation device forward in the pipe to position the sealing heads in an aligned orientation with one another within the pipe and along an axis of the pipe. In other words, the sealing heads enter the pipe through the lateral access opening along a first axis and then are shifted/traversed through an angle and into alignment along a second axis which is transverse, e.g. perpendicular, to the first axis. The sealing heads can be considered as being concentric in the sense that they are both aligned along the second axis when shifted to the inserted, set position.

Referring to FIGS. 1-4, an embodiment of the pipe isolation device, referenced generally as 100, of the present disclosure is shown. Pipe isolation device 100 comprises a control bar head 102, a first sealing head 104, and a second sealing head 106. Sealing heads 104, 106 may each have a disk shape. Sealing heads 104, 106 may slide relative to each other, and the first sealing head 104 may slide relative to the control bar head 102 to position the pipe isolation device 100 between a fully retracted position shown in FIG. 1 to a fully set position shown in FIG. 2.

Figure 2:
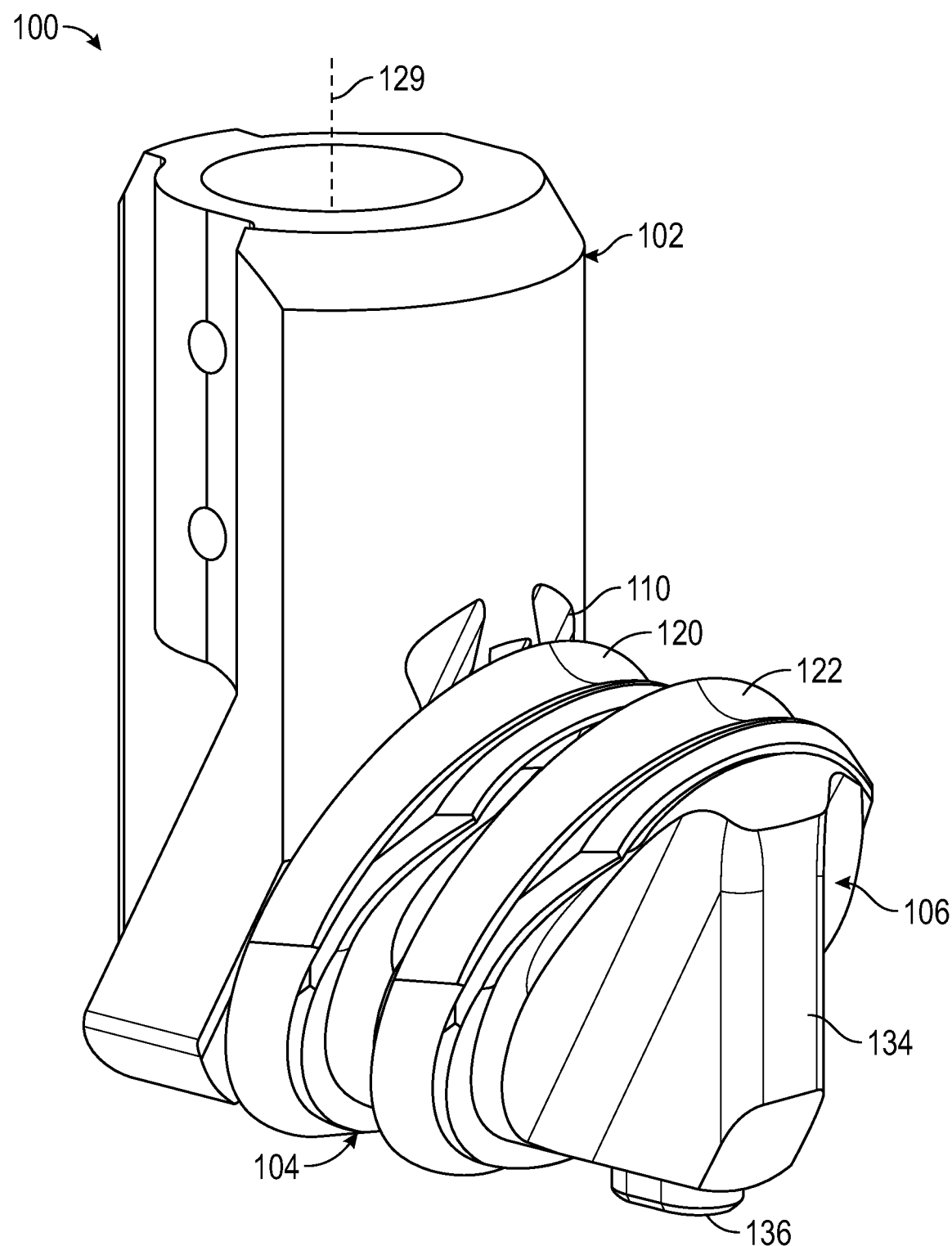
FIG. 2 is a perspective view of the pipe isolation device in a fully set position in accordance with embodiments of the present disclosure.

Control bar head 102 may be attached to a control bar of an actuator (not shown), e.g. a hydraulically powered actuator, and the pipe isolation device 100 may be translated through a fitting branch of a pipe in the fully retracted position, shown in FIG. 1, and moved in the pipe to the fully set position, shown in FIG. 2. Control bar head 102 is a carrier for the sealing heads 104, 106 and is used to convey the sealing heads 104, 106.

Figure 4:
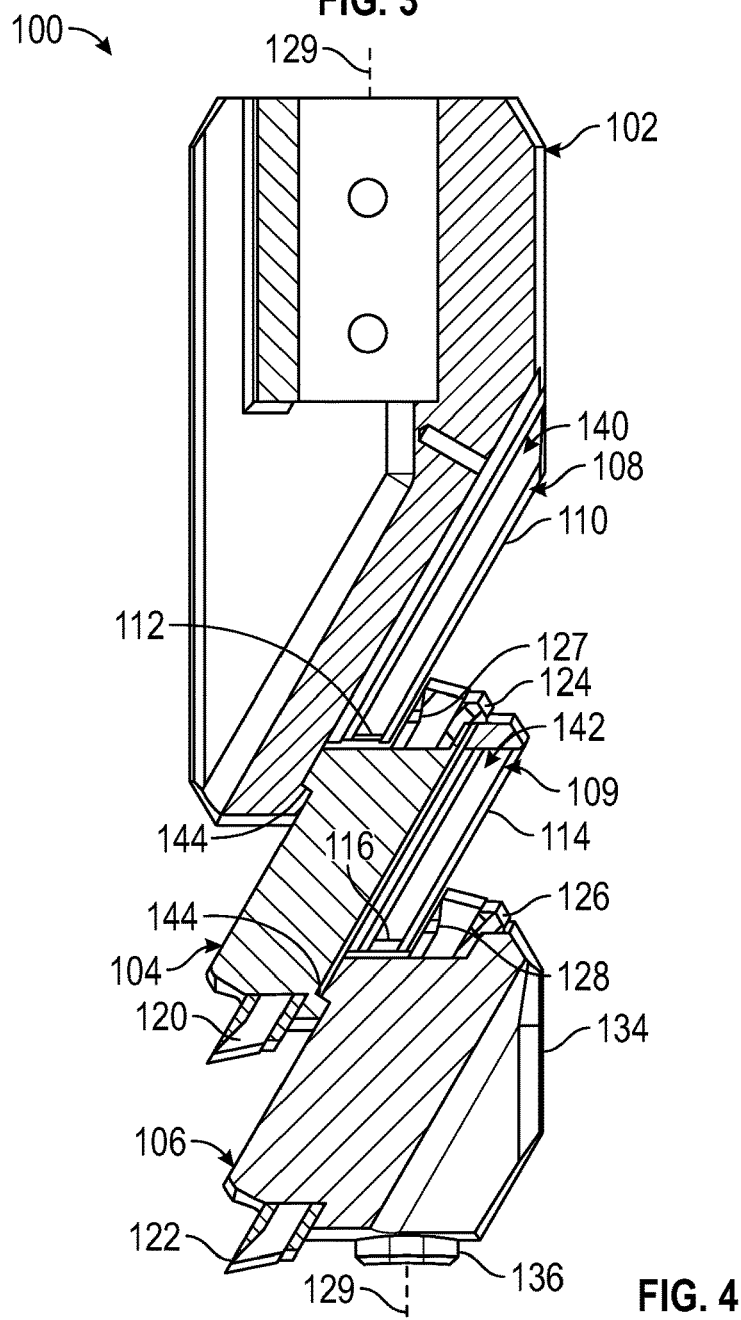
FIG. 4 is a cross-sectional view taken along line 4-4 in FIG. 3.

Pipe isolation device 100 further includes a first sliding engagement 108 for providing a slidable engagement connection between the control bar head 102 and the first sealing head 104, and a second sliding engagement 109 for providing a slidable engagement connection between the first sealing head 104 and the second sealing head 106, see FIG. 1 and FIG. 4. First sliding engagement 108 may be formed by a pair of first guide tracks 110, see FIG. 1 and FIG. 4, attached to a side of the control bar head 102 and the first guide members 112, see FIG. 4, attached to a first side of the first sealing head 104. Each of the first guide members 112 is interconnected with one of the first guide tracks 110, as shown in FIG. 4, to provide for sliding engagement between the control bar head 102 and the first sealing head 104. First guide tracks 110 extend along a control bar surface 117. Control bar surface 117 is at an acute angle with respect to a vertical axis 129 extending through a center of the control bar head 102.

In another embodiment, the first sliding engagement 108 may be formed by one first guide track 110 and one first guide member 112 interconnected with one another to form a sliding engagement. In another embodiment, more than two first guide tracks 110 and first guide members 112 may be used to form the first sliding engagement 108 interconnecting the control bar head 102 and the first sealing head 104. In another embodiment, one or more first guide tracks 110 may be attached to the first sealing head 104, and one or more first guide members 112 may be attached to the control bar head 102 to form the first sliding engagement 108 between the control bar head 102 and the first sealing head 104.

Second sliding engagement 109 may be formed by a pair of second guide tracks 114 and second guide members 116, see FIG. 1 and FIG. 4. Second guide tracks 114 are attached to a second side of the first sealing head 104 and second guide members 116 are attached to an opposing first side of the second sealing head 106. Each of the second guide members 116 is interconnected with one of the second guide tracks 114, see FIG. 4 and FIG. 9, to provide for sliding engagement between the first sealing head 104 and the second sealing head 106. Second guide tracks 114 extend along an outer surface 118 of the first sealing head 104, and second guide members 116 extend along an inner surface of the second sealing head 106 that opposes the outer surface 118 of the first sealing head 104. Outer surface 118 is at an acute angle with respect to the vertical axis 129.

In another embodiment, the second sliding engagement 109 may be formed by one second guide track 114 and one second guide member 116 interconnected with one another. In another embodiment, more than two second guide tracks 114 and second guide members 116 may be used to form the second sliding engagement 109 interconnecting the sealing heads 104, 106. In another embodiment, one or more second guide tracks 110 may be attached to the second sealing head 106 and one or more second guide members 116 may be attached to the first sealing head 104 to form the second sliding engagement 109 between the sealing heads 104, 106.

First sealing head 104 has a first seal element 120 and the second sealing head 106 has a second seal element 122, see FIGS. 1-2. First seal element 120 extends around a main body of the first sealing head 104 and the second seal element 122 extends around a main body of the second sealing head 106 to form circumferential seal elements. Seal elements 120, 122 may be made from elastomeric materials. First seal element 120 is disposed along a first outer perimeter of the first sealing head 104 to form the first circumferential seal element. Second seal element 122 is disposed along a second outer perimeter of the second sealing head 106 to form the second circumferential seal element. A first nose ring 124 may be positioned adjacent to the first seal element 120, and a second nose ring 126 may be positioned adjacent to the second seal element 122. A first retaining ring 127 may be positioned adjacent to the first seal element 120, and a second retaining ring 128 may be positioned adjacent to the second seal element 122, see FIG. 4.

In the embodiment illustrated, first seal element 120 is disposed between the first nose ring 124 and the first retaining ring 127, and the second seal element 122 is disposed between the second nose ring 126 and the second retaining ring 128. Nose rings 124, 126 and retaining rings 127, 128 provide support to the seal elements 120, 122 and prevent the seal elements 120, 122 from extruding when under pressure.

Second sealing head 106 may have an outer surface 130 with a nose element 134 extending outwardly therefrom. One or more pads 136 may be attached to the sealing heads 104, 106. Pads 136 may be made of brass, iron, polymer or other material that allows for sliding of the sealing heads 104, 106. In the embodiment of pipe isolation device 100 shown in FIGS. 1-4, a pad 136 is attached to a bottom section of the nose element 134. Sliding engagements 108, 109 are configured so that the pad 136 slide along a pipe ID as the pipe isolation device 100 is translated through the fitting branch of the pipe from the fully retracted position, shown in FIG. 1, to the fully set position, shown in FIG. 2. Pads 136 may be referred to as a skid element or nose pad. Pad 136 positions the sealing heads 104, 106 linearly along an axis of the pipe and slides along the bottom of the pipe as the pipe isolation device 100 moves to the fully set position. The axis of the pipe is transverse, e.g. perpendicular, to the vertical axis 129. As the pipe isolation device 100 moves from the fully retracted position to the fully set position, the sealing heads 104, 106 move outwardly away from the vertical axis 129 that extends through the control bar head 102.

Figure 3:
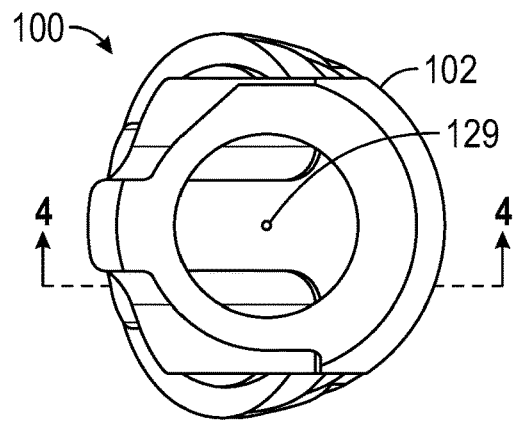
FIG. 3 is a top view of the pipe isolation device in the fully retracted position in accordance with embodiments of the present disclosure.

Referring to FIG. 3, a top view of an embodiment of the pipe isolation device 100 in a fully retracted position is shown. FIG. 4 shows a cross-section at section lines 4-4 of the pipe isolation device 100 shown in FIG. 3. In the example illustrated, sealing heads 104, 106 are oriented in-line with the control bar head 102 when in the fully retracted position. Vertical axis 129 extends through the sealing heads 104, 106 and through the center of the control bar head 102 and illustrates that the sealing heads 104, 106 and the control bar head 102 are oriented in-line with one another when in the fully retracted position.

With reference to FIG. 4, one of the first guide tracks 110 is shown with one of the first guide members 112 interlocked in the first guide track 110, and one of the second guide tracks 114 is shown with one of the second guide members 116 interlocked in the second guide track 114. Each first guide track 110 includes a first track slot 140 that is elongated and formed by interior walls of the elongated, first guide track 110. First track slots 140 may have a dovetail shape, T-shape, C-shape, or other shape where the first guide members 112 have a corresponding dovetail shape, T-shape, C-shape, or other shape corresponding to the track slots 140 and the first guide members 112 are retained in the first track slots 140.

First guide tracks 110 and the first guide members 112 define a first fixed path for the first sealing head 104. First sliding engagement 108 is configured to permit the first sealing head 104 to move along the first fixed path between the first retracted position and the first set position. First sealing head 104 moves along the first fixed path with each of the first guide members 112 engaged with one of the first guide tracks 110 and moving in the first track slots 140 so that the first sealing head 104 moves from a first retracted position, shown in FIG. 1, to a first set position, shown in FIG. 2.

First guide tracks 110 are oriented at an acute angle with respect to the vertical axis 129 of the control bar head 102, and the first sealing head 104 moves outwardly with respect to the vertical axis 129 as the first sealing head 104 moves from the first retracted position, shown in FIG. 1, to the first set position, shown in FIG. 2. This outward movement of the first sealing head 104 with respect to the vertical axis 129 as the first sealing head 104 moves from the first retracted position to the first set position allows the first sealing head 104 to traverse the right angle between a pipe inlet and a pipe.

Each second guide track 114 includes a second track slot 142 that is elongated and formed by interior walls of the elongated, second guide track 114. Second track slots 142 may have a dovetail shape, T-shape, C-shape, or other shape. Second guide members 116 have a corresponding dovetail shape, T-shape, C-shape, or other shape corresponding to track slots 140 and are retained in the second track slots 142. In some embodiments, guide members 112, 116 may include at least one load bearing roller engageable within guide tracks 110, 114 to form the sliding engagements 108, 109.

Second guide tracks 114 and second guide members 116 define a second fixed path for the second sealing head 106. Second sliding engagement 109 is configured to permit the second sealing head 106 to move along the second fixed path between the second retracted position and the second set position. Second sealing head 106 moves along the second fixed path with each of the second guide member 116 engaged with one of the second guide tracks 114 and moving in the second track slot 142 so that the second sealing head 106 moves from the second retracted position, shown in FIG. 1, to the second set position, shown in FIG. 2.

Second guide tracks 114 are oriented at an acute angle with respect to the vertical axis 129 of the control bar head 102 and the second sealing head 106 moves outwardly from the vertical axis 129 as the second sealing head 106 moves from the fully retracted position, shown in FIG. 1, to the fully set position, shown in FIG. 2. This outward movement of the second sealing head 106 with respect to the vertical axis 129 as the second sealing head 106 moves from the second retracted position to the second set position allows the second sealing head 106 to traverse the right angle between a pipe inlet and a pipe. First guide tracks 110 and the second guide tracks 114 are parallel in the embodiment shown in FIG. 4.

Guide tracks 110, 114 each include a first track stop 144, that prevents the sealing heads 104, 106 from traveling downwards in the guide tracks 110, 114 when the pipe isolation device 110 is in the fully retracted position, shown in FIG. 4. First track stops 144 block sealing heads 104, 106 from moving downwards in the guide tracks 110, 114 and falling off a bottom end of the guide tracks 110, 114. As shown in the embodiment of FIG. 4, one of the first track stops 144 is located at a bottom section of each of the guide tracks 110, 114 to position the sealing heads 104, 106 in the fully retracted position.

Guide tracks 110, 114 may each include a second track stop 146, as shown in FIG. 1, disposed at a top section of the guide tracks 110, 114. Second track stops 146 may be in the form of a stop block, as shown in FIG. 1. Second track stops 146 block sealing heads 104, 106 from moving upwards in the guide tracks 110, 114. Track stops 144, 146 retain the sealing heads 104, 106 within a selected section of the guide tracks 110, 114. Track stops 146 position the sealing heads 104, 106 in line with one another in the fully set position and prevent the sealing heads 104, 106 from travelling beyond and falling off a top end of the guide tracks 110, 114.

Figure 5:
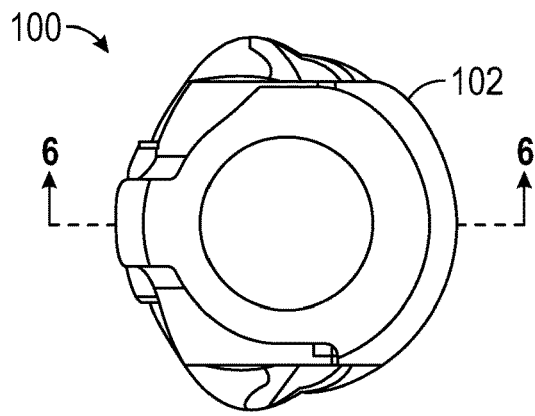
FIG. 5 is a top view of the pipe isolation device in the fully retracted position in accordance with embodiments of the present disclosure.
Figure 6:
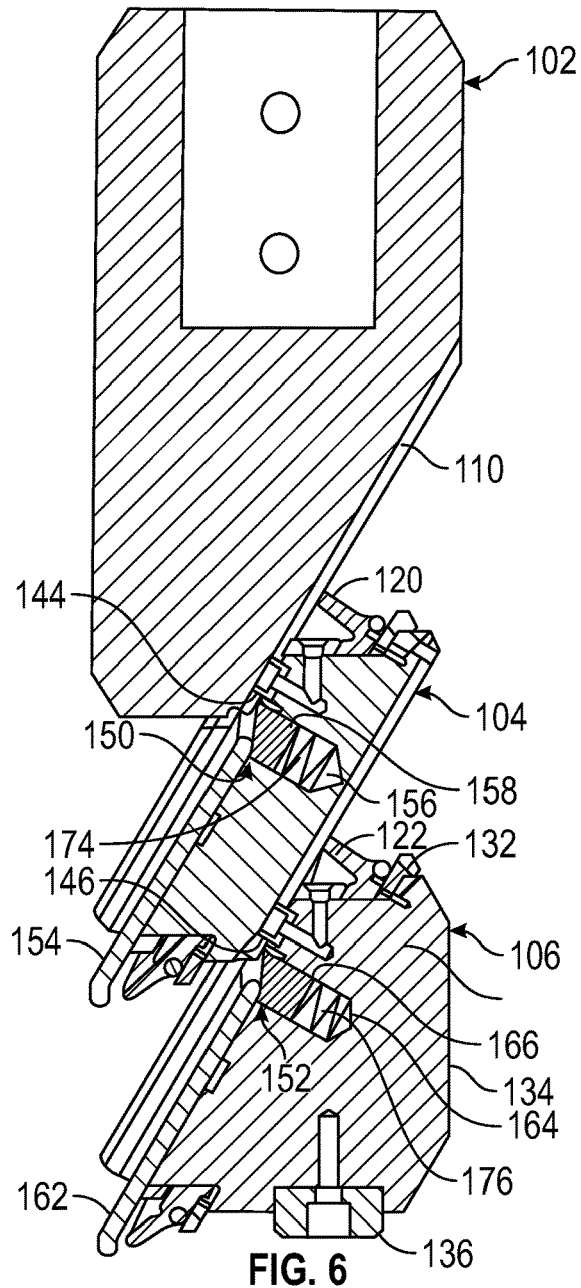
FIG. 6 is a cross-sectional view taken along line 6-6 in FIG. 5.

FIG. 5 shows a top view of an embodiment of the pipe isolation device 100 in a fully retracted position. FIG. 6 shows a cross-section at section lines 6-6 of the pipe isolation device 100 shown in FIG. 5. Referring to FIG. 6, an embodiment is shown of a locking mechanism including a first locking mechanism 150 for temporarily locking the first sealing head 104 in the first retracted position and a second locking mechanism 152 for temporarily locking the second sealing head 106 in the second retracted position. The locking mechanisms 150, 152 lock the sealing heads 104, 106 in the fully retracted position with the locking mechanisms 150, 152 in a locked state as the sealing heads 104, 106 travel through a lateral access opening of a pipe. The locking mechanisms 150, 152 release from the locked state to an unlocked state in response to an applied force as the control bar head 102 is conveyed through the lateral access opening. The locking mechanisms 150, 152 in the unlocked state permit the first sliding head 104 and the second sliding head 106 to move to the fully set position. The overall locking mechanism may be configured to lock at least one of the sealing heads 104, 106 in the fully retracted position and to unlock at least one of the sealing heads 104, 106 in response to an applied force.

The first locking mechanism 150, as shown in FIG. 6, may be formed by a first push rod 154 attached to the first sealing head 104, a first pocket 156 in the first sealing head 104, and a first latch 158 disposed in the first pocket 156. In this example, first latch 158 is biased to engage with the first track stop 144 on the first guide track 110. The engagement between the first latch 158 and the first track stop 144 secures the first sealing head 104 in the first retracted position, as shown in FIG. 6, to place the first sealing head 104 in a first locked state. The engagement between the first latch 158 and the first track stop 144 may be a frictional engagement that secures the first sealing head 104 in the first locked state. In some embodiments, the engagement between the first latch 158 and the first track stop 144 may be an abutment engagement that secures the first sealing head 104 in the first locked state. The first locked state temporarily locks the first sealing head 104 in the first retracted position.

First push rod 154 may be moved upwards in the first sealing head 104 by applying a second applied force against a bottom end of the first push rod 154 to force a top end of the first push rod 154 against a top end of first latch 158. First push rod 154 moves forward with enough force to overcome the bias of the first latch 158 and to depress the first latch 158 into the first pocket 156. The bias of the first latch 158 may be provided by a first spring 174 attached to the first latch 158 or another biasing member that biases the first latch 158 out of the first pocket 156. In operation, the first push rod 154 may be actuated when the first push rod 154 engages and is displaced by a bottom of a pipe as the pipe isolation device 100 moves from the fully retracted position to the fully set position. First locking mechanism 150 changes or releases to the first unlocked state in response to the second applied force meeting a second force threshold. The first locking mechanism 150 is placed into the first unlocked state when the first latch 158 is pushed into the first pocket 156 so that the first latch 158 is disengaged with the first track stop 144. The disengagement between the first latch 158 and the first track stop 144 places the first sealing head 104 in the first unlocked state so that the first sealing head 104 is permitted to move from the first retracted position to the first set position.

The second locking mechanism 152, as shown in FIG. 6, may be formed by a second push rod 162 attached to the second sealing head 106, a second pocket 164 in the second sealing head 106, and a second latch 166 disposed in the second pocket 164. In this example, second latch 166 is biased to engage with the second track stop 146 on the second sealing head 106. The engagement between the second latch 166 and the second track stop 146 secures the second sealing head 106 in the second retracted position, as shown in FIG. 6, to place the second sealing head 106 in a second locked state. The engagement between the second latch 166 and the second track stop 146 may be a frictional engagement that secures the second sealing head 106 in the second locked state. In some embodiments, the engagement between the second latch 166 and the second track stop 146 may be an abutment engagement that secures the second sealing head 106 in the second locked state. The second locked state temporarily locks the second sealing head 104 in the second retracted position.

Second push rod 162 may be moved upwards in the second sealing head 106 by applying a first applied force against a bottom end of second push rod 162 to force a top end of the second push rod 162 against a top end of second latch 166. Second push rod 162 moves forward with enough force to overcome the bias of the second latch 166 and to depress the second latch 166 into the second pocket 164. The bias of the second latch 166 may be provided by a second spring 176 attached to the second latch 166 or another biasing member that biases the second latch 166 out of the second pocket 164. Springs 174, 176 may be compression springs. In operation, the second push rod 162 may be actuated when the second push rod 162 engages and is displaced by a bottom of a pipe as the pipe isolation device 100 moves from the fully retracted position to the fully set position. Second locking mechanism 152 changes or releases to the second unlocked state in response to the first applied force being applied meeting a first force threshold. Second locking mechanism 152 is placed into the second unlocked state when the second latch 166 is pushed into the second pocket 164 so that the second latch stop 168 does not block the second latch 166 and the second sealing head 106 is permitted to move from the second retracted position to the second set position.

Figure 7:
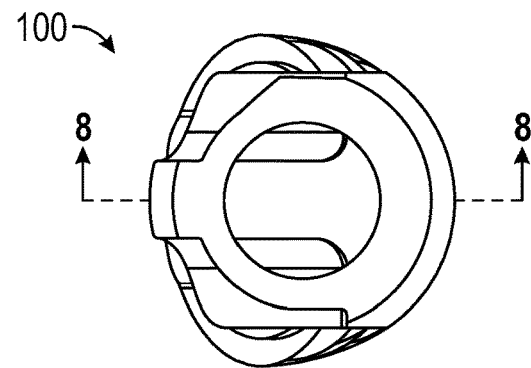
FIG. 7 is a top view of the pipe isolation device in the fully retracted position in accordance with embodiments of the present disclosure.
Figure 8:
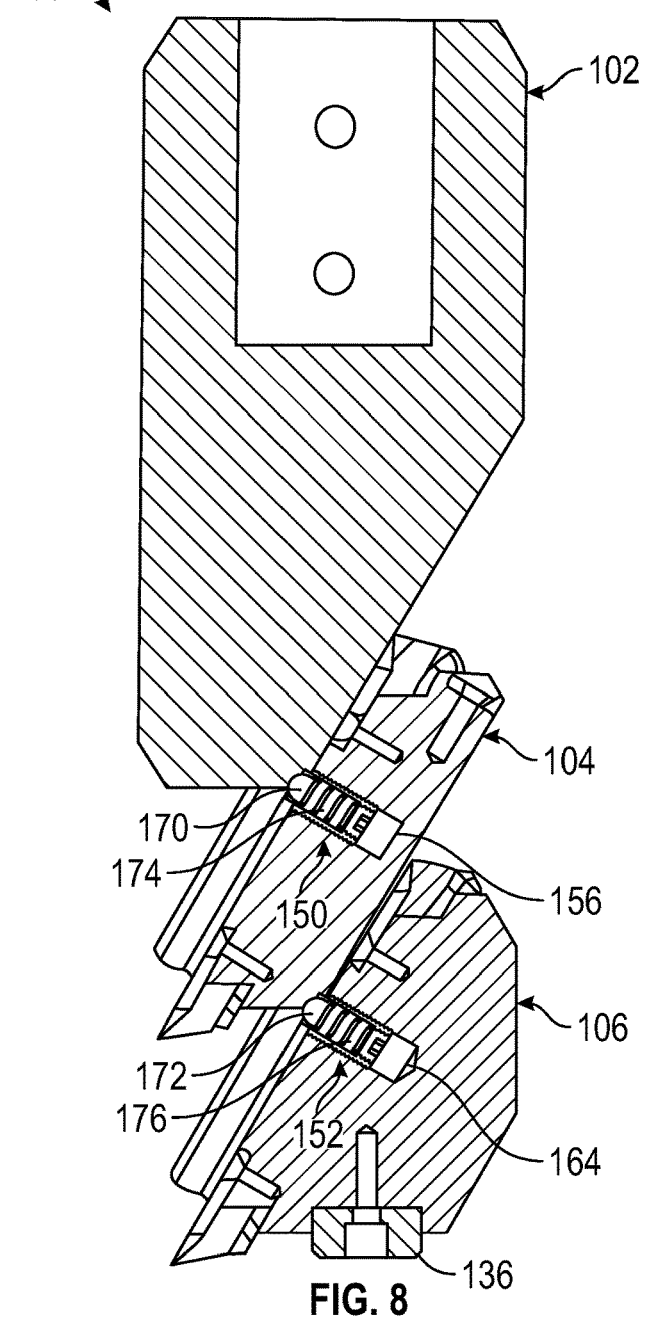
FIG. 8 is a cross-sectional view taken along line 8-8 in FIG. 7.

FIG. 7 shows a top view of an embodiment of the pipe isolation device 100 in a fully retracted position. FIG. 8 shows a cross-section at section lines 8-8 of the pipe isolation device 100 shown in FIG. 7 and further illustrates another example of the locking mechanisms 150, 152. In the embodiment shown in FIG. 8, the first locking mechanism 150 may be formed by a first pin 170 and the second locking mechanism 152 is formed by a second pin 172. First pin 170 may be a detent pin and may be disposed in the first pocket 156 of the first sealing head 104. First spring 174 engages the first pin 170 to bias the first pin 170 out of the first pocket 156. First pin 170 is biased to engage with a surface of the control bar head 102 when the first sealing head 104 is in the first retracted position to place the first sealing head 104 in the first locked state.

A second applied force may be applied to the first locking mechanism 150 to overcome the biasing force of the first spring 174 and to depress the first pin 170 in first pocket 156. With the first pin 170 depressed in the first pocket 156, the first locking mechanism 150 is placed in the first unlocked state and the first sealing head 104 may be moved from the first retracted position to the first set position. In operation, the first pin 170 may be actuated by the first sealing head 104 engaging with a bottom of a pipe and applying the second applied force as the pipe isolation device 100 moves from the fully retracted position to the fully set position. The first locking mechanism 150 is moved from the first locked state to the first unlocked state in response to the second applied force meeting the second force threshold.

The second locking mechanism, as shown in FIG. 8, may be formed by the second pin 172 disposed in the second pocket 164 of the second sealing head 106, and a second spring 176 biases the second pin 172 out of the second pocket 164. Second pin 172 may be a detent pin and may be biased to engage with a surface of the first sealing head 104 when the second sealing head 106 is in the second retracted position to place the second sealing head 106 in the second locked state.

A first applied force may be applied to the second locking mechanism 152 to overcome the biasing force of the second spring 172 and to depress the second pin 172 in the second pocket 164. With the second pin 172 depressed in the second pocket 164, the second locking mechanism 152 is placed in the second unlocked state and the second sealing head 106 may be moved from the second retracted position to the second set position. In operation, the second pin 172 may be actuated by the second sealing head 106 engaging with a bottom of a pipe and applying the first applied force as the pipe isolation device 100 moves from the fully retracted position to the fully set position.

In some embodiments, pins 170 and 172 are formed by shear pins. A shear pin or multiple shear pins are press-fit or threaded into the sealing heads 104, 106. The shear pin(s) in the second sealing head 106 are designed to shear at a lower force than the shear pin(s) of the first sealing head 104 so that the second sealing head 106 deploys before the first sealing head 104 deploys. The second sealing head 106 deploys when the second pin(s) 172 shear in response to the first applied force to allow the second sealing head 106 to move to the second set position and the first sealing head 104 deploys when the first pin(s) 170 shear in response to the second applied force to allow the first sealing head 104 to move to the first set position.

Second locking mechanism 152 may be moved from the second locked state to the second unlocked state in response to the first applied force meeting the first force threshold. The locking mechanisms may be configured so that the second sealing head 106 is deployed before the first sealing head 104. More specifically, the first force threshold may be less than the second force threshold so that the second sealing head 106 is deployed before the first sealing head 104 is deployed.

Figure 9:
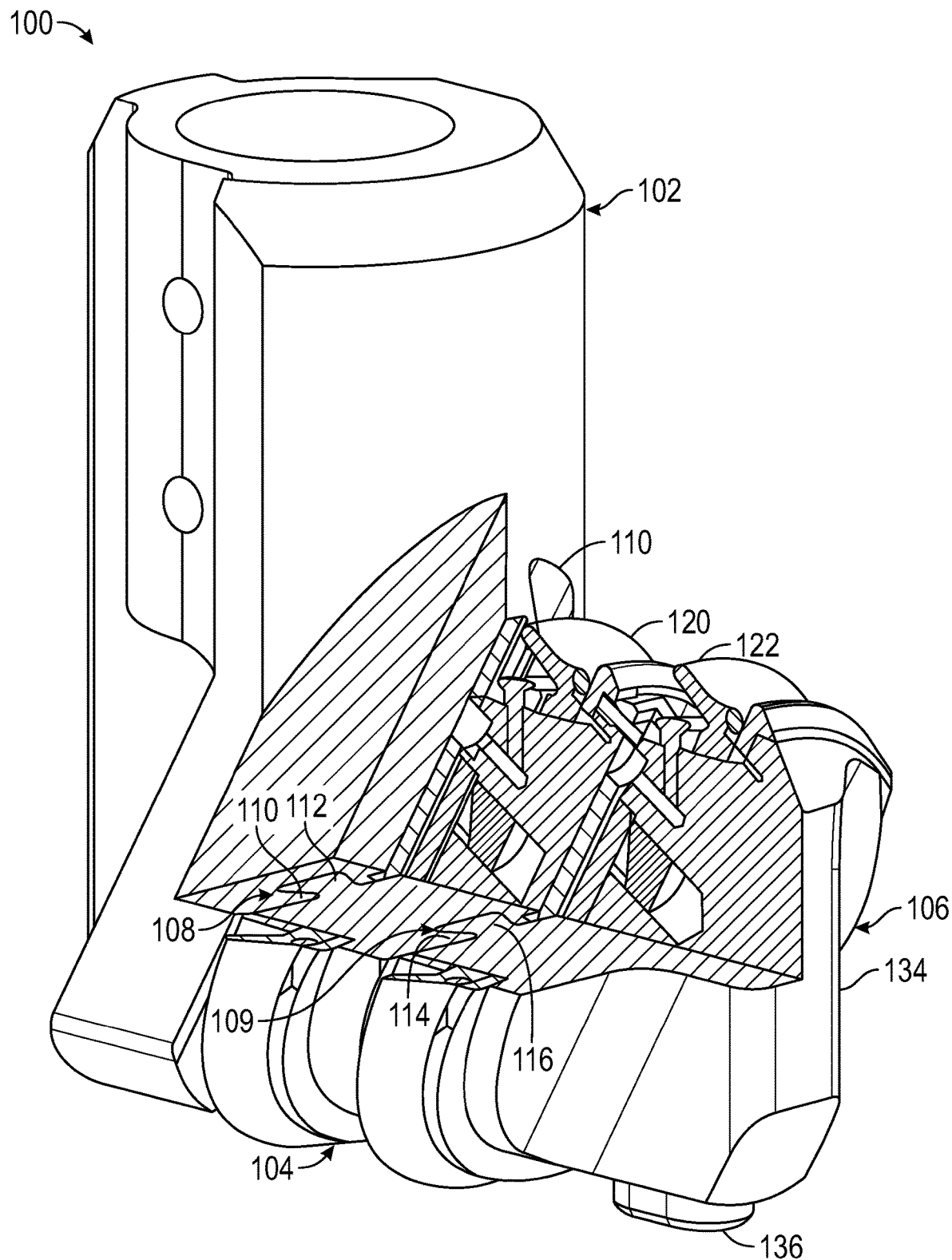
FIG. 9 is a partial, quarter-sectional view of the pipe isolation device in the fully set position in accordance with embodiments of the present disclosure.

Referring to FIG. 9, a partial, quarter-sectional view of the pipe isolation device 100 in the fully set position is shown to further illustrate how sliding engagements 108, 109 provide sliding connections between the control bar head 102 and the first sealing head 104 and between the first sealing head 104 and the second sealing head 106. One of the first guide tracks 110 and one of the first guide members 112 of the first sliding engagement 108 are shown interlocked and slidably connected. Likewise, one of the second guide tracks 114 and one of the second guide members 116 are shown interlocked and slidably connected. Guide tracks 110, 114 have elongated first track slots 140 and second guide tracks 142, as shown in FIG. 4, that are dovetail-shaped, as illustrated in FIG. 9. Guide members 112, 116 are dovetail-shaped to correspond with their respective guide tracks 110, 114.

Figure 10:
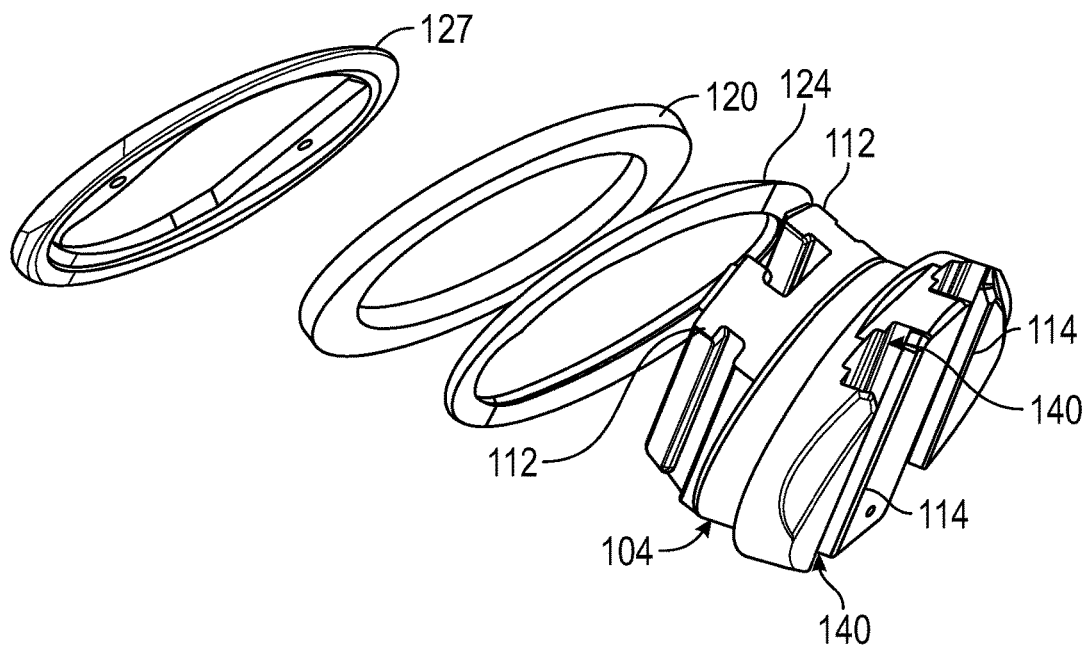
FIG. 10 is an exploded view of a first sealing head in accordance with embodiments of the present disclosure.

Referring to FIG. 10, an exploded view of an embodiment of the first sealing head 104 is shown. First seal element 120 is shown separated from the body of the first sealing head 104 to better illustrate the first seal element 104. When the first seal element 120 is attached to the body of the first sealing head 104, the first seal element 120 extends around the outer perimeter of the body of the first sealing head 104 to form a circumferential seal for sealing a pipe. First seal element 120 is disposed between the first nose ring 124 and the first retaining ring 127. First nose ring 124 and first backing ring 127 provide support to the first seal element 120. First retaining ring 127 and first nose ring 124 attach to the body of the first sealing head 104 and may have a shape that corresponds to the first seal element 120. Second seal element 122, second retaining ring 128, and second nose ring 126 for the second sealing head 106 may be like the first seal element 120 and supporting rings shown and described with respect to FIG. 10.

First sealing head 104 has the first guide members 112 on one side and has on the opposite side the second guide tracks 114. First guide members 112 have a T-shape. Second guide tracks 114 have first track slots 140 that are T-shaped. For the pipe isolation device 100 corresponding to the embodiment of the first sealing head 104 shown in FIG. 10, the first guide tracks 110 of the control bar head 102 have corresponding T-shapes to interconnect with the first guide members 112 to provide for sliding engagement between the control bar head 102 and the first sealing head 104. First guide tracks 110 extend along a control bar surface 117. For the pipe isolation device 100 corresponding to the embodiment of the first sealing head 104 shown in FIG. 10, the second guide members 116 of the second sealing head 106 have corresponding T-shapes to interconnect with the second guide tracks 114 of the first sealing head 104 to provide for sliding engagement between the first sealing heads 104, 106. First guide tracks 110 extend along a control bar surface 117.

Figure 11:
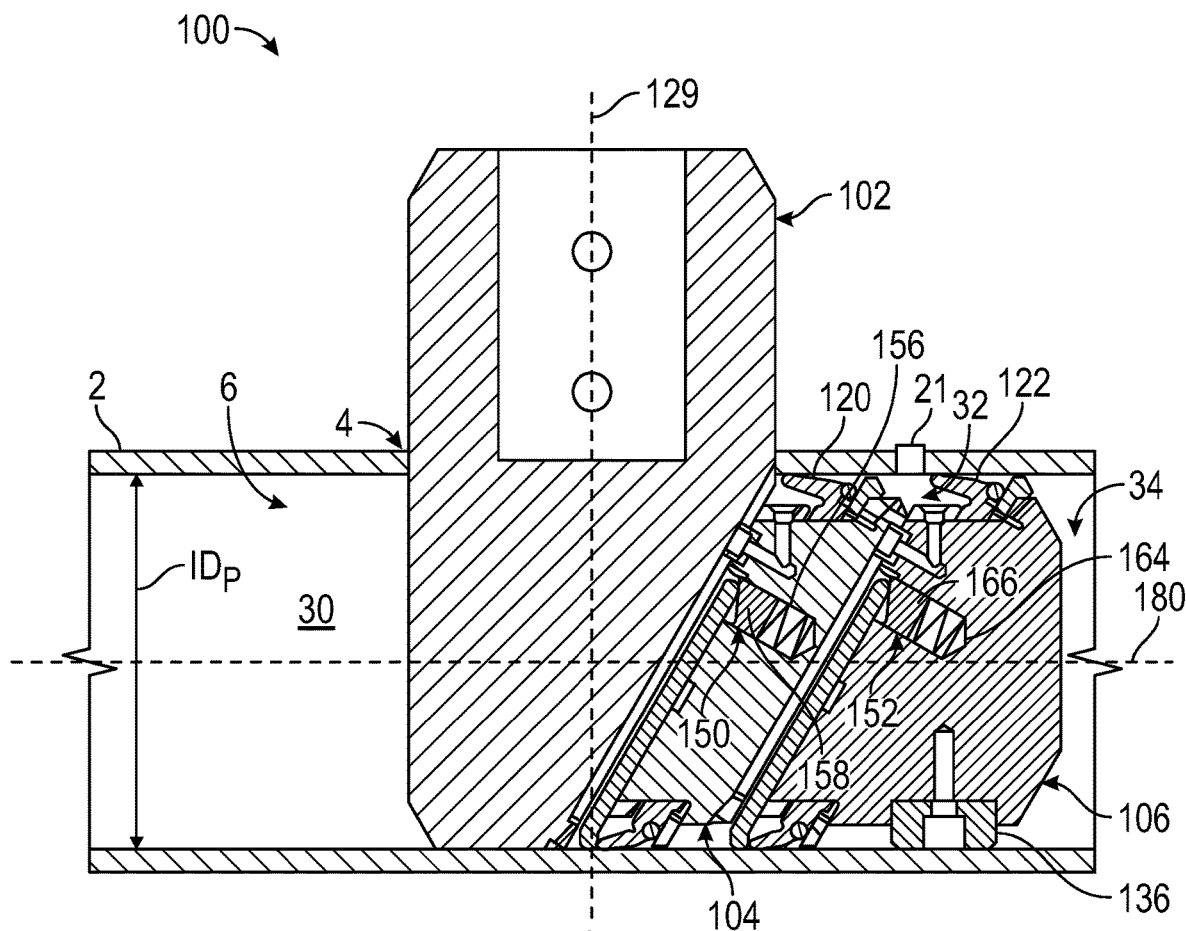
FIG. 11 is the cross-sectional view of the pipe isolation device of FIG. 6 shown in the fully set position and installed in a pipe in accordance with embodiments of the present disclosure.

Referring to FIG. 11, the embodiment of the pipe isolation device 100 of FIG. 6 is shown in the fully set position in a pipe 2 where the pipe isolation device 100 double blocks the pipe 2 using the first sealing head 104 and the second sealing head 106. Pipe isolation device 100 may be positioned in the pipe 2 by extending the pipe isolation device 100 in the fully retracted position, as shown in FIG. 6, into a lateral access opening 4 and into an interior space 6 of the pipe 2. Vertical axis 129 may extend through the center of the access opening 4. Pipe isolation device 100 is configured to translate from the fully retracted position, shown in FIG. 6, to the fully set position, shown in FIG. 11, as described below in more detail with respect to FIGS. 15-20.

Locking mechanisms 150, 152 are in the unlocked state when in the fully set position. More specifically, first latch 158 is depressed in the first pocket 156 as the first sealing head 104 moves from the first retracted position to the first set position and the second latch 166 is depressed in the second pocket 164 as the second sealing head 106 is moved from second retracted position to the second set position.

Figure 20:
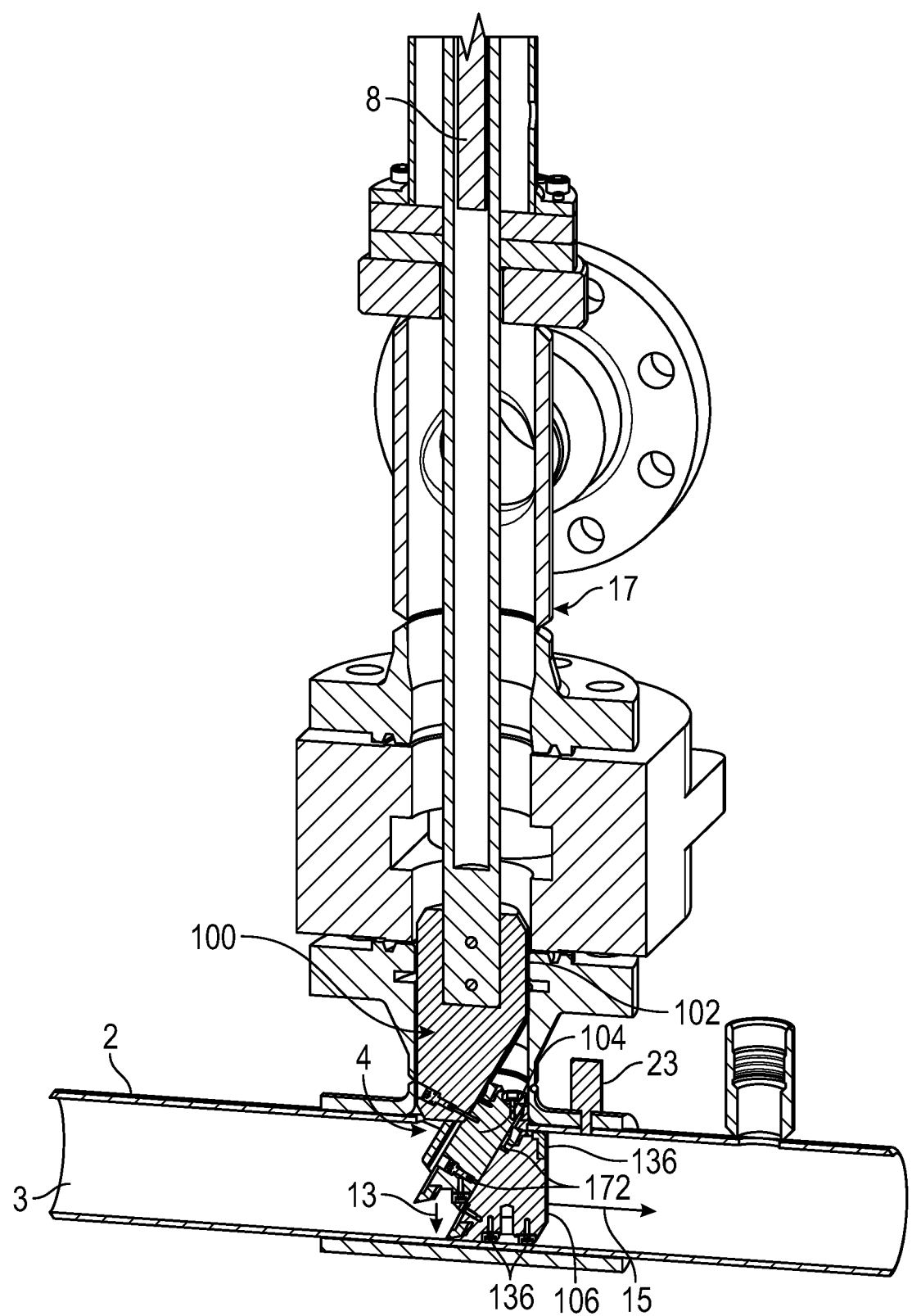

Seal elements 120, 122 seal against the interior diameter (ID) of the pipe 2 to double block the pipe 2 to form a live pipe zone 30, an isolated zone 32, and a zero-energy zone 34. The interior diameter (ID) of the pipe 2 is represented in FIG. 11 as $ID_P$. Live pipe zone 30 is on the pressurized side of the first seal element 120, of the first sealing head 104, the isolated zone 32 is between the first seal element 120 and the second seal element 122, and zero-energy zone 34 is downstream of the second sealing element 122 of the second sealing head 106. First sealing head 104 and the second sealing head 106 form a double block in the pipe 2. Fluid that leaks past the first seal element 120 flows into the isolated zone 32 and pressure from the fluid in the isolated zone 32 is bled out of the isolated zone 32. A bleed port 21 may extend through the pipe 2 to connect the isolated zone 32 to a bleed joint (not shown) to bleed off pressure that may form in the isolated zone 32. In some embodiments, pressure from the fluid in the isolated zone 32 is bled out of the isolated zone 32 through passageways extending from the isolated zone 32 and through the sealing heads 104, 106 and the control bar head 102, and fluidly coupled to a component on the branch of the pipe 2, such as the fitting, valve, housing, or actuator. The bleed joint may be formed by a T-joint. Joints may be used to access the interior space 6 of the pipe 2, for example, as shown in FIG. 20, a bleed joint 23 fluidly communicates with the isolated zone 32 and a joint 25 that fluidly communicates with the zero-energy zone 34.

Figure 12:
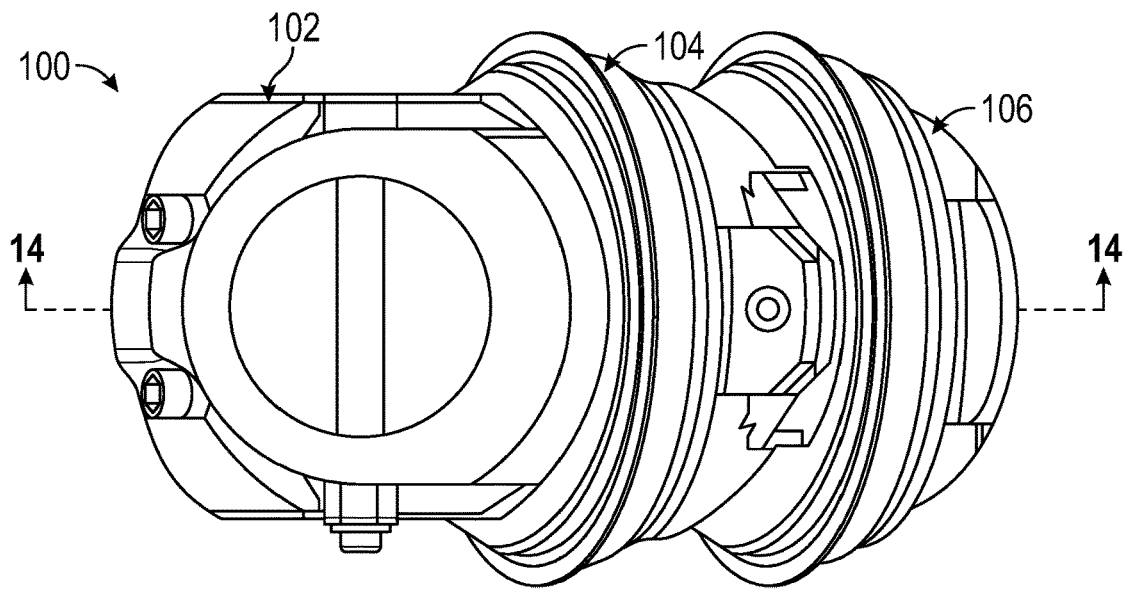
FIG. 12 is a top view of the pipe isolation device in the fully set position in accordance with embodiments of the present disclosure.
Figure 13:
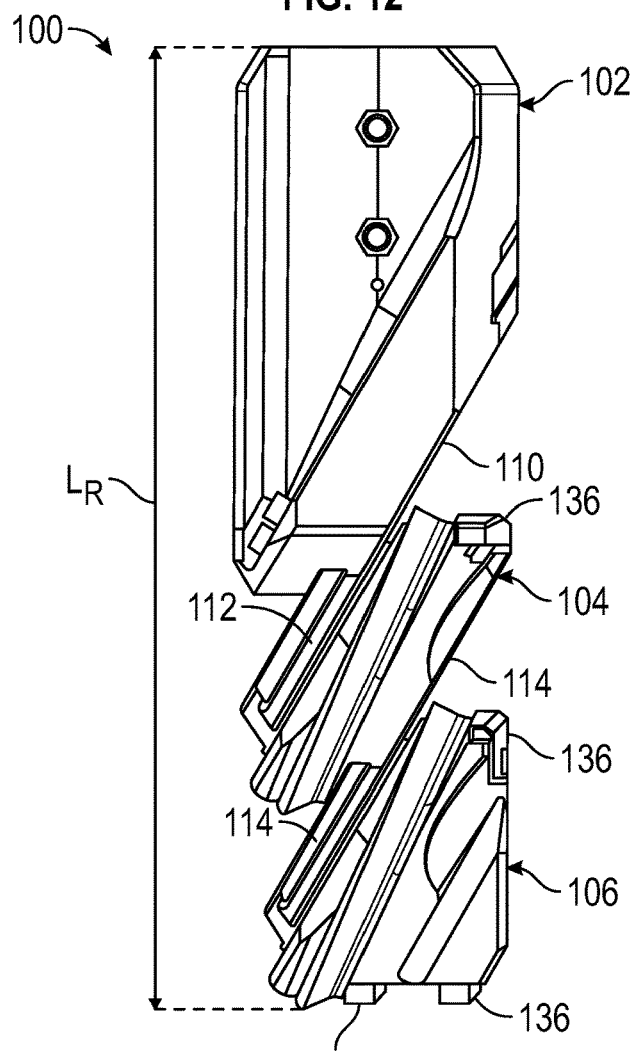
FIG. 13 is a side view of the pipe isolation device in the fully retracted position in accordance with embodiments of the present disclosure.
Figure 14:
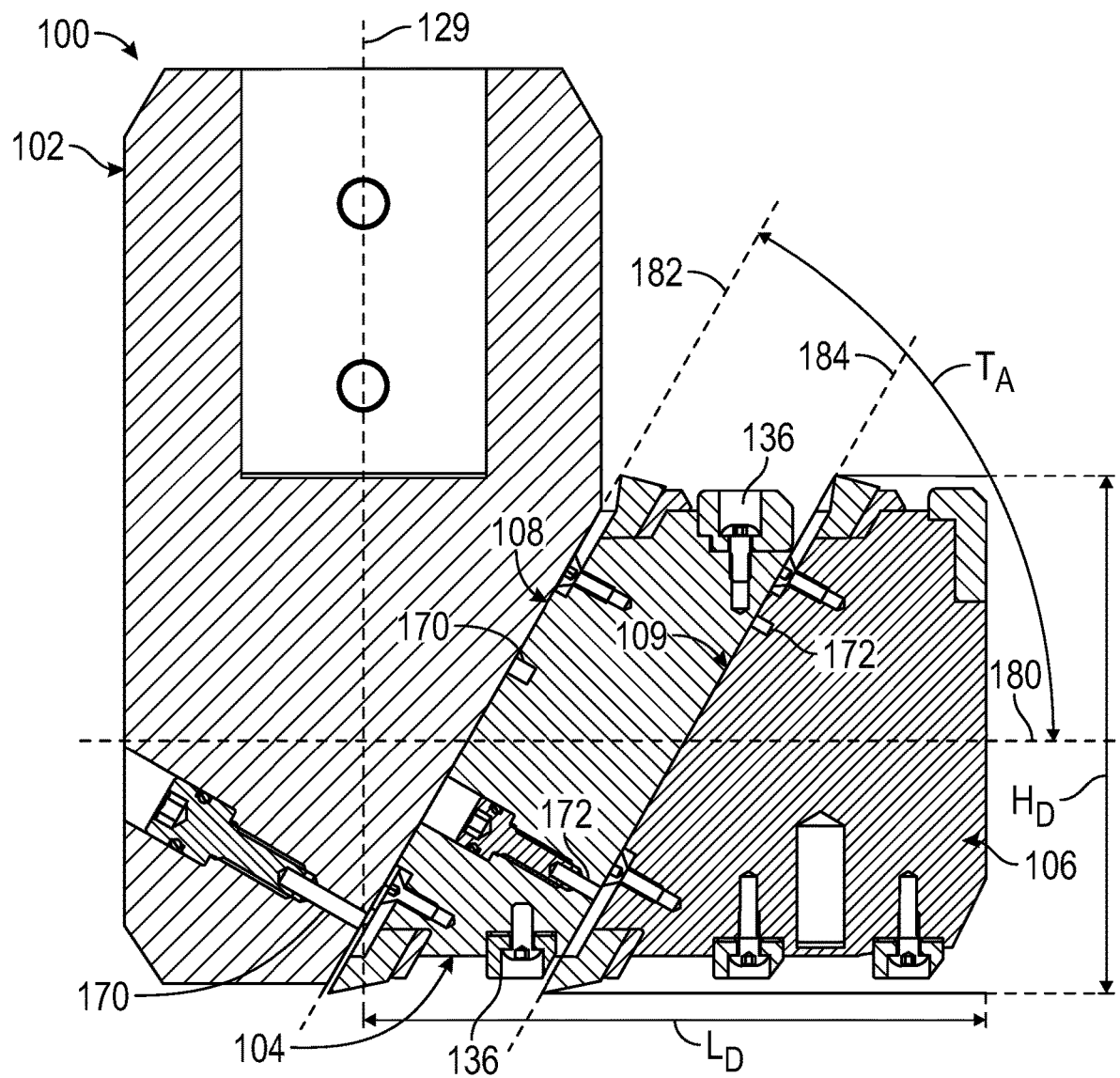
FIG. 14 is a cross-sectional view taken along line 14-14 in FIG. 12.

Referring to FIGS. 12-14, an embodiment of pipe isolation device 100 is shown. FIG. 12 shows a top view of the pipe isolation device 100 in the fully set position, and FIG. 13 shows a side view of the pipe isolation device 100 in the fully retracted position. FIG. 14 shows a cross-sectional view of the pipe isolation device 100 in the fully set position along section line 14-14 of FIG. 12. Like parts of the embodiments of the pipe isolation device 100 are labeled with like reference numbers. In the embodiment shown in FIGS. 12-14, pads 136 are attached to a top section and a bottom section of sealing heads 104, 106 to slide along internal surface of a pipe and center the sealing heads 104, 106 in the pipe as the pipe isolation device 100 moves to the fully set position. Second pin 172 is formed by a shear pin and is shown in FIG. 14 after the second pin 172 has been sheared. First pin 170 is formed by a shear pin and is shown in FIG. 14 after the first pin has been sheared. Operation of pins 170, 172 shown in FIG. 14 is described in more detail with respect to FIGS. 18-23.

Pipe isolation device 100 has a retracted length $L_R$ in the fully retracted position, as shown in FIG. 13. When in the fully set position shown in FIG. 14, first sealing head 104 and second sealing head 106 are aligned with one another to form a cylindrical shape and have a perpendicular orientation with respect to the control bar head 102, as illustrated by a horizontal axis 180 extending through control bar head 102 and sealing heads 104, 106. Horizontal axis 180 extends through a center of the sealing heads 104, 106 and is perpendicular to vertical axis 129 extending through the center of the control bar head 102. Horizontal axis 180 may align with the center axis of a pipe when the pipe isolation device 100 is deployed in the fully set position in the pipe.

First sliding engagement 108 is configured so that the first sealing head 104 moves along the first fixed path, as depicted by first track axis 182, and the second sliding engagement 109 is configured so that the second sealing head 106 moves along the second fixed path, as depicted by second track axis 184, as the pipe isolation device 100 moves from the fully retracted position to the fully set position. The fixed paths of sliding engagements 108 may be formed by guide tracks 110, 114. The fixed paths formed by the guide tracks 110, 114 are at an acute angle, referred to as the track angle $T_A$, with respect to the horizontal axis 180 extending through the center of the sealing heads 104, 106, as shown by track angle $T_A$. In some embodiments, track angle $T_A$ may be from 46 degrees to 70 degrees from the horizontal axis 180, as described below:

$$46° \leq T_A \leq 70°$$

Pipe isolation device 100 in the fully set position has a deployed length $L_D$ and a deployed height $H_D$, as shown in FIG. 14. Deployed length $L_D$ is measured from the vertical axis 129 extending through the center of the control bar 102 to the end of the second sealing head 106. Deployed height $H_D$ is measured from the top to the bottom of the sealing heads 104, 106. In some embodiments, the deployed height $H_D$ may be measured at an outermost surface of the pads 136 on the bottom and top sections of the sealing heads 104, 106. The deployed height $H_D$ of the sealing heads 104, 106 is approximately the interior diameter (ID) of the pipe that the pipe isolation device 100 may be deployed. Sliding engagements 108, 109 provide a compact deployed length $L_D$ for the pipe isolation device 100.

The compact deployed length $L_D$ helps the pipe isolation device 100 stay within the bounds of a fitting sleeve (not shown) that may be formed around a lateral access opening through which the pipe isolation device 100 is inserted when in the fully set position. Limiting the deployed length $L_D$ and staying within the bounds of a fitting sleeve helps prevent damage to the pipe due to the reaction loads of the pipe isolation device 100 against the pipe when the pipe is pressurized.

Pipe isolation device 100, in some embodiments, is configured for a pipe having a lateral access opening that has a diameter size approximately equal to the internal diameter (ID) of the pipe being sealed, sometimes referred to as a size-on-size tap. The length of a typical fitting sleeve $FS_L$ on a pipe for a full-encirclement pipe fitting is approximately the length of the internal diameter of the pipe from the center axis of the pipe branch to one of the first sleeve ends.

The deployed length $L_D$ of the pipe isolation device 100 may be limited with respect to the deployed height $H_D$ of the sealing heads 104, 106 to facilitate operation. The deployed length $L_D$ of the pipe isolation device 100 also may be limited with respect to the retracted length $L_R$ of the pipe isolation device 100. In some embodiments, the ratio of deployed length $L_D$ of the pipe isolation device 100 and deployed height $H_D$ of the sealing heads 104, 106 is in the following range:

$$0.56 \leq \frac{L_D}{H_D} \leq 1.60$$

The size of a pipe isolation device 100 may be selected to correspond to the internal diameter of the selected pipe that will be sealed, and accordingly, different pipe isolation devices 100 may have different deployed lengths $L_D$, retracted lengths $L_R$, and deployed heights $H_D$ depending on the internal diameter of the selected pipe to be sealed. In some embodiments, the ratio of the retracted length $L_R$ of the pipe isolation device 100 and the internal diameter, referred to as $ID_P$, of the selected pipe to be sealed is in the following range:

$$2.25 \leq \frac{L_R}{ID_P} \leq 4.00$$

The deployed height $H_D$ of the pipe isolation device 100 to be used in the selected pipe may be equal to the internal diameter $ID_P$ of the selected pipe.

An overall compact size of the pipe isolation device 100 may be beneficial. For example, the compact size may help with installation of the pipe isolation device 100 when there is limited space for installation at the location of the lateral access opening.

Figure 15:
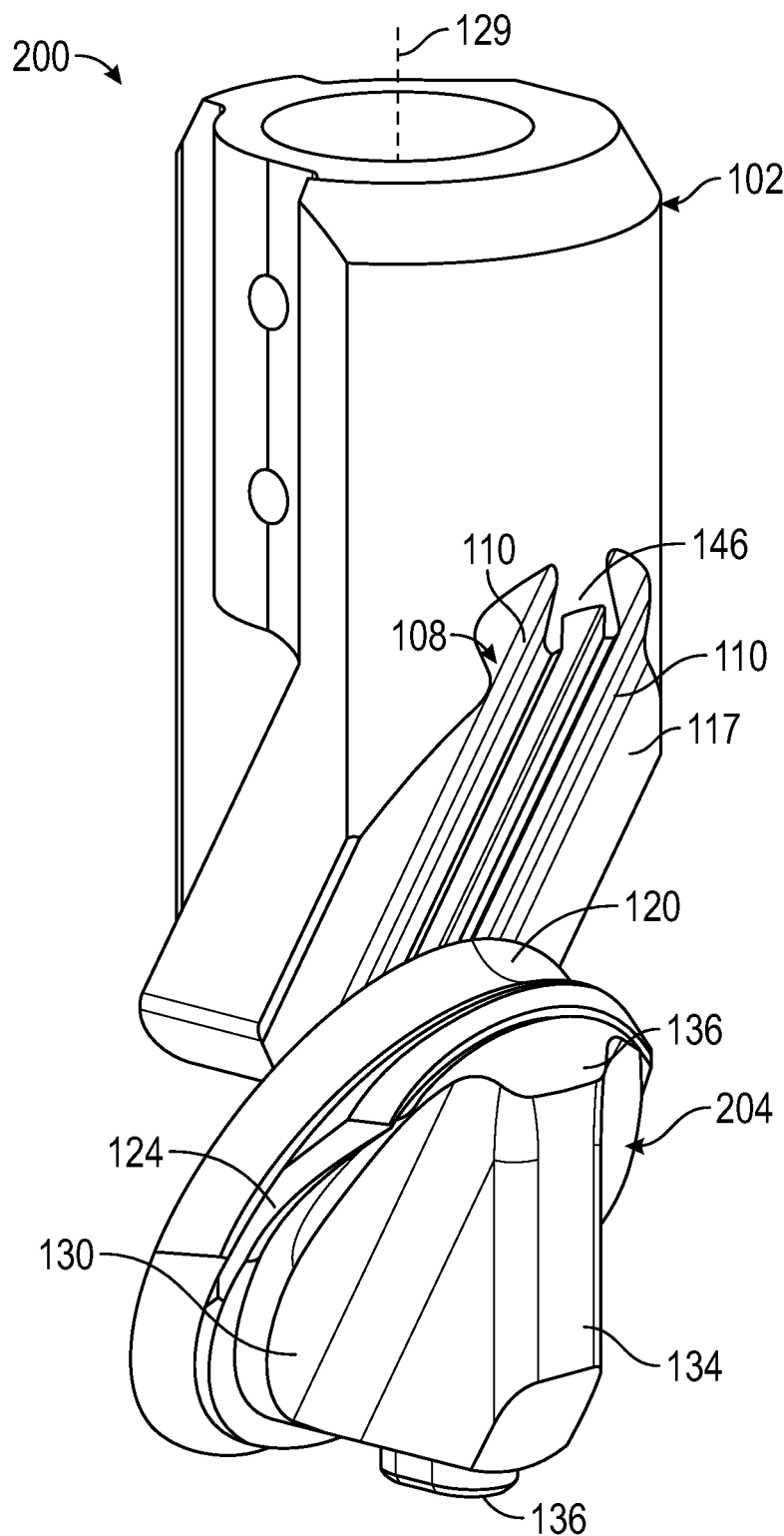
FIG. 15 is a perspective view of an embodiment of the pipe isolation device having a single sealing head in a fully retracted position in accordance with embodiments of the present disclosure.
Figure 16:
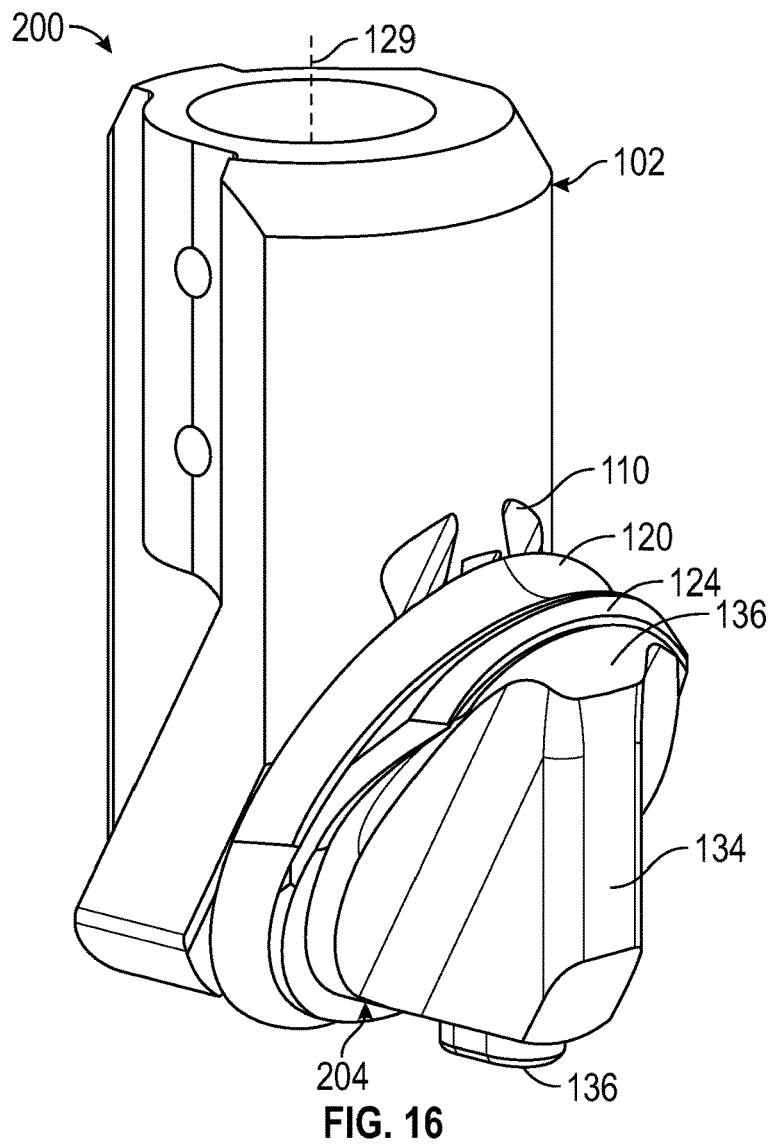
FIG. 16 is a perspective view of the pipe isolation device having the single sealing head in a fully set position in accordance with embodiments of the present disclosure.
Figure 17:
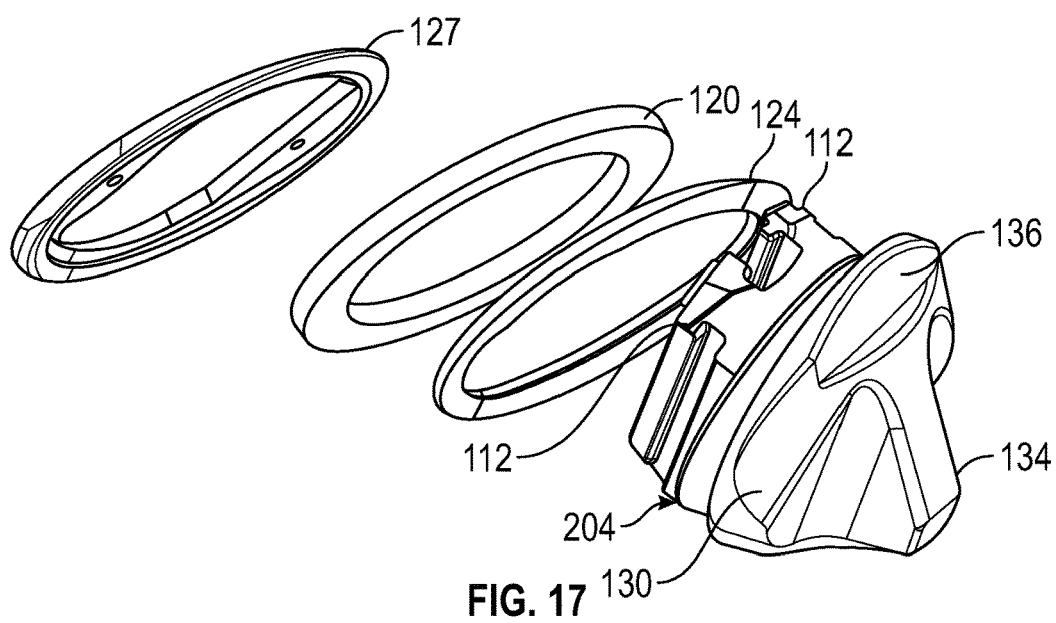
FIG. 17 is an exploded view of the single sealing head of FIG. 15 and FIG. 16 in accordance with embodiments of the present disclosure.

Referring to FIGS. 15-17, another embodiment of a pipe isolation device is shown, and is referred to as pipe isolation device 200. Pipe isolation device 200 includes the control bar head 102 and a single sealing head 204 slidably connected to the control bar head 102. Embodiments of pipe isolation device 200 are like pipe isolation device 100 but the pipe isolation device 200 has only one sealing head, referred to as the single sealing head 204. In some embodiments, the single sealing head 204 may be like the second sealing head 106 of the pipe isolation device 100 with the single sealing head 204 slidably connected to the control bar head 102. In other embodiments, the single sealing head 204 may be like the first sealing head 104 of the pipe isolation device 100 without the second sealing head 106. Like part numbers of embodiments of the pipe isolation devices 100, 200 are labeled with like reference numbers. Single sealing head 204 may slide relative to the control bar head 102 to position the pipe isolation device 200 between a first retracted position shown in FIG. 15 to a first set position shown in FIG. 16. Pipe isolation device 200 is in the fully retracted position when the first sealing head 204 is in the first retracted position and is in the fully set position when the first sealing head 204 is in the first set position.

Pipe isolation device 200 includes the first sliding engagement 108 for providing a slidable engagement connection between the control bar head 102 and the single sealing head 204, see FIG. 15. First sliding engagement 108 of the pipe isolation device 200 is configured to permit the single sealing head 204 to move along the first fixed path between the first retracted position and the first set position. First sliding engagement 108 for pipe isolation device 200 is configured as described and illustrated in FIG. 1 and FIG. 4 with respect to the pipe isolation device 100. For example, first sliding engagement 108 may be formed by a pair of first guide tracks 110, see FIG. 15, attached to a side of the control bar head 102 and the first guide members 112, see FIG. 17, attached to a first side of the single sealing head 204. Each of the first guide members 112 is interconnected with one of the first guide tracks 110, as shown in FIG. 4, to provide for sliding engagement between the control bar head 102 and the single sealing head 204. First guide tracks 110 extend along the control bar surface 117. Control bar surface 117 is at an acute angle with respect to a vertical axis 129 extending through a center of the control bar head 102. Pipe isolation device 200 may include different embodiments of the first sliding engagement 108 as previously discussed with respect to the pipe isolation device 100.

Referring to FIG. 17, an exploded view of an embodiment of the single sealing head 204 is shown. First seal element 120 is shown separated from the body of the single sealing head 204 to better illustrate the first seal element 104. When the first seal element 120 is attached to the body of the second sealing head 204, the first seal element 120 extends around the outer perimeter of the body of the single sealing head 204 to form a circumferential seal for sealing a pipe. First seal element 120 is disposed between the first nose ring 124 and the first retaining ring 127. First nose ring 124 and first backing ring 127 provide support to the first seal element 120. First retaining ring 127 and first nose ring 124 attach to the body of the single sealing head 204 and may have a shape that corresponds to the first seal element 120. Single sealing head 204 may also be an embodiment of the second sealing head 106 of the pipe isolation device 100 shown in FIGS. 1 and 2.

Pipe isolation device 200 may include the first locking mechanism 150. First locking mechanism 150 is able to lock the single sealing head 204 in the first retracted position, as described previously with respect to the first sealing head 104 and as illustrated in FIG. 6 and FIG. 8.

In operation, the pipe isolation device 100 may be installed to double block the pipe 2, as shown in FIGS. 18-23. Pipe isolation device 100 is installed in the pipe 2 through a lateral access opening 4 through a sequence of operations to position the pipe isolation device 100 from the fully retracted position through the lateral access opening 4 to the fully set position in the pipe 2. Pipe isolation device 100 may be used in a method to isolate or block fluid pressure in a pipe 2. Pipe isolation device 100 is configured to traverse at an angle, e.g. a right angle, as the pipe isolation device 100 extends through the lateral access opening 4 and then moves the sealing heads 104, 106 of the pipe isolation device 100 forward in the pipe 2 to position the sealing heads 104, 106 in line with one another and with the pipe 2 along an axis of pipe 2 which is transverse, e.g. perpendicular, to vertical axis 129. Sealing heads 104, 106 form a cylindrical shape fitting within the internal diameter of the pipe 2 when in the fully set position. Pipe isolation device 100 forms multiple seals in the pipe 2 in the fully set position. Pipe isolation device 100 is configured with the first sliding engagement 108 to permit the first sealing head 104 to slide relative to the control bar head 102 along a first fixed path and traverse a right angle to gain access to an interior space 6 of the pipe 2, and the second sliding engagement 109 permitting the second sealing head 106 to slide relative to the first sealing head 104 along the second fixed path and traverse the right angle to gain access to the interior space 6 of the pipe 2.

Figure 18:
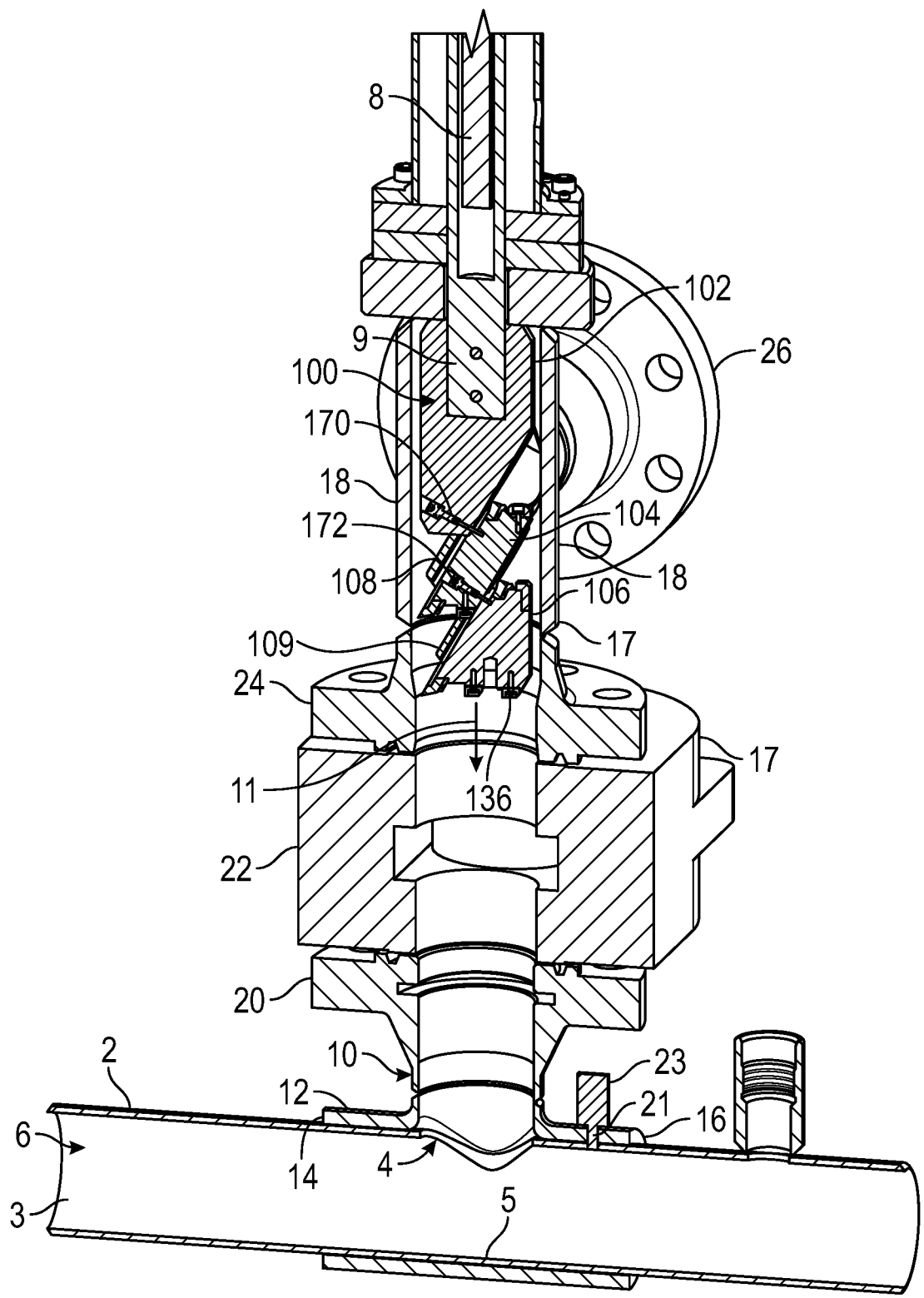
FIGS. 18-23 are a sequence of cross-sectional views showing the pipe isolation device being installed in the pipe and moving from the fully retracted position to the fully set position in the pipe in accordance with embodiments of the present disclosure.

Referring to FIG. 18, the pipe isolation device 100 is in a fully retracted position and disposed in a pipe branch 17 above the access opening 4 and a bottom pipe section 5 in the pipe 2. An actuator 8 is attached to the control bar head 102 of the pipe isolation device 100. The actuator 8 moves the control bar head 102 downwards in the pipe branch 17 to convey the pipe isolation device 100 into the lateral access opening 4 during the installation of the pipe isolation device 100. Actuator 8 may include an actuator control bar 9 detachably connected to the control bar head 102. An arrow 11 is shown in FIG. 18 to depict the downward movement of the actuator control bar 9 and connected pipe isolation device 100 through the pipe branch 17 and the access opening 4, and into the pipe 2.

In the illustrated example, pipe branch 17 has a pipe fitting 10 with a pipe sleeve 12 that surrounds and extends outwardly from the access opening 4 to a first sleeve end 14 and a second sleeve end 16. Lateral access opening 4 may have a diameter equal to the internal diameter of the pipe 2, and the length from the vertical axis 129 through the center of the pipe branch 17 to each sleeve end 14, 16 may be equal to the internal diameter of the pipe 2, see FIG. 23. Pipe fitting 10 may be a full-encirclement pipe fitting that fits around the full circumference of the pipe 2. A first flange 20 connects the pipe fitting 10 and a valve 22. A second flange 24 connects the valve 22 and an isolation device housing 18. A third flange 26 connects to the isolation device housing and may be used for fluid flow from the pipe 2 that is temporarily blocked by the pipe isolation device 100. Bleed port 21 extends through the fitting sleeve 12 and the pipe 2 and is connected to a bleed joint 23.

Pipe isolation device 100, as shown in FIG. 18, is in the fully retracted position at an initial stage of the installation with the sealing heads 104, 106 in locked states to temporarily lock the sealing heads 104, 106. For example, first pin 170 and second pin 172 may be the locking mechanisms that lock the sealing heads 104, 106 in the locked states. Pins 170, 172 may be formed by shear pins that are un-sheared, as shown in FIG. 18 and FIG. 19, and have not been activated to release the sealing heads 104, 106 to the unlocked states.

Figure 19:
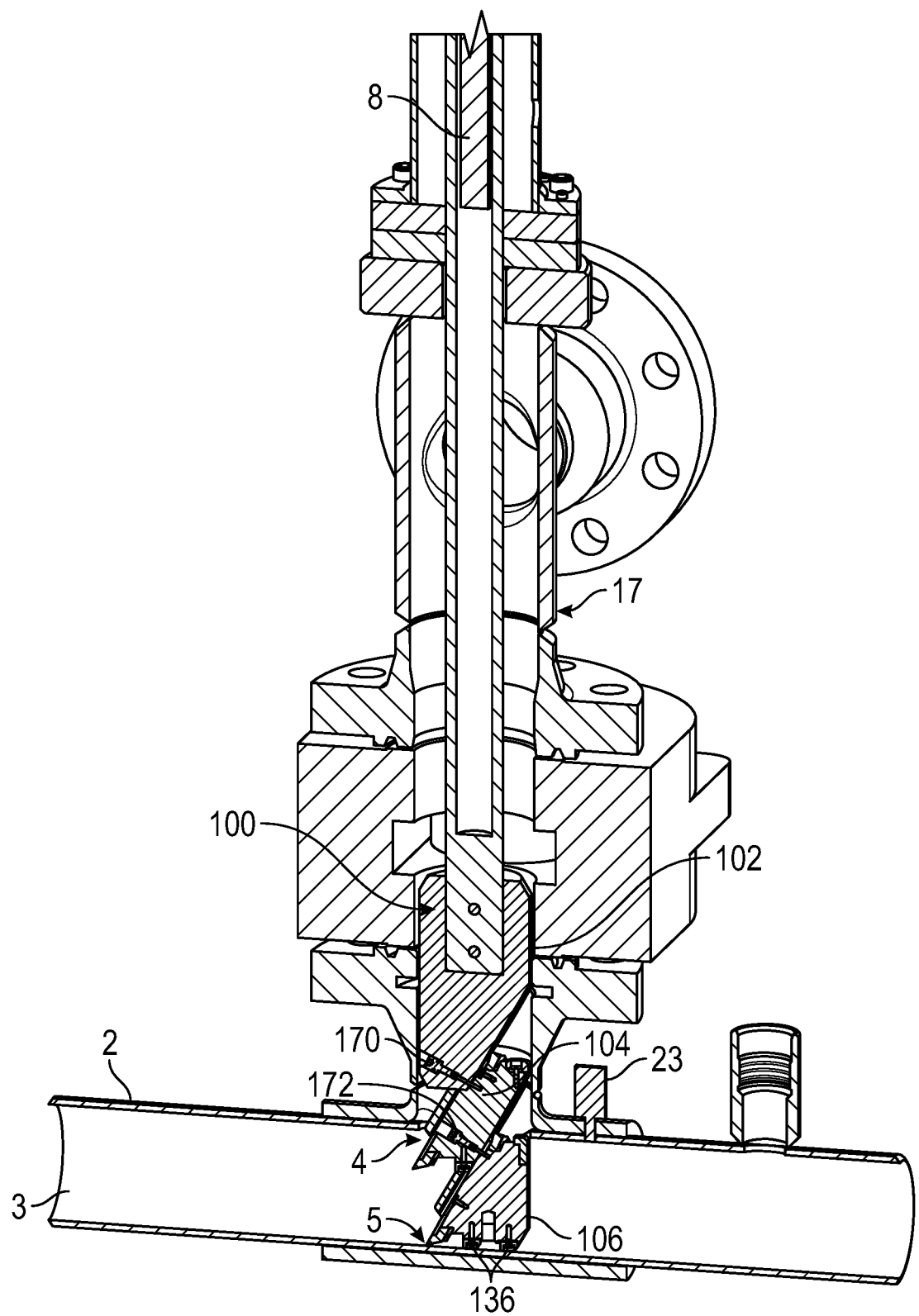

Referring to FIG. 18 and FIG. 19, the actuator 8 moves the control bar head 102 linearly downwards and along the vertical axis of the pipe branch 17 and through the pipe branch 17. As the control bar head 102 moves downwards, the pipe isolation device 100 is conveyed through the lateral access opening 4 where the second sealing head 106 engages the internal wall 3 at the pipe bottom section 5 of the pipe 2. Pipe isolation device 100 is in the fully retracted position with the sealing heads 104, 106 in the locked state as the pipe isolation device 100 moves through the pipe joint 17 and through the lateral access opening 4. Pipe isolation device 100 is maintained in the fully retracted position until the pipe isolation device 100 reaches the pipe bottom section 5 of the pipe 2. The locking mechanisms include the first locking mechanism located between the control bar head 102 and the first sealing head 104 and the second locking mechanism located between the first sealing head 104 and the second sealing head 106. Locking mechanisms may be formed by pins 170, 172.

Referring to FIG. 20, when the second sealing head 106 engages the internal wall 3 of the pipe 2 the downward force on the control bar head 102 provided by actuator 8 results in a first applied force being applied to the second sealing head 106. Second pin 172 formed by a shear pin shears in response to the first applied force. FIG. 19 shows a first portion of the second pin 172 in the first sealing head 104 and a second portion of the second pin 172 in the second sealing head 106 illustrating that the second pin 172 has sheared and the second sealing head 106 is in the unlocked state. The second locking mechanism, that may be formed by second pin 172, has been released to release the second sealing head 106 from the second retracted position at the pipe bottom section 5. When in the unlocked state, the second sealing head 106 is not biased in the second retracted position and is permitted to slide with respect to the first sealing head 104.

The first sealing head 104 remains in the first locked state to remain stationary with respect to the control bar 102 when the second sealing head 106 moves from the locked state to the unlocked state. Control bar head 102 and first sealing head 104 are stationary with respect to one another and continue to move downward, as depicted by arrow 13, through the lateral access opening 4 and towards the bottom of the pipe 2. As the control bar 102 and first sealing head 104 move downwards together, the sealing heads 104, 106 slide with respect to each other and the second sealing head 106 slides forward in the pipe 2 away from the vertical axis of the control bar head and the pipe branch 17, as depicted by arrow 15. Second sealing head 106 moves forward and outwardly from the vertical axis of the pipe branch 17 in the pipe 2 with pads 136 sliding on the internal surface 3 of the pipe 2. Pads 136 help to center the second sealing head 106 in the pipe 2. As the second sealing head 106 moves forward, the sealing heads 104, 106 slide with respect to one another.

Figure 21:
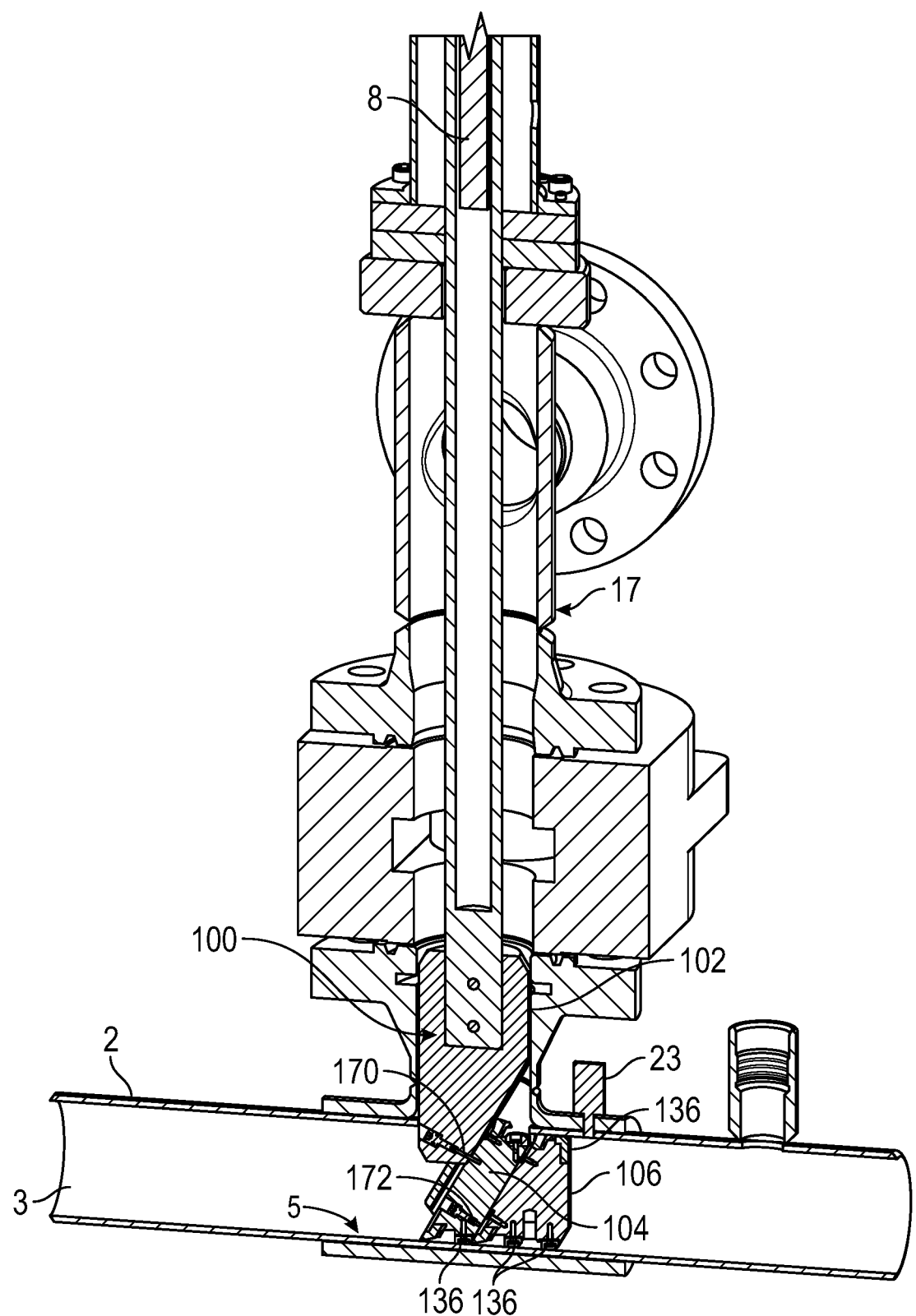

Referring to FIG. 21, as the control bar head 102 moves downwards, the first sealing head 104 engages an internal wall 3 at the pipe bottom section 5 of the pipe 2. First sealing head 104 is in the first retracted position and in the first locked state when the pad 136 on the bottom of the first sealing head 104 initially engages the internal wall 3 at the bottom of pipe 2 directly below the lateral access opening 4.

Figure 22:
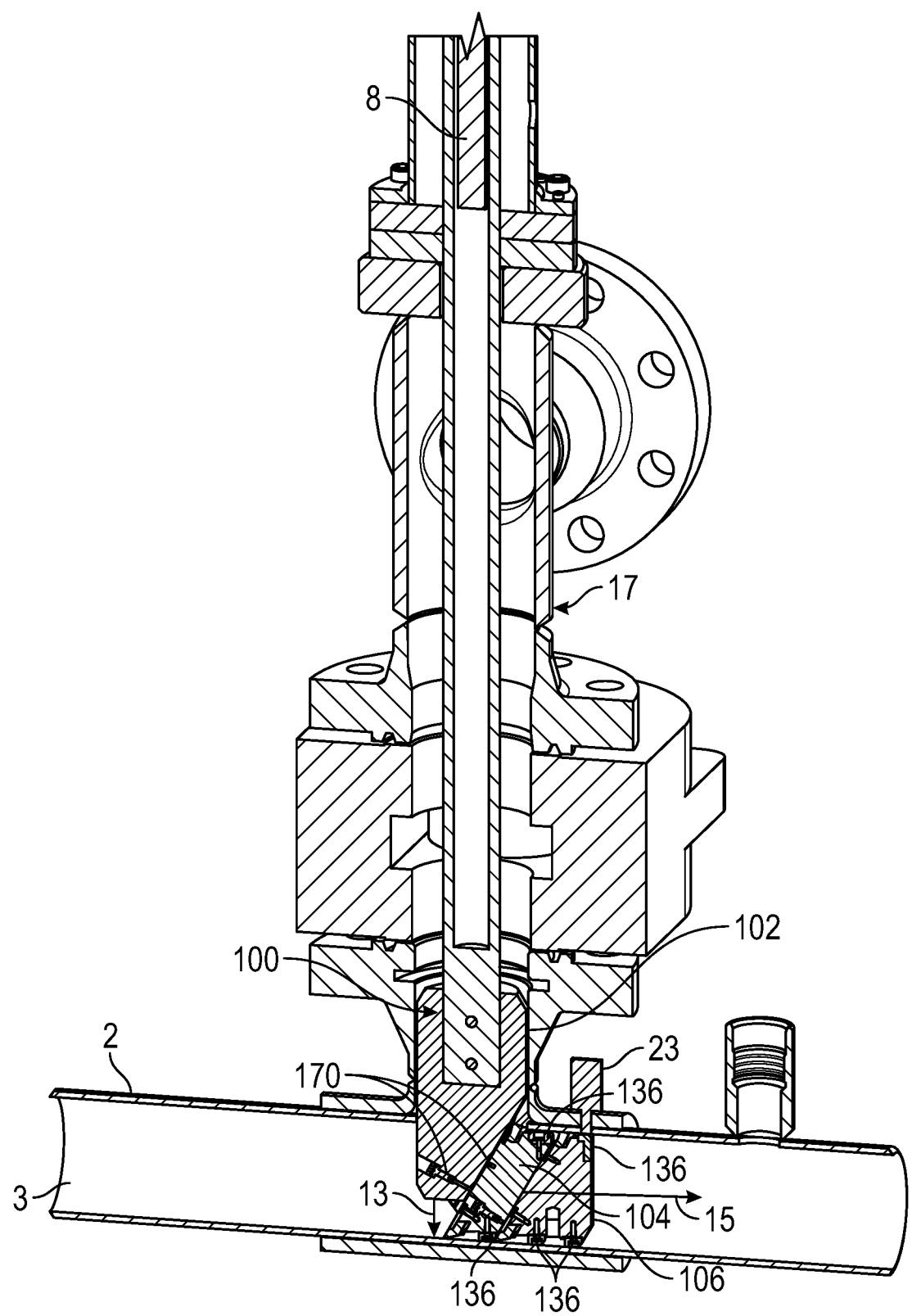

Referring to FIG. 22, when the first sealing head 104 engages the internal wall 3 of the pipe 2 the downward force on the control bar head 102 provided by actuator 8 results in a second applied force being applied to the first sealing head 104. First pin 170 formed by a shear pin shears in response to the second applied force. FIG. 22 shows a first portion of the first pin 170 in the control bar head 102 and a second portion of the first pin 170 in the first sealing head 104 to illustrate that the first pin 170 has sheared and the first sealing head 104 is in the unlocked state. When in the unlocked state, the first sealing head 104 is not biased in the first retracted position and is permitted to slide with respect to the control bar head 102.

Control bar head 102 continues to move downward, as depicted by arrow 13, through the lateral access opening 4 and towards the bottom of the pipe 2. As the control bar 102 moves downwards, the control bar head 102 and the first sealing head 104 slide with respect to each other and the sealing heads 104, 106 slide forward and outwardly in the pipe 2 away from the vertical axis of the control bar head 102 and the pipe branch 17, as depicted by arrow 15. As sealing heads 104, 106 move forward in the pipe 2, the pads 136 on the sealing heads 104, 106 slide on the internal surface 3 of the pipe 2. Pads 136 help to center the sealing heads 104, 106 in the pipe 2. As the sealing heads 104, 106 move forward, the control bar head 102 and the first sealing head 104 slide with respect to one another.

Figure 23:
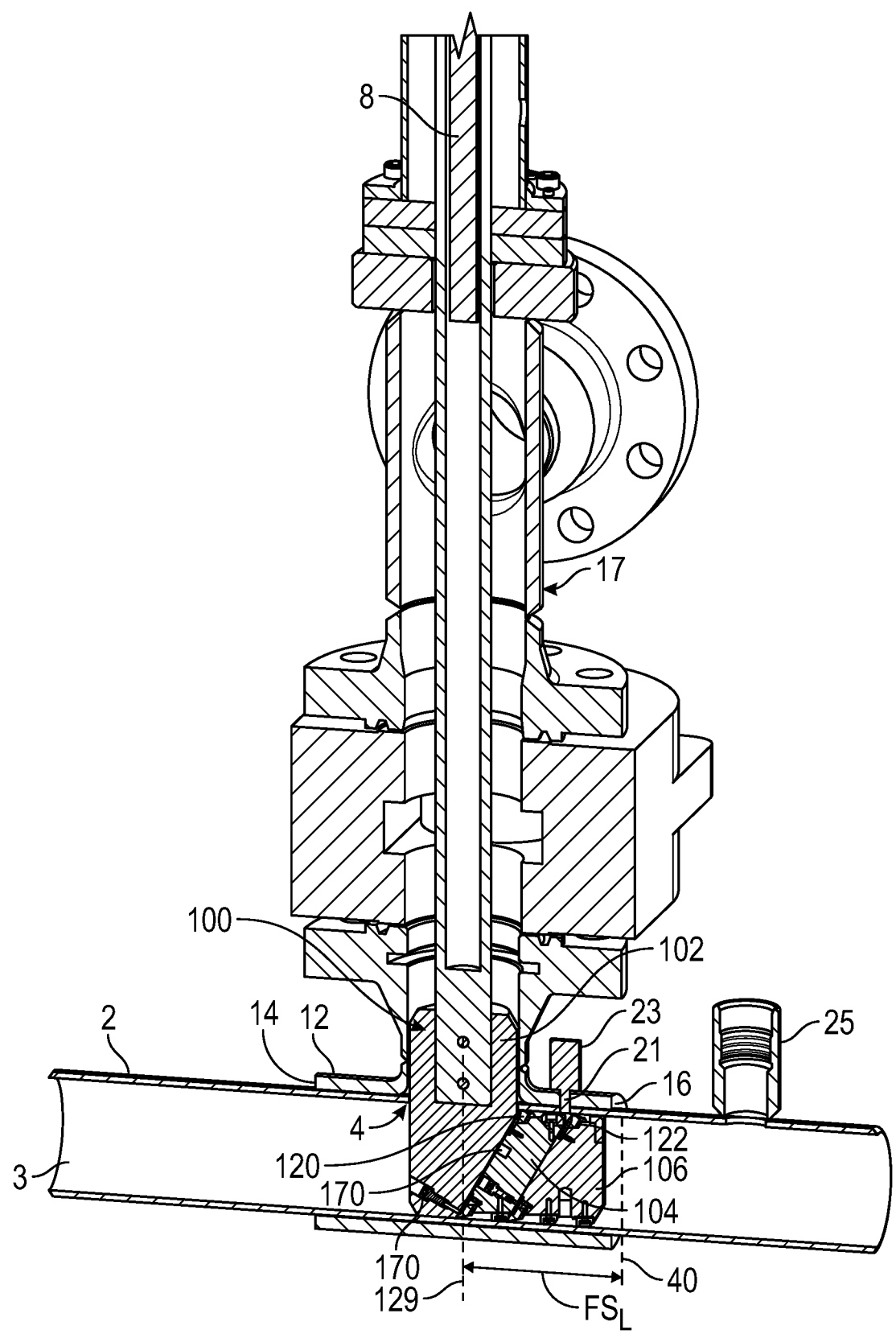

Referring to FIG. 23, as the control bar head 102 moves downwards, the control bar head 102 engages the internal wall 3 at the bottom of the pipe 2 directly below the lateral access opening 4. Pipe isolation device 100 is in the fully set position with the first sealing head 104 in the first set position and the second sealing head 106 in the second set position. First sealing head 104 forms a primary seal to fluid flowing in the pipe 2 and the second sealing head 106 forms a secondary seal if fluid leaks past the primary seal. Bleed port 21 extends through the fitting sleeve 12 and the pipe 2 to the isolated zone 32 located between the first seal element 120 and the second seal element 122, see FIG. 11.

Pipe isolation device 100 may be disposed within the bounds of the sleeve ends 14, 16 when positioned from the fully retracted position to the fully set position. As shown in FIG. 23, the sealing heads 104, 106 together have a cylindrical shape. Pipe isolation device 100, in some embodiments, is configured for a pipe having a lateral access opening 4 that has a diameter size approximately equal to the internal diameter of the pipe 2 being sealed, sometimes referred to as a size-on-size tap. A fitting sleeve length $FS_L$ may be measured from the vertical axis 129 extending through the center of the pipe branch 17 to the sleeve end, shown by sleeve vertical axis 40 in FIG. 23. In the embodiment shown in FIG. 23, the deployed length $L_D$, shown in FIG. 14, is less than the fitting sleeve length $FS_L$. In some embodiments, the deployed length $L_D$ may be greater than the $FS_L$.

With additional reference to FIGS. 15-17, the single head pipe isolation device 200 may similarly be installed into pipe 2. In operation, the pipe isolation device 200 may be installed to single block the pipe 2. Pipe isolation device 200 operates in a manner like isolation device 100 but the pipe isolation device 200 blocks pipe 2 with only one sealing head, referred to as single sealing head 204, when installed in the pipe 2. In the first retracted position, pipe isolation device 200 may be disposed in a pipe branch 17 above the access opening 4 and a bottom pipe section 5 in the pipe 2. An actuator 8 may be attached to the control bar head 102 of the pipe isolation device 200. The actuator 8 moves the control bar head 102 downwards in the pipe branch 17 to convey the pipe isolation device 200 into the lateral access opening 4 during the installation of the pipe isolation device 200.

Actuator 8 may move the control bar head 102 linearly downwards and along the vertical axis of the pipe branch 17 and through the pipe branch 17. As the control bar head 102 moves downwards, the pipe isolation device 200 is conveyed through the lateral access opening 4 where the single sealing head 104 engages the internal wall 3 at the pipe bottom section 5 of the pipe 2. Pipe isolation device 200 is in the fully retracted position with the single sealing head 104 in the locked state as the pipe isolation device 200 moves through the pipe joint 17 and through the lateral access opening 4. Pipe isolation device 200 is maintained in the fully retracted position until the pipe isolation device 200 reaches the pipe bottom section 5 of the pipe 2. The locking mechanism may be located between the control bar head 102 and the single sealing head 204. The locking mechanism may be formed by the pin 170.

When the single sealing head 104 engages the internal wall 3 of the pipe 2 the downward force on the control bar head 102 provided by actuator 8 results in an applied force being applied to the single sealing head 106. First pin 170 formed by a shear pin shears in response to the applied force. The locking mechanism, that may be formed by the pin 170, is sheared to release the single sealing head 204 from the first retracted position at the pipe bottom section 5. When in the unlocked state, the single sealing head 204 is not biased in the first retracted position and is permitted to slide with respect to the control bar head 102.

As the control bar 102 moves downwards, the single sealing head 204 slides with respect to the control bar head 102 and slides forward in the pipe 2 away from the vertical axis of the control bar head and the pipe branch 17. More specifically, single sealing head 204 moves forward, or outwardly from the vertical axis of the pipe branch 17, in the pipe 2 with the pad 136 sliding on the internal surface 3 of the pipe 2. Pad 136 help to center the single sealing head 204 in the pipe 2. As the single sealing head 204 moves forward, the single sealing head 204 slides with respect to the control bar head 102.

As the control bar head 102 moves downwards, the control bar head 102 engages the internal wall 3 at the bottom of the pipe 2 directly below the lateral access opening 4. This results in the pipe isolation device 200 being positioned in the fully set position with the single sealing head 204 in the first set position. Single sealing head 104 forms a single, primary seal to fluid flowing in the pipe 2.

Pipe isolation device 200 may be disposed within the bounds of the sleeve ends 14, 16 when positioned from the fully retracted position to the fully set position. Single sealing head 204 has a cylindrical shape. Pipe isolation device 200, in some embodiments, is configured for a pipe having a lateral access opening 4 that has a diameter size approximately equal to the internal diameter of the pipe 2 being sealed, sometimes referred to as a size-on-size tap. A fitting sleeve length $FS_L$ may be measured from the vertical axis 129 extending through the center of the pipe branch 17 to the sleeve end, shown by sleeve vertical axis 40 in FIG. 23. In the embodiment shown in FIG. 23, the deployed length $L_D$ is less than the fitting sleeve length $FS_L$. In some embodiments, the deployed length $L_D$ may be greater than the $FS_L$.

Figure 24:
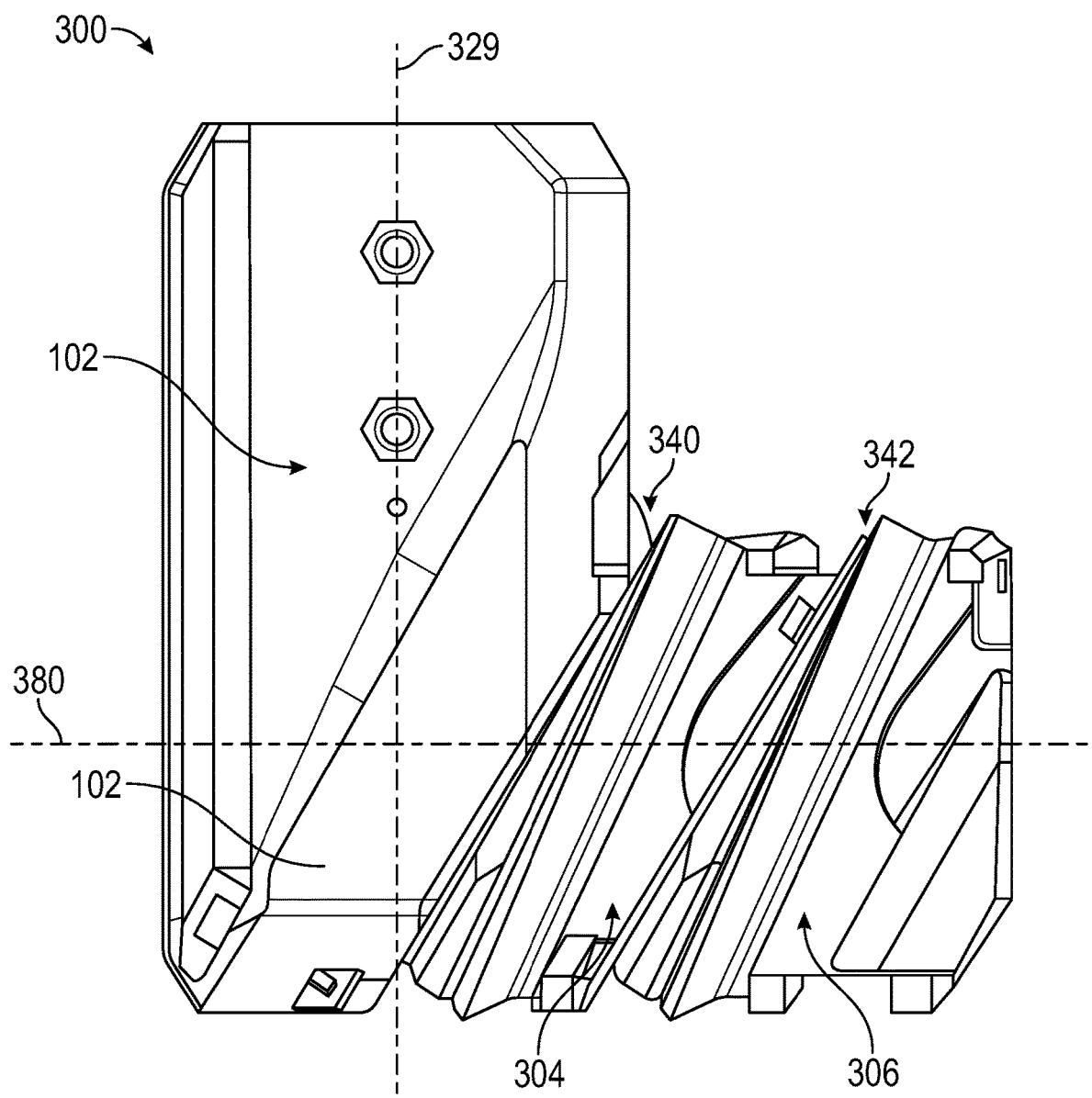
FIG. 24 is a side view of the pipe isolation device in the fully set position in accordance with embodiments of the present disclosure.
Figure 25:
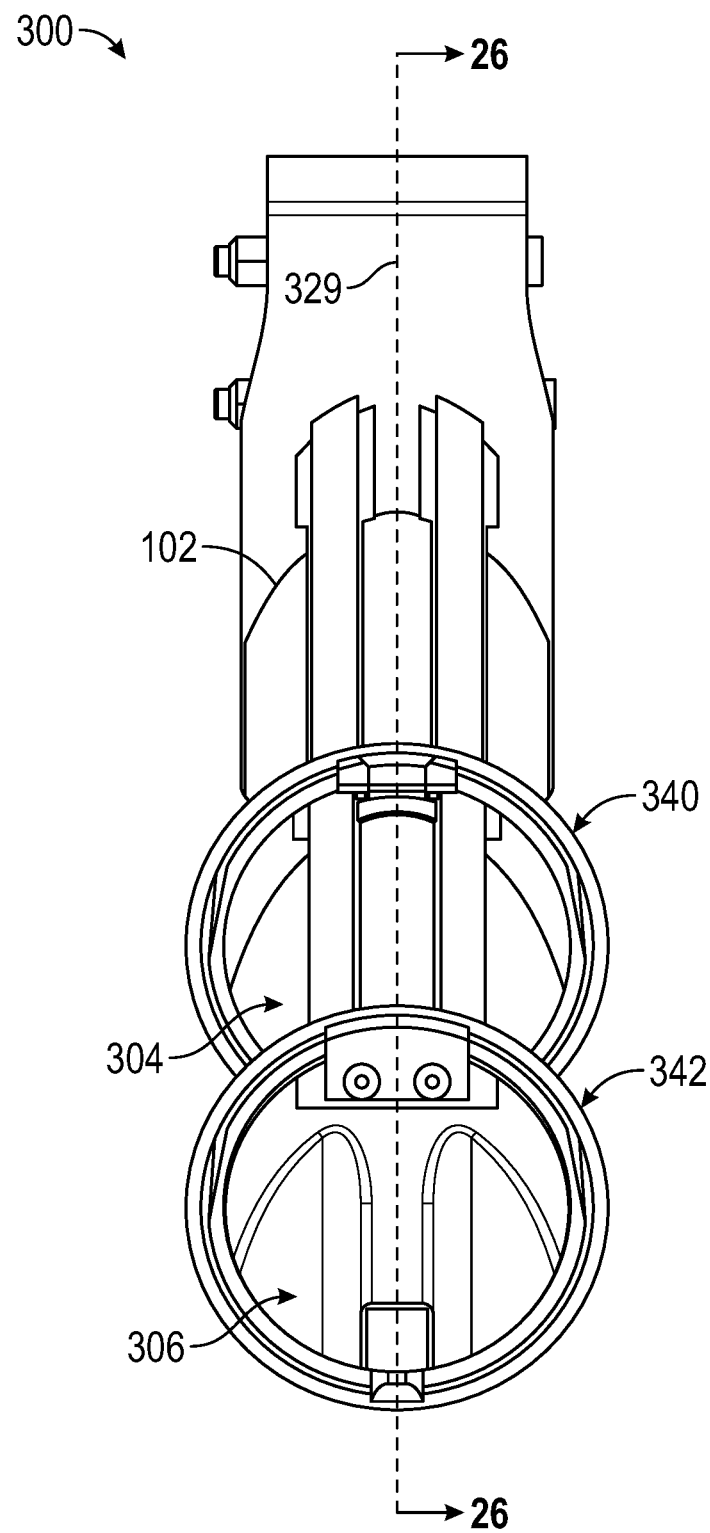
FIG. 25 is a front view of the pipe isolation device in the fully retracted position in accordance with embodiments of the present disclosure.
Figure 26:
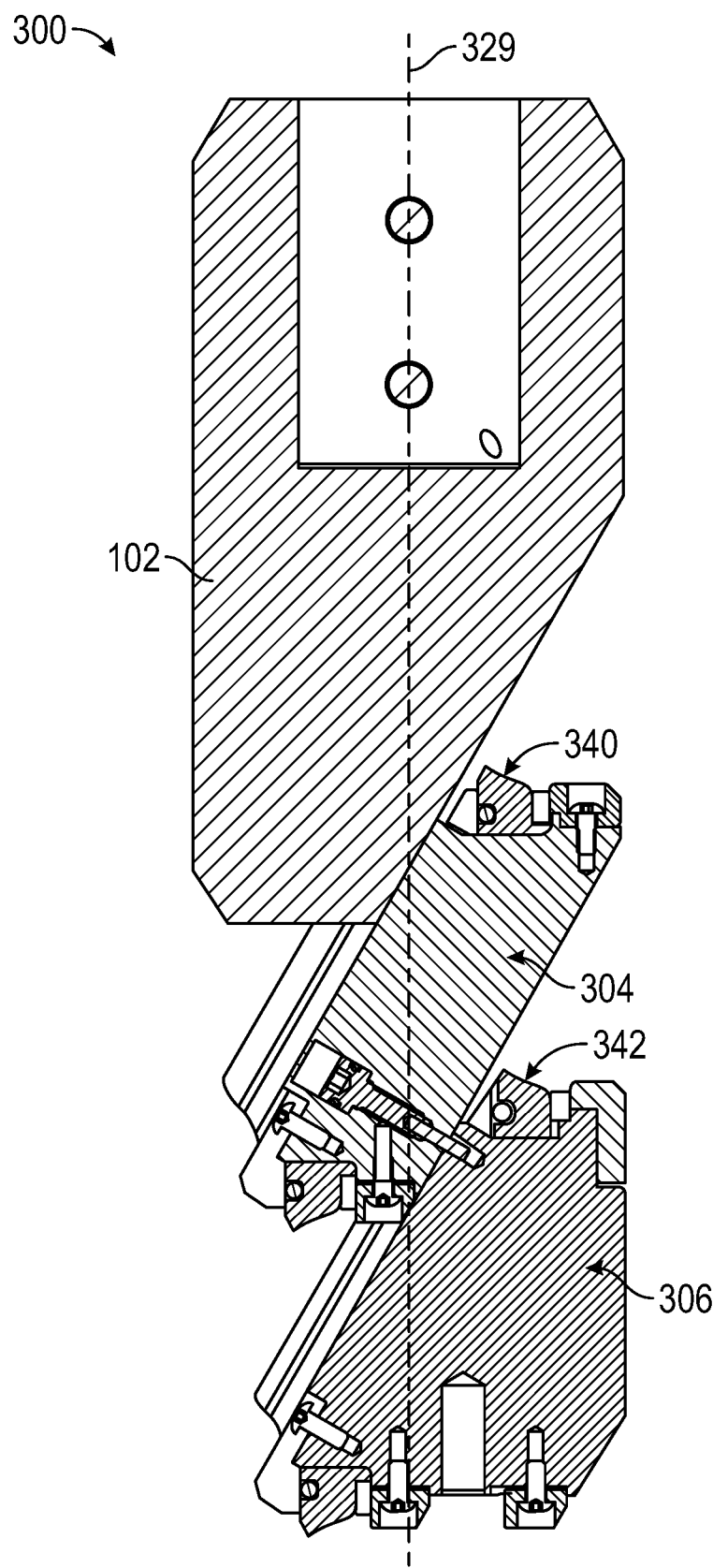
FIG. 26 is a cross-sectional view taken along line 26-26 in FIG. 25.

Referring to FIGS. 24-26, another embodiment of a pipe isolation device is shown, and is referred to as pipe isolation device 300. Like part numbers of embodiments of the pipe isolation devices 100, 200, 300 are labeled with like reference numbers. Pipe isolation device 300 is moveable between the fully set position, as shown in FIG. 24, and the fully retracted position, as shown in FIGS. 25-26. Pipe isolation device 300 moves between the fully retracted position and the fully set position in a similar manner as described with respect to the pipe isolation device 100. Pipe isolation device 300 includes control bar head 102, a first sealing head 304, and a second sealing head 306. First sealing head 304 includes a first seal assembly 340 and the second sealing head 306 includes a second seal assembly 342. A center axis 380 extends through the sealing heads 304, 306 and is perpendicular a vertical axis 329 extending through the control bar head 102. In some embodiments, the center axis 380 may form a centerline for a pipe in which the pipe isolation device 300 is deployed in the fully set position.

Figure 27:
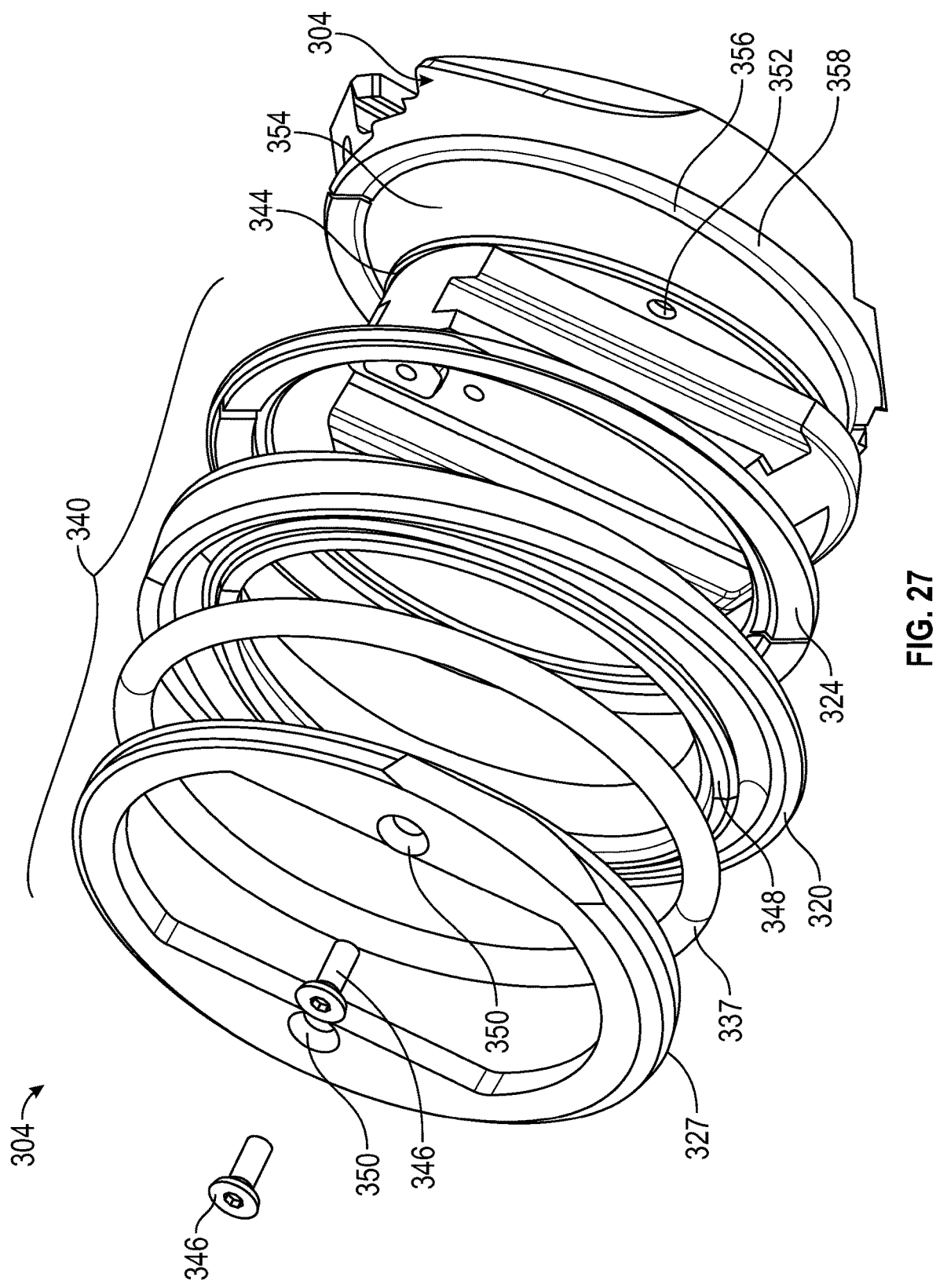
FIG. 27 is an exploded view of the first sealing head in accordance with embodiments of the present disclosure.

Referring to FIG. 27, an exploded view of an embodiment of the first seal assembly 340 disassembled from the first main body 344 of the first sealing head 304 is shown. First main body 344 may have a cylindrical shape. First seal assembly 340 includes a first seal element 320, a first retaining ring 327, a first stiffening ring 337, and a first nose ring 324. Mechanical fasteners 346, such as screws or bolts, may be used in securing components of the first seal assembly 340 together. In some embodiments, the mechanical fasteners 346 may extend through fastener openings 350 in the first retaining ring 327 and into mating attachment openings 352 in the first main body 344 to secure the first seal assembly 340 in an assembled position, as shown in FIGS. 24-26. One attachment opening 352 in the first main body 344 is shown in FIG. 27. Seal elements 320, 322 may be bonded or glued in the seal assemblies 340, 342. For example, the seal elements 320, 322 may be bonded or glued to the main bodies 344, 362, the nose rings 324, 326, and the retaining rings 327, 328.

First main body 344 includes a first outer surface 354 extending around the circumference of the first main body 344. First outer surface 354 forms an outer diameter (OD) of the first main body 344. First main body 344 further includes a first face 356, also referred to as a primary first face, that extends radially from the first outer surface 354 and extends around the circumference of the first main body 344. First face 356 may be suitably transverse to the center axis 380, shown in FIG. 24, that extends through the sealing heads 104, 106. The transverse orientation of the first face 356 to the center axis 380 is continuous around the circumference of the first main body 344. First main body 344 further includes a second face 358, also referred to as a primary second face, that extends radially from the first main body 344 and extends around the circumference of the first main body 344. Second face 358 also may be suitably transverse to the center axis 380, as shown in FIG. 27, that extends through the sealing heads 104, 106. The transverse orientation of the second face 358 to the center axis 380 is continuous around the circumference of the first main body 344.

Figure 28:
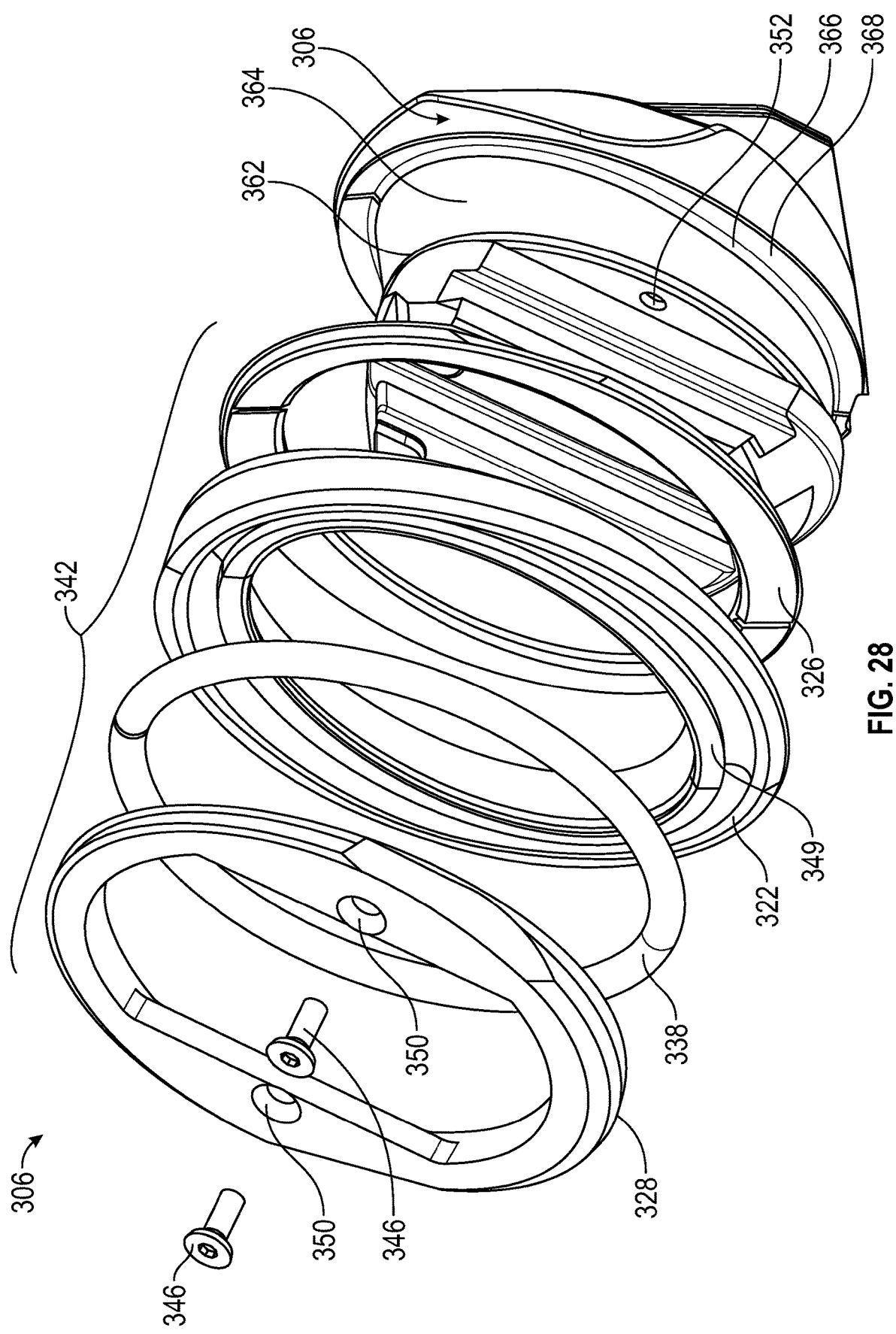
FIG. 28 is an exploded view of the second sealing head in accordance with embodiments of the present disclosure.

Referring to FIG. 28, an exploded view of an embodiment of the second seal assembly 342 disassembled from a second main body 362 of the second sealing head 306 is shown. Second main body 362 may have a cylindrical shape. Second seal assembly 342 may include a second seal element 322, a second retaining ring 328, a second stiffening ring 338, and a second nose ring 326. In this example, second seal element 322 has a seal front face formed by a second front face 349. Mechanical fasteners 346, such as screws, may be used in securing components of the second seal assembly 342 together. In some embodiments, the mechanical fasteners 346 may extend through fastener openings 350 in the second retaining ring 328 and into mating attachment openings 352 in the second main body 362 to secure the second seal assembly 342 in an assembled position, as shown in FIGS. 24-26. One attachment opening 352 in the second main body 362 is shown in FIG. 28.

Seal elements 320, 322 may be bonded or glued in the seal assemblies 340, 342. For example, the seal elements 320, 322 may be bonded or glued to the main bodies 344, 362, the nose rings 324, 326, and the retention rings 327, 328. To aid with installation of the seal elements 320, 322 onto the main bodies 344, 362 of the seal assemblies 340, 342, the retaining rings 327, 328 may be split into several segments, and the stiffening rings 337, 338 may be made integral with the retaining rings 327, 328. Seal elements 320, 322 may also undergo a heat treatment, normalizing or softening process.

Second main body 362 includes a second outer surface 364 extending around the circumference of the second main body 362. Second outer surface 364 forms an outer diameter (OD) of the second main body 362. Second main body 362 further includes a first face 366, also referred to as a secondary first face, that extends radially from the second outer surface 364 and extends around the circumference of the second main body 362. First face 366 may be suitably transverse to the center axis 380, shown in FIG. 24, that extends through the sealing heads 104, 106. The transverse orientation of the first face 366 to the center axis 380 is continuous around the circumference of the second main body 362. Second main body 362 further includes a second face 368, also referred to as a secondary second face, that extends radially from the second main body 362 and extends around the circumference of the second main body 362. As shown in FIG. 28, second face 368 also may be suitably transverse to the center axis 380 that extends through the sealing heads 304, 306. The transverse orientation of the second face 368 to the center axis 380 is continuous around the circumference of the second main body 362.

Figure 29:
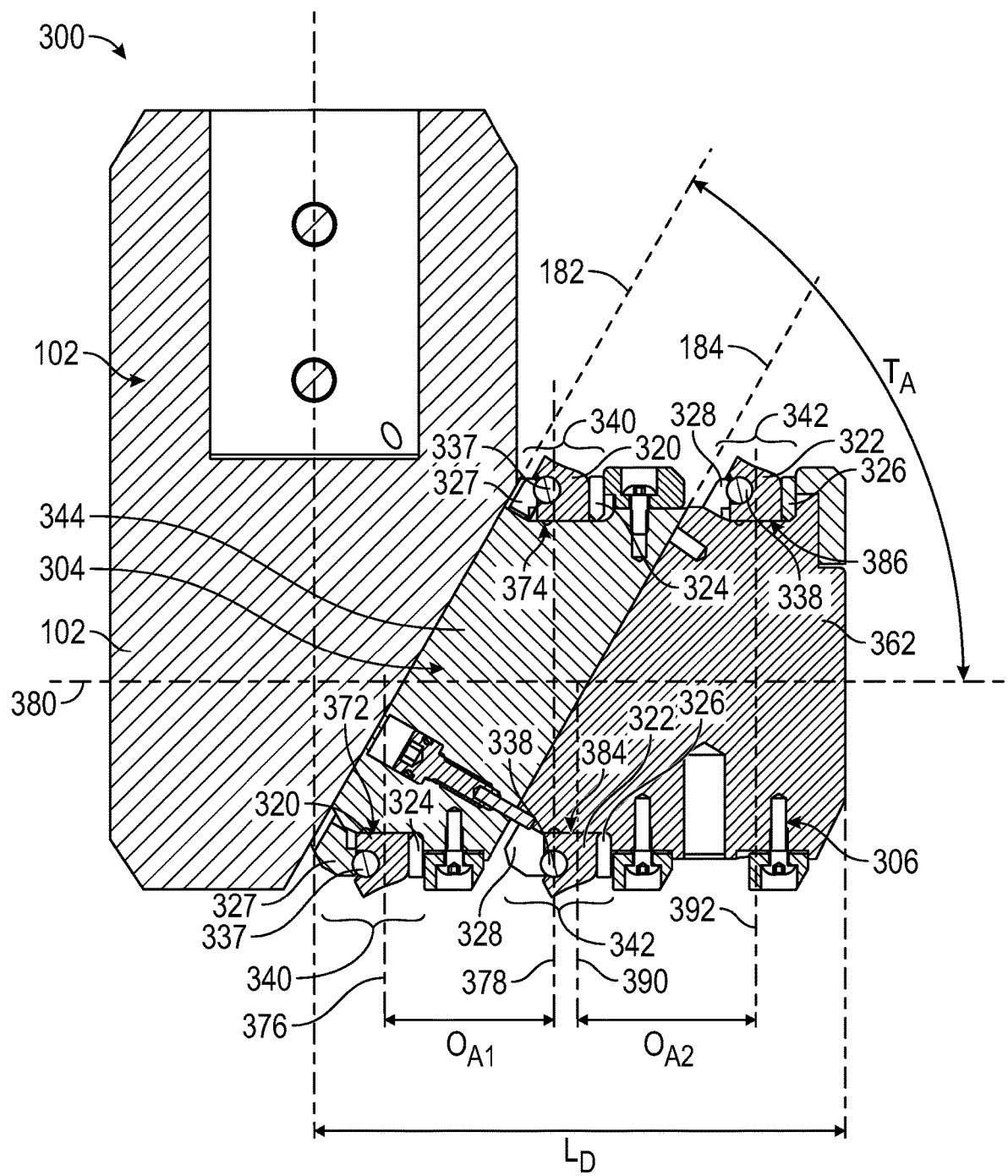
FIG. 29 is a side, cross-sectional view of the pipe isolation device in accordance with embodiments of the present disclosure.

Referring to FIG. 29, a cross-sectional view of the pipe isolation device 300 is shown in the fully set position. First seal assembly 340 has a first axially-offset configuration on the first sealing head 304. In the first axially-offset configuration, the first seal assembly 340 surrounds the first main body 344 in an elliptical shape, as shown in FIG. 27. A first bottom section 372 of the first seal assembly 340 is located on the first main body 344 at a bottom circumferential location on the circumference of the first main body 344 and at a first axial position parallel to the center axis 380. A first top section 374 of the first assembly 340 is positioned at a top circumferential location on the circumference of the first main body 344 and at a second axial position parallel to the center axis 380. First bottom section 372 may include component bottom sections of the first seal element 320, the first retaining ring 327, the first stiffening ring 337, and the first nose ring 324. First top section 374 may include component top sections of the first seal element 320, the first retaining ring 327, the first stiffening ring 337, and the first nose ring 324.

The bottom circumferential location and the top circumferential location are opposite one another on the first main body 344. As shown in FIG. 29, the bottom circumferential location of the first bottom section 372 of the first seal assembly 340 is at a bottom portion of the first main body 344 and the top circumferential location of the first top section 374 of the first seal assembly 340 is at a top portion of the first main body 344.

The axial-offset configuration of the first seal assembly 340 is illustrated by a first assembly axis 376 and a second assembly axis 378 shown in FIG. 29. First assembly axis 376 is perpendicular to the center axis 380 and extends through the first bottom section 372. Second assembly axis 378 is perpendicular to the center axis 380 and extends through the first top section 374. As shown in FIG. 29, the first assembly axis 376 may extend through a center of the section of the first seal element 320 in the first bottom section 372. Second assembly axis 378 may extend through a center of the section of the first seal element 320 in the first top section 374. The axial-offset length for the axial-offset configuration of the first seal assembly 340 is designated as $O_{A1}$ in FIG. 29. In some embodiments, the axial-offset length $O_{A1}$ is such that the first bottom section 372 is fully axially offset from the first top section 374 where the first bottom section 372 does not underlie any portion of the first top section 374. For example and as shown in FIG. 29, the component bottom sections of the first seal element 320, the first retaining ring 327, the first stiffening ring 337, and the first nose ring 324 are axially offset and do not underlie any portion of the component top sections of the first seal element 320, the first retaining ring 327, the first stiffening ring 337, and the first nose ring 324. In some embodiments, the axial-offset length $O_{A1}$ is such that the first bottom section 372 is partially axially offset from the first top section 374 where the first bottom section 372 underlies a portion of the first top section 374.

In the illustrated embodiment, second seal assembly 342 has a second axially-offset configuration on the second sealing head 306. In the second axially-offset configuration, the second seal assembly 342 surrounds the second main body 362 in an elliptical shape on the second main body 362. A second bottom section 384 of the second seal assembly 342 is located on the second main body 362 at the bottom circumferential location on the circumference of the second main body 362 and at a third axial position parallel to the center axis 380. A second top section 386 of the second seal assembly 342 is positioned at the top circumferential location on the circumference of the second main body 362 and at a fourth axial position parallel to the center axis 380. Second bottom section 384 may include component bottom sections of the second seal element 322, the second retaining ring 328, the second stiffening ring 338, and the second nose ring 326. Second top section 386 may include component top sections of the second seal element 322, the second retaining ring 328, the second stiffening ring 338, and the second nose ring 326.

The bottom circumferential location and the top circumferential location on the circumference of the second main body 362 are opposite one another on the second main body 362. As shown in FIG. 29, the bottom circumferential location of the second bottom section 384 of the second seal assembly 342 is at a bottom portion of the second main body 362 and the top circumferential location of the second top section 386 of the second seal assembly 342 is at a top portion of the second main body 362.

The axial-offset configuration of the second seal assembly 342 is illustrated by a third assembly axis 390 and a fourth assembly axis 392 shown in FIG. 29. Third assembly axis 390 is perpendicular to the center axis 380 and extends through the second bottom section 384. Fourth assembly axis 392 is perpendicular to the center axis 380 and extends through the second top section 386. As shown in FIG. 29, the third assembly axis 390 may extend through a center of the section of the second seal element 322 in the second bottom section 384. Fourth assembly axis 392 may extend through a center of the section of the second seal element 322 in the second top section 386. The axial-offset length for the axial-offset configuration of the second seal assembly 342 is designated as $O_{A2}$ in FIG. 29. In some embodiments, the axial-offset length $O_{A2}$ is such that the second bottom section 384 is fully axially offset from the second top section 386 where the second bottom section 384 does not underlie any portion of the second top section 386. For example and as shown in FIG. 29, the component bottom sections of the second seal element 322, the second retaining ring 328, the second stiffening ring 338, and the second nose ring 326 are axially offset and do not underlie any portion of the component top sections of the second seal element 322, the second retaining ring 328, the second stiffening ring 338, and the second nose ring 326. In some embodiments, the axial-offset length $O_{A2}$ is such that the second bottom section 384 is partially axially offset from the second top section 386 where the second bottom section 384 underlies a portion of the second top section 386.

The axially-offset configuration of the first seal assembly 340 provides the benefit of helping to provide a compact first sealing head 304 and a compact deployed length for the pipe isolation device 300. The sliding engagement between the control bar head 102 and the first sealing head 304 creates a first track axis 182 and a first main body 344 with limited space for the first seal assembly 340. The axially-offset configuration of the second seal assembly 342 provides the benefit of helping to provide a compact second sealing head 306 and a compact deployed length $L_D$ for the pipe isolation device 300. The sliding engagement between the first sealing head 304 and the second sealing head 306 creates the second track axis 184 and a second main body 346 with limited space for the second seal assembly 342.

Seal assemblies 340, 342 are configured with axial-offset configurations to help provide the compact sealing heads 304, 306 that allow for a compact deployed length $L_D$ for the pipe isolation device 300. As discussed previously, limiting the deployed length $L_D$ helps prevent damage to a pipe due to the reaction loads of the pipe isolation device 300 against the pipe during operation of the pipe isolation device 300 in the pipe. In some embodiments, pipe isolation devices may have seal elements that are circular and mounted on sealing heads such that the seal elements have perpendicular configurations without an axial offset.

Figure 30:
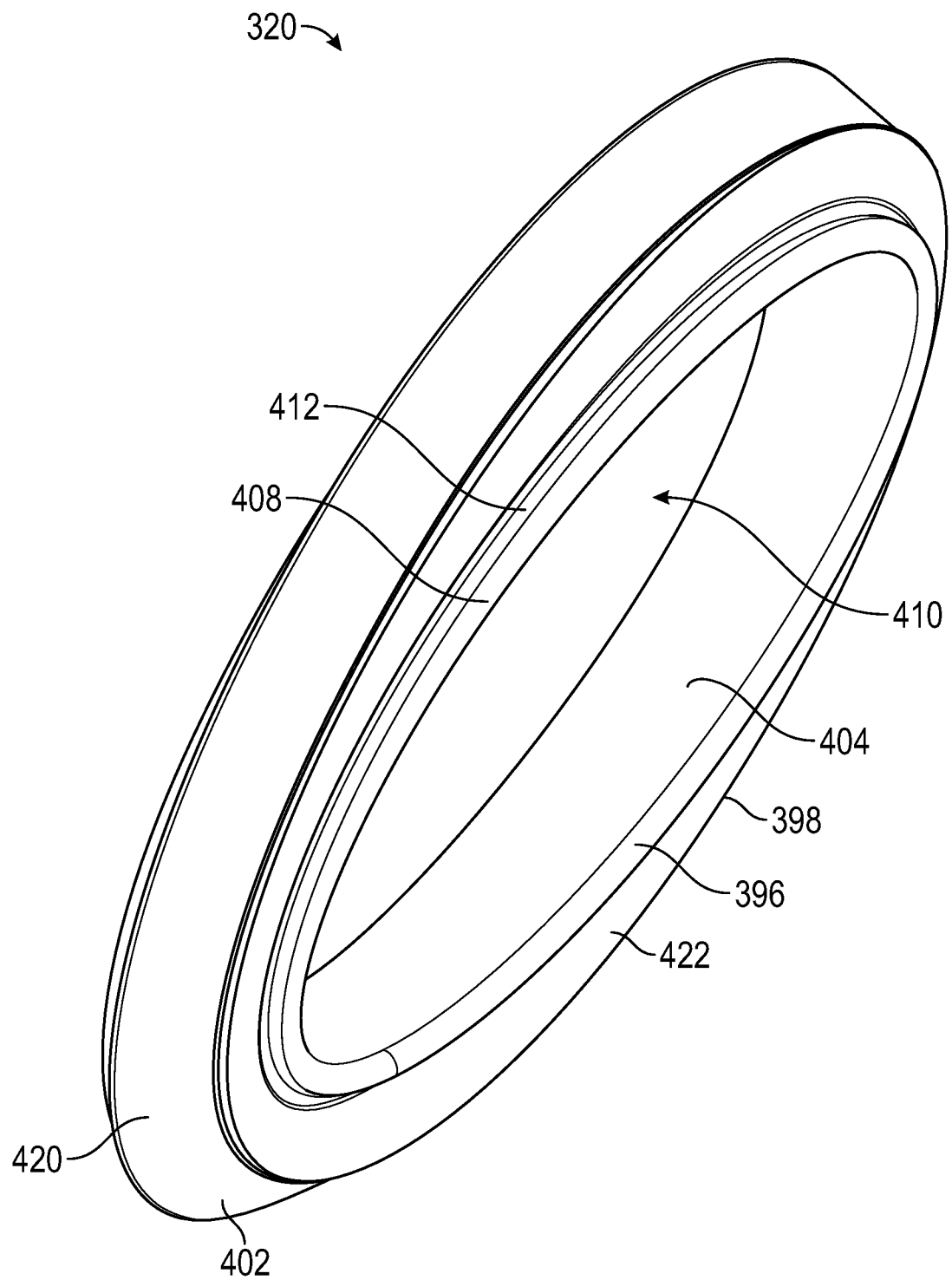
FIG. 30 is a back, perspective view of a first seal element in an installed configuration in accordance with embodiments of the present disclosure.
Figure 31:
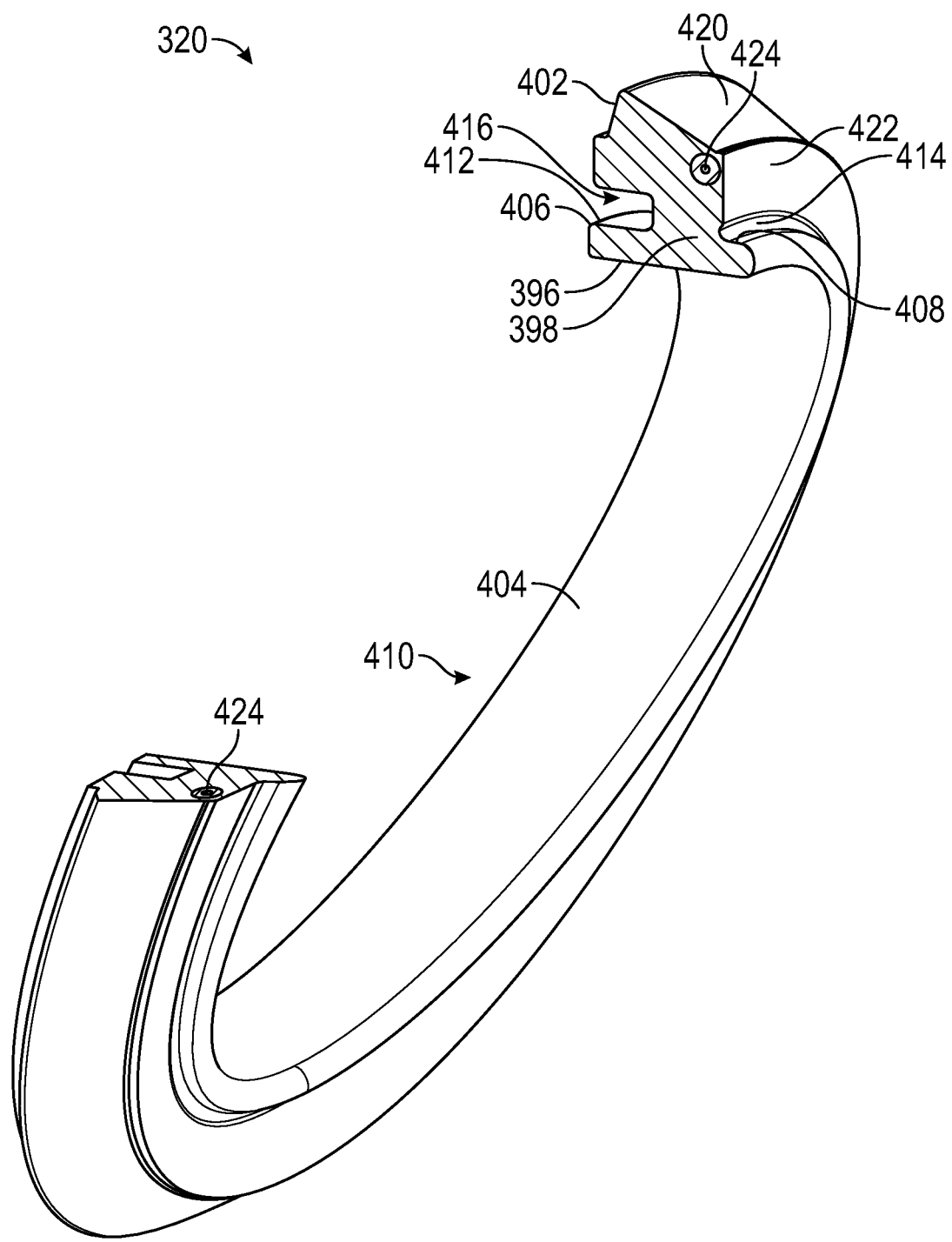
FIG. 31 is a partial, quarter-sectional view of the first seal element in an installed configuration in accordance with embodiments of the present disclosure.

Referring to FIGS. 30-31, an embodiment of the first seal element 320 is shown. Second seal element 322 may be configured in a similar manner as the embodiment described with respect to the first seal element 320 shown in FIGS. 30-31. FIGS. 30-31 show the orientation of the first seal element 320 when assembled on the pipe isolation device 300 in the fully set position, as shown in FIG. 29. First seal element 320 may be made of an elastomeric material and may be stretchable. First seal element 320 may be stretched during assembly to mount the first seal element 320 on the first main body 344. First seal element 320 is in the installed configuration where the first seal element has been stretched to form an elliptical shape and is mounted on the first main body 344. First seal element may have an uninstalled configuration where the first seal element has a circular shape and has not been stretched and mounted on the first main body 344. When being installed on the first main body 344, the first seal element may be stretched from the circular position to the elliptical position to mount the first seal element on the first main body 344. In some embodiments, the first seal element is twisted and stretched when positioning the first seal element from the uninstalled configuration to the installed configuration so that the first seal element has a perpendicular configuration, as described below.

First seal element 320 includes a base section 396, an extension section 398, and a flair section 402. Base section 396, as shown in FIG. 31, has an inner surface 404, a first ledge 406, and a second ledge 408 that extend around a first seal opening 410. Inner surface 404 is configured to abut against the first main body 344 when the first seal element 320 is assembled on the first sealing head 304. Inner surface 404 forms the inner diameter (ID) of the first seal element 320. First ledge 406 forms a first outer surface 412 and second ledge 408 forms a second outer surface. 414. Outer surfaces 412, 414 may be parallel to the inner surface 404 of the base section 396. A stiffening ring pocket 416 is formed by the first ledge 406 and the extension section 398 and configured for the stiffening ring 338 to fit therein and extend around the first ledge 406.

Extension section 398 is formed radially between the base section 396 and the flair section 402 and extends outwards from the base section 396. Flair section 402 includes a seal outer surface 420 that extends around seal opening 410. Seal outer surface 420 forms the outer diameter (OD) of the first seal element 320. Extension section 398 further has a seal back face 422 that may extend from the base section 396 to the seal outer surface 420. Seal back face 422 is the non-pressurized side of the seal element 320.

In some embodiments, an anti-extrusion device may be used with the first seal element 320. For example, the anti-extrusion device may be formed by a garter spring 424. Garter spring 424 may be embedded in the first seal assembly 320. Ends of the garter spring 424 are shown in FIG. 31. In some embodiments, the garter spring 424 may be formed by a coil spring that may fully encircle the seal opening 410.

Figure 32:
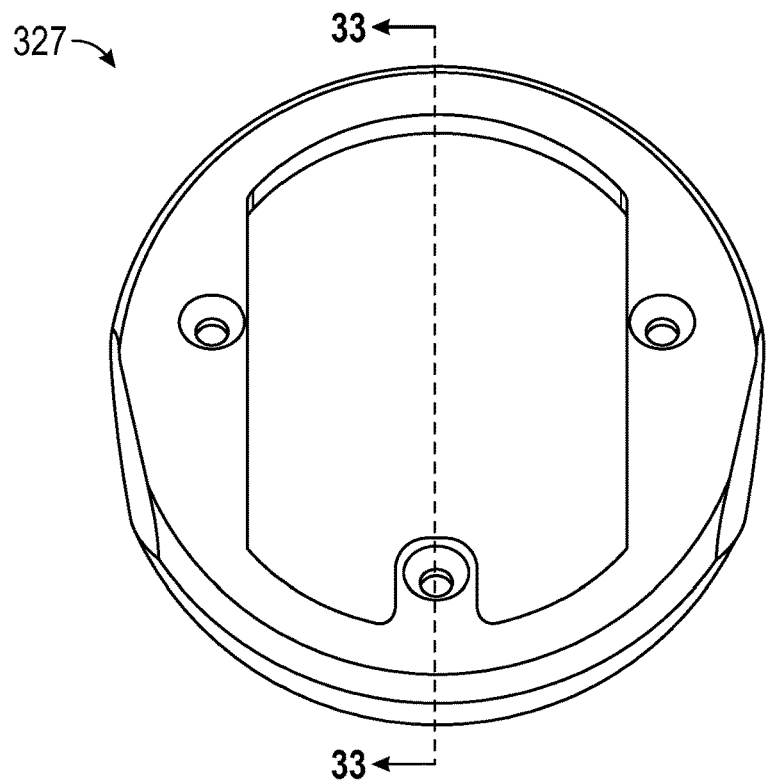
FIG. 32 is a front view of a first retaining ring in accordance with embodiments of the present disclosure.
Figure 33:
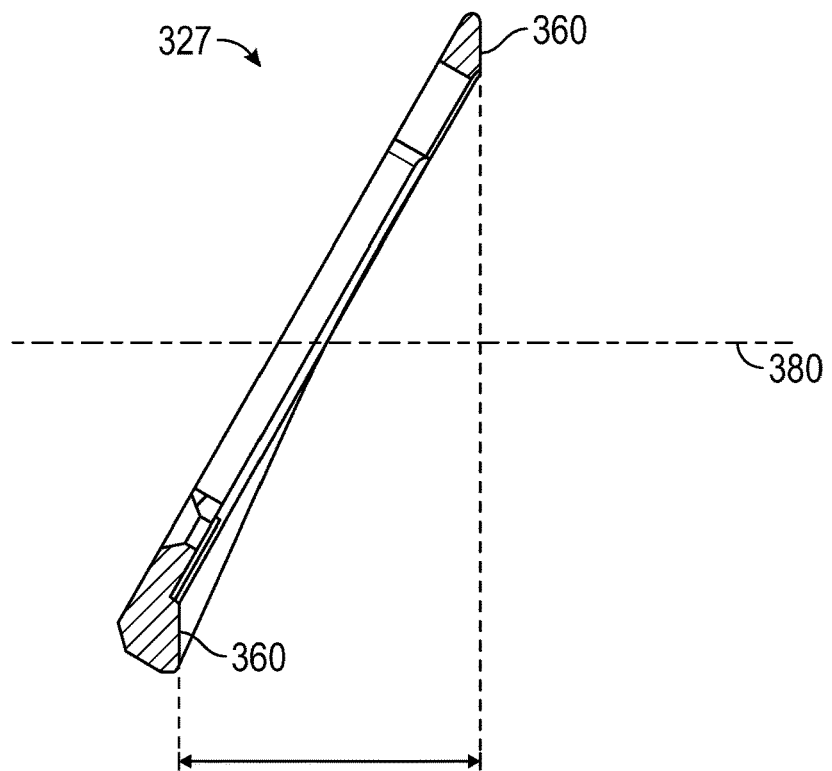
FIG. 33 is a cross-sectional view taken along line 33-33 in FIG. 32.

Referring to FIGS. 32-33, an embodiment of the first retaining ring 327 is shown. Second retaining ring 328 may be configured in a similar manner as the embodiment described with respect to the first retaining ring 327 shown in FIGS. 32-33. First retaining ring 327 may be made of a metallic material. First retaining ring 327 has an elliptical shape. FIG. 33 shows the orientation of the first retaining ring 327 when assembled on the pipe isolation device 300 in the fully set position, as shown in FIG. 29. First retaining ring 327 is shown in an installed orientation as if it were mounted on the first main body 344 with the center axis 380 extending through a retaining opening of the first retaining ring. First retaining ring may have a ring support face 360 that is perpendicular to the center axis 380 when in the assembled position. Ring support face 360 abuts against one side of the first seal element 320 to support the first seal element in a perpendicular configuration in the assembled position. Ring support face 360 continues around the circumference of the first retaining ring and is continuously perpendicular to the center axis 380 in the assembled position.

Figure 34:
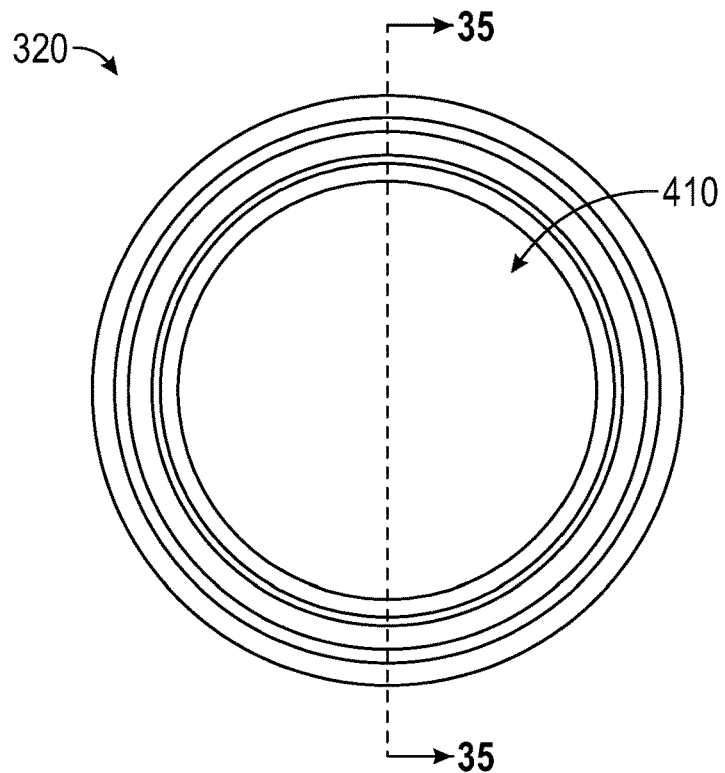
FIG. 34 is a back view of the first seal element in accordance with embodiments of the present disclosure.
Figure 35:
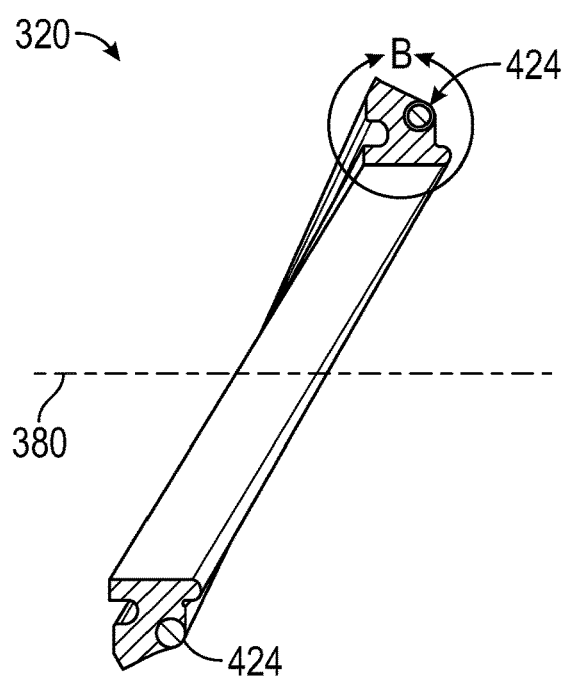
FIG. 35 is a cross-sectional view taken along line 35-35 in FIG. 34.

Referring to FIGS. 34-35, another embodiment of the first seal element 320 is shown. Second seal element 322 may be configured in a similar manner as the embodiment described with respect to the first seal element 320 shown in FIGS. 34-35. In this example, first seal element 320 may be made of an elastomeric material that may be stretched. FIG. 35 shows the orientation of the first seal element 320 when assembled on the pipe isolation device 300 in the fully set position, as shown in FIG. 29. First seal element 320 is shown in an installed orientation as if it were mounted on the first main body 344 with the center axis 380 extending through the seal opening 410 of the first seal element 320. The cross-section of the first seal assembly 320 has a perpendicular configuration to the center axis 380 when in the assembled position. The cross-section of the first seal assembly has a continuous perpendicular configuration to the center axis 380 around the circumference of the first main body 344 when in the assembled position.

Seal elements 320, 322 may be manufactured (typically molded) in a circular ring shape. Seal elements 320, 322 may be stretched into a twisted elliptical ring shape when installed on the main bodies 344, 362 of the seal assemblies 340, 342, as shown in FIG. 35. The stretched shape of the seal elements 320, 322 maintains a cross-section which is perpendicular to the pipe internal diameter around the circumference of the seal elements 320, 322, even though the tops of the seal elements 320, 322 are seated at a position further axially down the pipe than where the bottoms of the seal elements 320, 322 are seated, as described with respect to FIG. 29. A first garter spring 424 may be embedded in the body of the first seal element 320 and may be made of a metallic material. Ends of the first garter spring 424 may linked with like material or a seamless spring may be used. Garter spring 424 may be installed with no preload.

Figure 36:
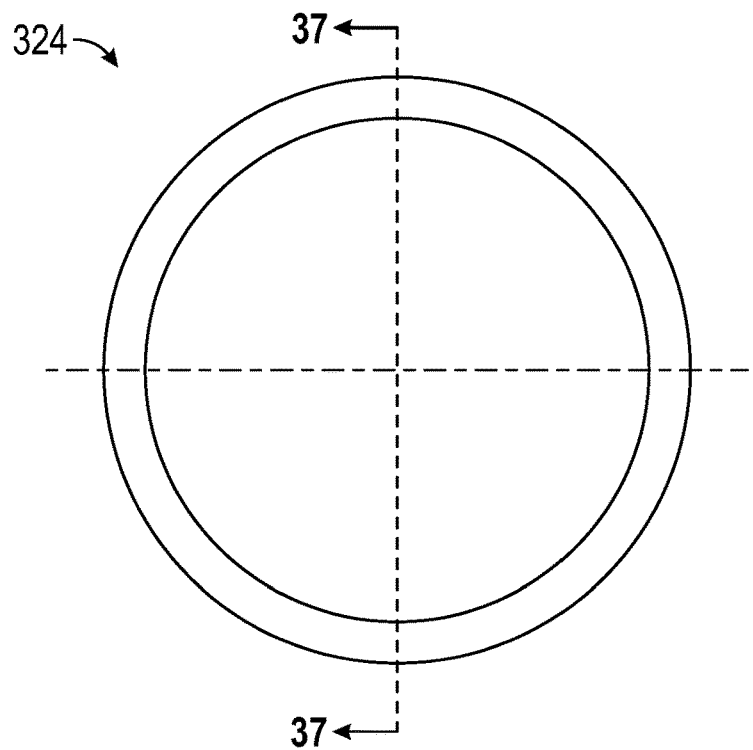
FIG. 36 is a front view of a first nose ring in accordance with embodiments of the present disclosure.
Figure 37:
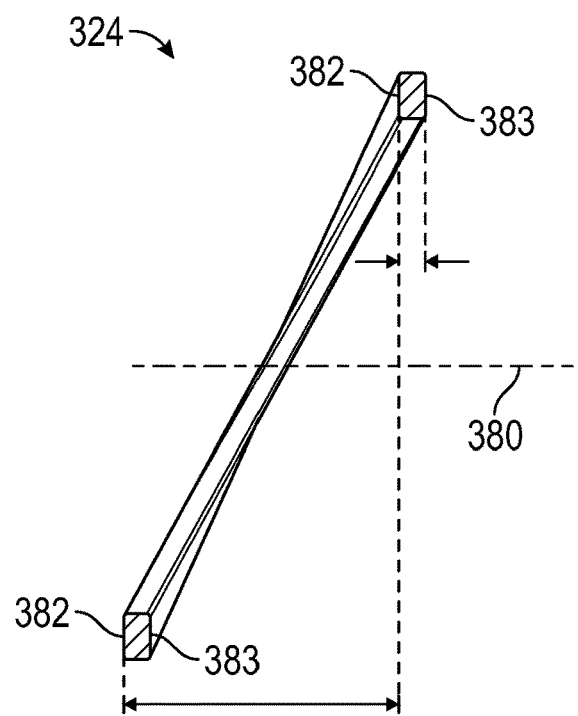
FIG. 37 is a cross-sectional view taken along line 37-37 in FIG. 36.

Referring to FIGS. 36-37, an embodiment of the first nose ring 324 is shown. Second nose ring 326 may be configured in a similar manner as the embodiment described with respect to the first nose ring 324 shown in FIGS. 36-37. First nose ring 324 may be made of a metallic material and may have an elliptical shape. FIG. 37 shows the orientation of the first nose ring 324 when assembled on the pipe isolation device 300 in the fully set position, as shown in FIG. 29. First nose ring 324 is shown in an installed orientation as if it were mounted on the first main body 344 with the center axis 380 extending through a nose ring opening of the first nose ring 324. In this example, first nose ring 324 has a first nose face 382 and a second nose face 383 that are perpendicular to the center axis 380 when in the assembled position. First nose face 382 abuts against one side of the first seal element 320 and second nose face 383 abuts against a face of the first main body 344 to support the first seal element 320 in a perpendicular configuration in the assembled position, see FIGS. 37-41. First nose face 382 and the second nose face 383 continue around the circumference of the first nose ring 324 and are continuously perpendicular to the center axis 380 in the assembled position.

Figure 38:
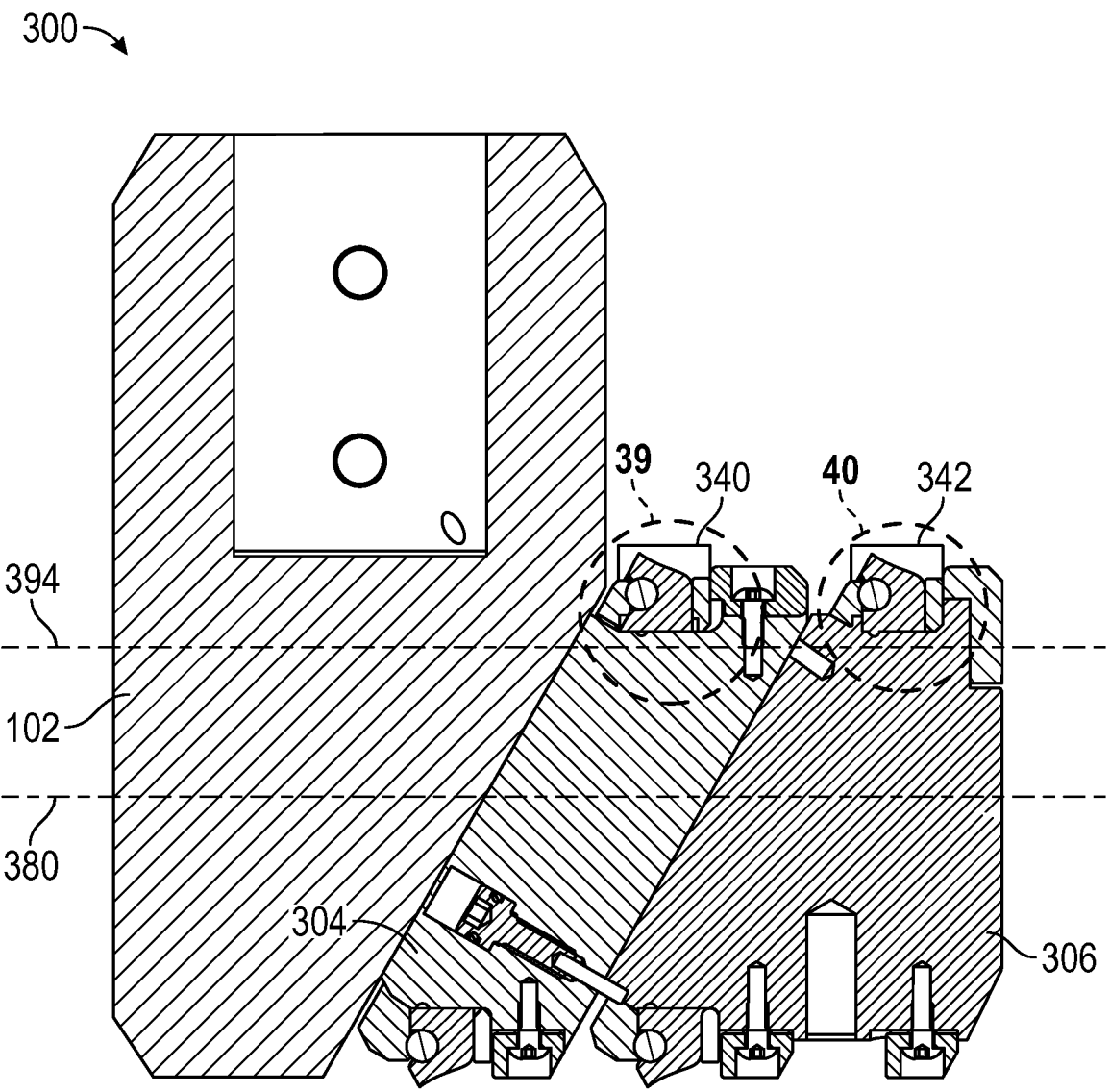
FIG. 38 is a side, cross-sectional view of the pipe isolation device in the fully set position in accordance with embodiments of the present disclosure.
Figure 39:
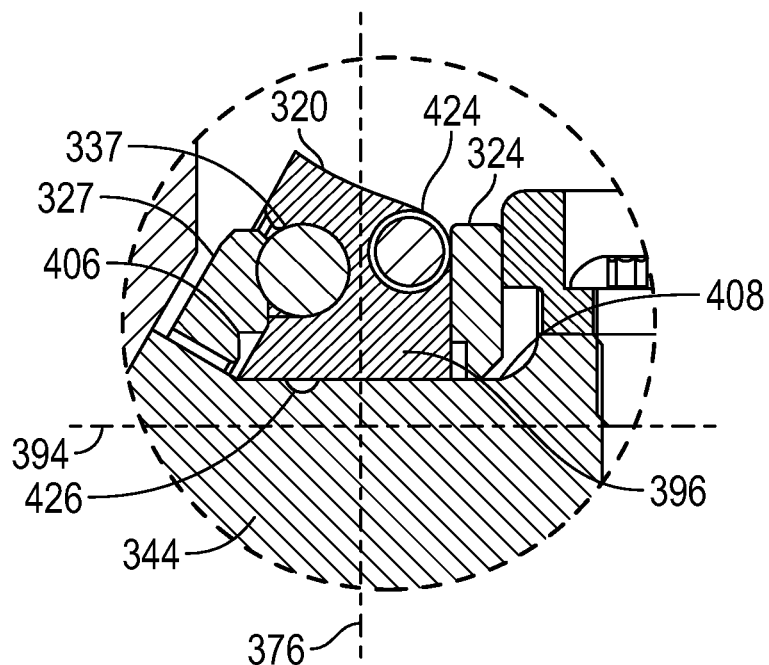
FIG. 39 is an enlarged cross-sectional view of the circled area "39" in FIG. 38.
Figure 40:
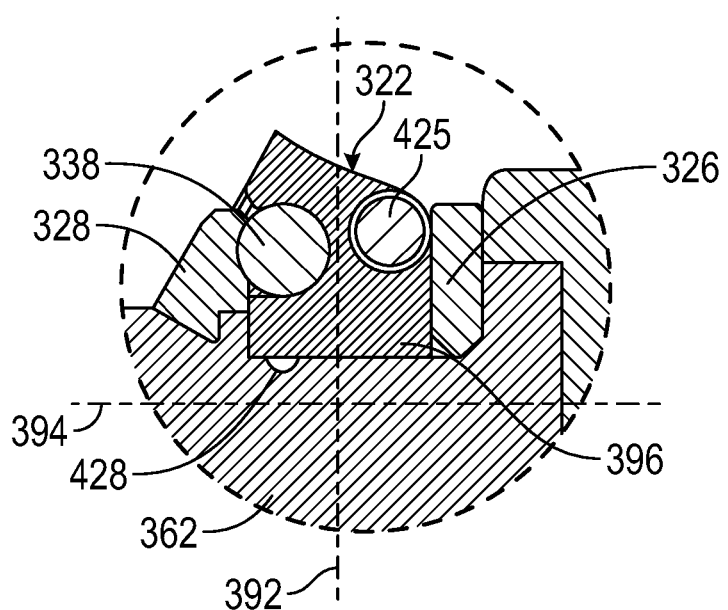
FIG. 40 is an enlarged cross-sectional view of the circled area "40" in FIG. 38.

Referring to FIG. 38, a cross-sectional view of the pipe isolation device 300 is shown in the fully set position. A cross-sectional view of the first seal assembly 340 is circled and FIG. 39 is an enlarged cross-sectional view of the circled area "39" in FIG. 38. A cross-sectional view of the second seal assembly 342 is circled and FIG. 40 is an enlarged cross-sectional view of the circled area "40" in FIG. 38. A first parallel axis 394 is shown extending through the circled area "39" and the circled area "40". First parallel axis 394 is parallel to the center axis 380.

Referring to FIG. 39, an embodiment of the first seal assembly 340 on the first sealing head 304 is shown. The internal diameter of the base section 396 of the first seal element 320 abuts the first outer surface 354, shown in FIG. 27, of the first main body 344. In some embodiments, first seal element 320 is configured to have a perpendicular configuration with respect to the first parallel axis 394. Extension section 398 extends radially outwards from the base section 396 and in a direction perpendicular to the first parallel axis 394 to form the perpendicular configuration. The perpendicular configuration of the first seal element is formed continuously around the first main body 344.

Stiffening ring 337 may be disposed in the stiffening ring pocket 416 and extends around the seal opening 410, shown in FIGS. 30-31, to provide additional strength to the first seal element 320. First retaining ring 327 may be disposed on one side of the first seal element 320 to secure the stiffening ring 337 and the first seal element 320 in place on the first main body 344. First retaining ring 327 may abut against the stiffening ring 337 and the first seal element 320 to block the stiffening ring pocket 416, shown in FIG. 31. First retaining ring 327 may extend from a surface of the first main body 344 that is at a non-parallel angle with respect to the first parallel axis 394 so that the first retaining ring 327 extends at an angle from the first main body 344 towards the first sealing element 320.

First seal element 320 and first retaining ring 327 may have a first inter-locking feature where the first retaining ring 327 has a surface that extends over and abuts the first ledge 406. First nose ring 324 extends radially outwards from the first main body 344 and adjacent a side of the first sealing element 320. First nose ring 324 may abut the side of the first seal element 320. First seal element 320 and first nose ring 324 may have a second inter-locking feature where the first nose ring 324 has a surface that extends over and abuts the second ledge 408. First nose ring 324 may extend radially from the first main body 344 in a perpendicular direction with respect to first parallel axis 394 and may be disposed adjacent to the garter spring 424 in the first sealing element 320.

First sealing element 320 may further include an internal diameter (ID) sealing feature for providing a second seal between the first sealing element 320 and the first main body 344 of the first sealing head 304. The ID sealing feature provides an interference fit and may be located on the front, back, or ID of the first seal element 322. The ID sealing feature may seal against the first main body 344, the first nose ring 324, or the first retaining ring 327. In the embodiment shown in FIGS. 39-40, the ID sealing feature is formed by a first ID sealing ring 426 that extends from the ID of the first sealing element 320. First ID sealing ring 426 may be integral with the first sealing element 320 or may be a separate ring that extends around the first main body 344. First sealing element 320 is disposed between the first retaining ring 327 and the first nose ring 324 to secure the first sealing element 320 in place around the first main body 344. Mechanical fasteners may be used to press the first retaining ring 327 and the first nose ring 324 against the first seal element 320 to press fit the first seal element 320 in place on the first main body 344.

Referring to FIG. 40, an embodiment of the second seal assembly 342 on the second sealing head 306 is shown. Embodiments of the second seal assembly disclosed may be used on the first sealing head 104 and/or the second sealing head 106. The inner diameter of base section 396 of the second seal element 322 abuts the second outer surface 364, shown in FIG. 28, of the second main body 362. In some embodiments, second seal element 322 is configured to have a perpendicular configuration with respect to the first parallel axis 394. Extension section 398 extends radially outwards from the base section 396 and in a direction perpendicular to the first parallel axis 394 to form the perpendicular configuration. The perpendicular configuration of the second seal element 322 is formed continuously around the second main body 362.

Second stiffening ring 338 is disposed in the stiffening ring pocket 416 and extends around the seal opening 410, shown in FIGS. 30-31, to provide additional strength to the second seal element 322. Second retaining ring 328 is disposed on one side of the second sealing element 322 to secure the second stiffening ring 338 and the second seal element 322 in place on the second main body 362. Second retaining ring 328 may abut against the second stiffening ring 338 and the second seal element 322. Second retaining ring 328 may extend from a surface of the second main body 362 that is at a non-parallel angle with respect to the first parallel axis 394 so that the second retaining ring 328 extends at an angle from the second main body 362 towards the second sealing element 322.

Second nose ring 326 extends radially outwards from the second main body 362 and adjacent a side of the second sealing element 322. Second nose ring 326 may abut a side of the second seal element 322. Second nose ring 326 may extend radially from the second main body 362 in a perpendicular direction with respect to first parallel axis 394 and may be disposed adjacent to a second garter spring 425 in the second sealing element 322. Second sealing element 322 is disposed between the second retaining ring 328 and the second nose ring 326 to secure the second sealing element 322 in place around the second main body 362. Mechanical fasteners may be used to press the second retaining ring 328 and the second nose ring 326 against the second seal element 322 to press fit the second seal element 322 in place on the second main body 362.

Second sealing element 322 may further include an internal diameter (ID) sealing feature for providing a second seal between the second sealing element 322 and the second main body 362 of the second sealing head 306. The ID sealing feature provides an interference fit and may be located on the front, back, or ID of the first seal element 322. The ID sealing feature may seal against the second main body 362, the second nose ring 326, or the second retaining ring 328. In the embodiment shown in FIG. 40, the ID sealing feature is formed by a second sealing ring 428 that extends from the ID of the second sealing element 322. Second sealing ring 428 may be integral with the second sealing element 322 or may be a separate ring that extends around the second main body 362.

Figure 41:
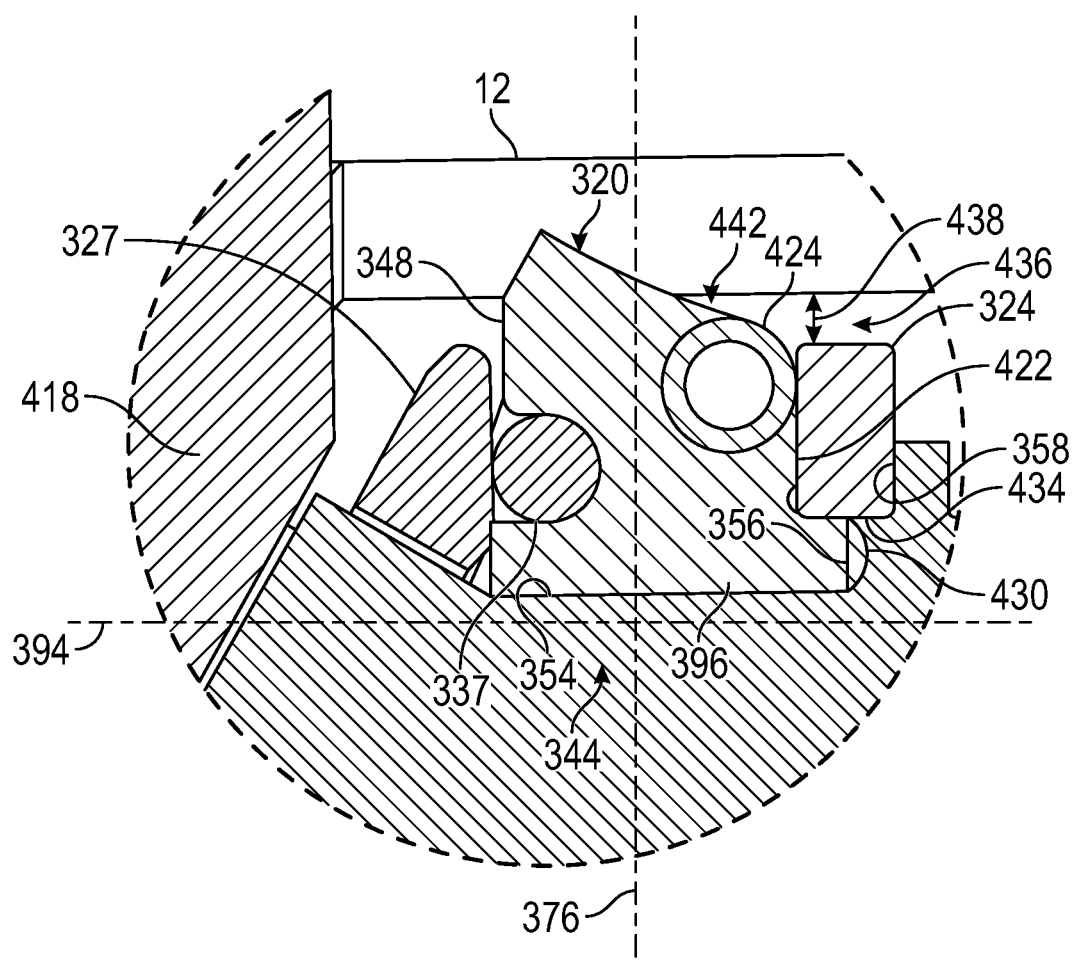
FIG. 41 is a cross-sectional view of a portion of the first seal assembly in a pipe in accordance with embodiments of the present disclosure.

Referring to FIGS. 38 and 41, an embodiment of the first seal assembly 340 on the first sealing head 304 in a pipe 12 is shown. The embodiment disclosed with respect to FIG. 41 is shown assembled on the first sealing head 304 but may also be assembled on the second sealing head 306. The OD of the seal element 320 provides an interference fit in the pipe which forms a seal. The frontside of the seal element 320 is the pressurized side, while the backside of the seal element 320 is the non-pressurized side.

Fluid pressure in the pipe 12 is shown directed in a forward direction by arrow 418. First front face 348 is disposed on the pressurized side of the first seal element 320. The internal diameter of the base section 396 of the first seal element 320 abuts the first outer surface 354, shown in FIG. 27, of the first main body 344. In other words, the ID of the first seal element 320 sits on the cylindrical surface of the first main body 344 of the first sealing head 304. The cylindrical surface of the first main body 344 in which the seal element 320 seats forms part of a gland. The gland includes surfaces 354, 356, as well as the seal-side surfaces of the retaining ring 327 and nose ring 324. The gland conforms to the stretched shape of the seal element 320. Seal element 320 sits between the first nose ring 324 (on the back side of the seal element 320) and the first retainer ring 327 (on the frontside of the seal element 320).

First seal element 320 includes an embodiment of the ID sealing feature formed by an ID sealing ring 430 disposed between the base section 396 of the first seal element 320 and the primary first face 356 of the first main body 344. ID sealing ring 430 may be integral with the first seal element 320 or a separate ring extending around the first main body 344. ID sealing ring 430 is shown extending beyond the primary first face 356 to better illustrate the location of the ID sealing ring 430 that abuts against the primary first face 356 and is disposed between the first sealing element 320 and the primary first face 356.

First retention ring 327 and first stiffening ring 337 are configured in a similar manner as described with respect to the embodiments disclosed in FIGS. 39-40. First nose ring 324 extends radially outwards from the first main body 344 and adjacent a side of the first sealing element 320. A section of the ID of the nose ring 324 is supported by a body shoulder 434 of the first main body 344. In other words, a side of the first nose ring 324 abuts against an outer diameter (OD) of the body shoulder 434 and the primary second face 358 of the body shoulder 434. Nose ring 324 may also extend beyond the shoulder 434 to extend radially outwards from the base section 396 of the first seal element 320 to form an inter-locking feature.

The anti-extrusion device formed by the garter spring 424 may be disposed adjacent to the back seal face 422 and the first nose ring 324. Garter spring 424 is shown disposed below the pipe ID. An extrusion gap 436 is located between the first nose ring 324 and the pipe ID and is depicted by arrow 438. Garter spring 424 is positioned in the first seal assembly 340 so that the OD of the garter spring 424 is disposed below the pipe ID to form a clearance gap 442 between the garter spring OD and the pipe ID. Clearance gap 442 may be present when a first fluid pressure is on the first front face 348 of the first seal element 320, as shown in FIG. 41. As the fluid pressure in the pipe increases, a higher, second fluid pressure is placed against the first front face 348. The second fluid pressure may tend to expand the first seal element 320 and extrude the first seal element 320 into the seal gap 436. As the first seal element 320 expands, the garter spring 424 resists expansion and is configured to have an OD that is greater than the height of the extrusion gap so that the garter spring 424 is obstructed from passing through the extrusion gap 436 to help prevent extrusion of the first seal element 320.

Stiffening rings 337, 338 described with respect to embodiments shown in FIGS. 39-41 are a type of circumferential seal stiffener and can be installed in the stiffening ring pockets 416. Stiffening rings 337, 338 help prevent the seal elements 320, 322 from stretching and distorting, also referred to as bunching, while the seal elements 320, 322 travel through a branch opening of a pipe. There may be different embodiments of the stiffening rings 337, 338. In one embodiment, stiffening rings 337, 338 are made of a harder material than the seal elements 320, 322. Some embodiments of the stiffening rings 337, 338 are made of a metallic material with the seal elements 320, 322 made of an elastomeric material that has a hardness less than the stiffening rings 337, 338. Stiffening rings 337, 338 are shaped to fit in the respective stiffening ring pockets 416 of the seal elements 320, 322 that are mounted on the respective main bodies 344, 362 of the sealing heads 304, 306. In some embodiments, the stiffening rings 337, 338 may be a separate ring or incorporated into the nose rings 324, 326 or retaining rings 327, 328. The shape of the cross-section of the stiffening rings 337, 338 may be circular, rectangular, or any other shape which conforms to the pocket shape of the stiffening ring pockets 416 in the seal elements 120, 122.

In other embodiments, the stiffening rings 337, 338 may be flexible and each of the stiffening rings 337, 338 may be bonded to one of the seal elements 320, 322. In these embodiments, the stiffening rings 337, 338 may either be a layered fabric, a thin hard plastic, an elastomer, or metal. The flexible stiffening rings 337, 338 is configured to be flexible to flex into a stretched shape of the assembled configuration where the stiffening rings are disposed in the stiffening ring pockets 416 and mounted on the main bodies 344, 362. The flexible stiffening rings 337, 338 may be flexed into the stretched shape without permanently deforming, but stiff enough to prevent the seal elements 320, 322 from bunching during installation of the pipe isolation device 300 into a pipe as the pipe isolation device 300 moves from the fully retracted position to the fully set position.

Seal elements 320, 322 as assembled on the sealing heads 304, 306 have advantages. The geometry of the seal elements 320, 322 makes manufacturing and inspection more economical. For example, the seal cross-section maintains the same shape around the circumference of the seal elements 320, 322. This simplifies analysis of the seal elements 320, 322, and produces a more reliably uniform seal.

The ring shape of the seal elements 320, 322 allows for a singular main piece for the main bodies 344, 362 of the seal heads 304, 306 rather than a bolted-together seal head. This reduces leak paths and reduces the high-stress points in the seal head mechanism. It removes any high-stressed fasteners which would be potential failure points. The perpendicular gland on each of the main bodies 344, 362 is easier to machine into the main bodies 344, 362 of the seal heads 304, 306. Variable, acute to obtuse shaped glands are more complicated to machine.

Figure 42:
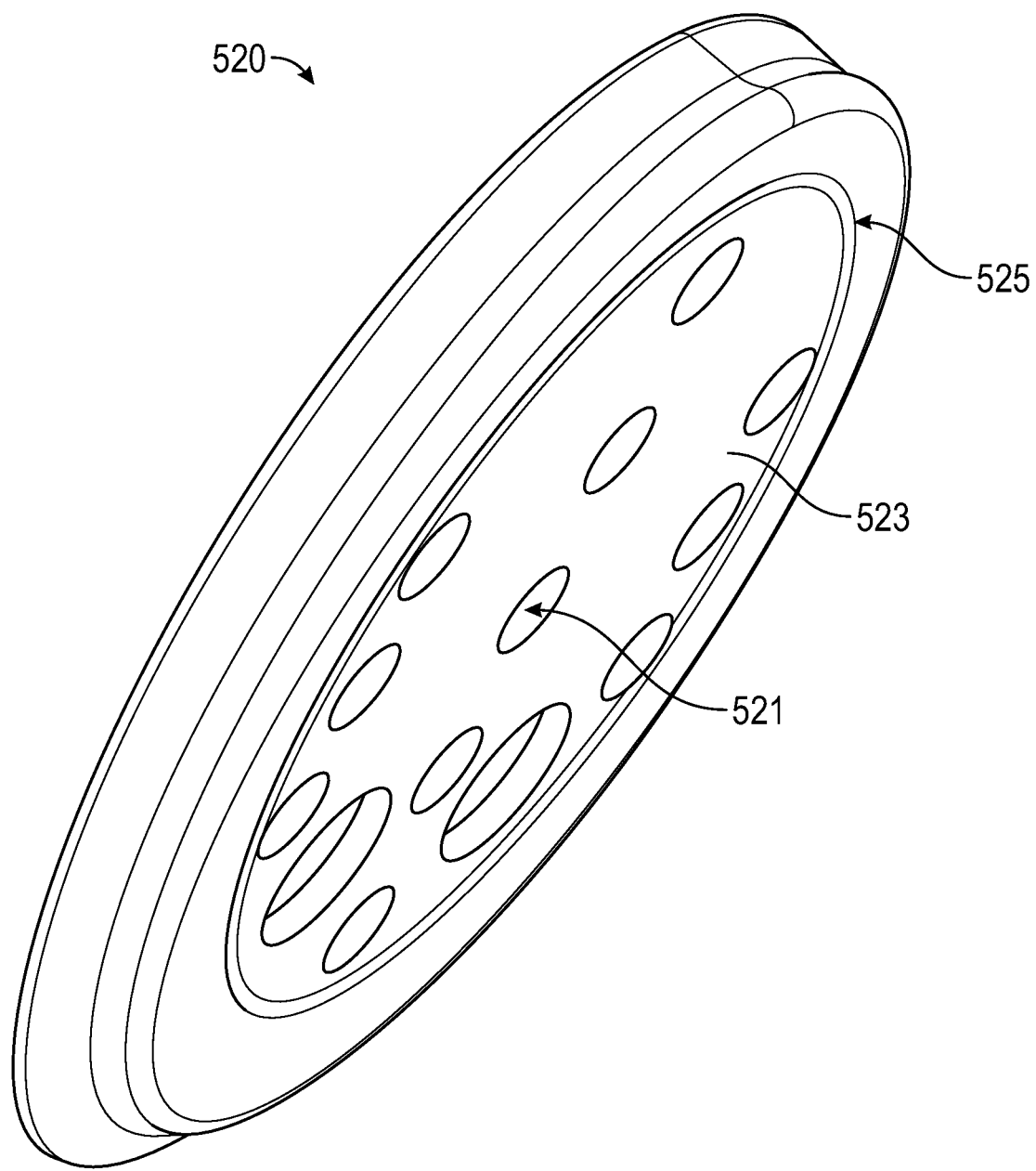
FIG. 42 is a perspective view of the first seal element in accordance with embodiments of the present disclosure.
Figure 43:
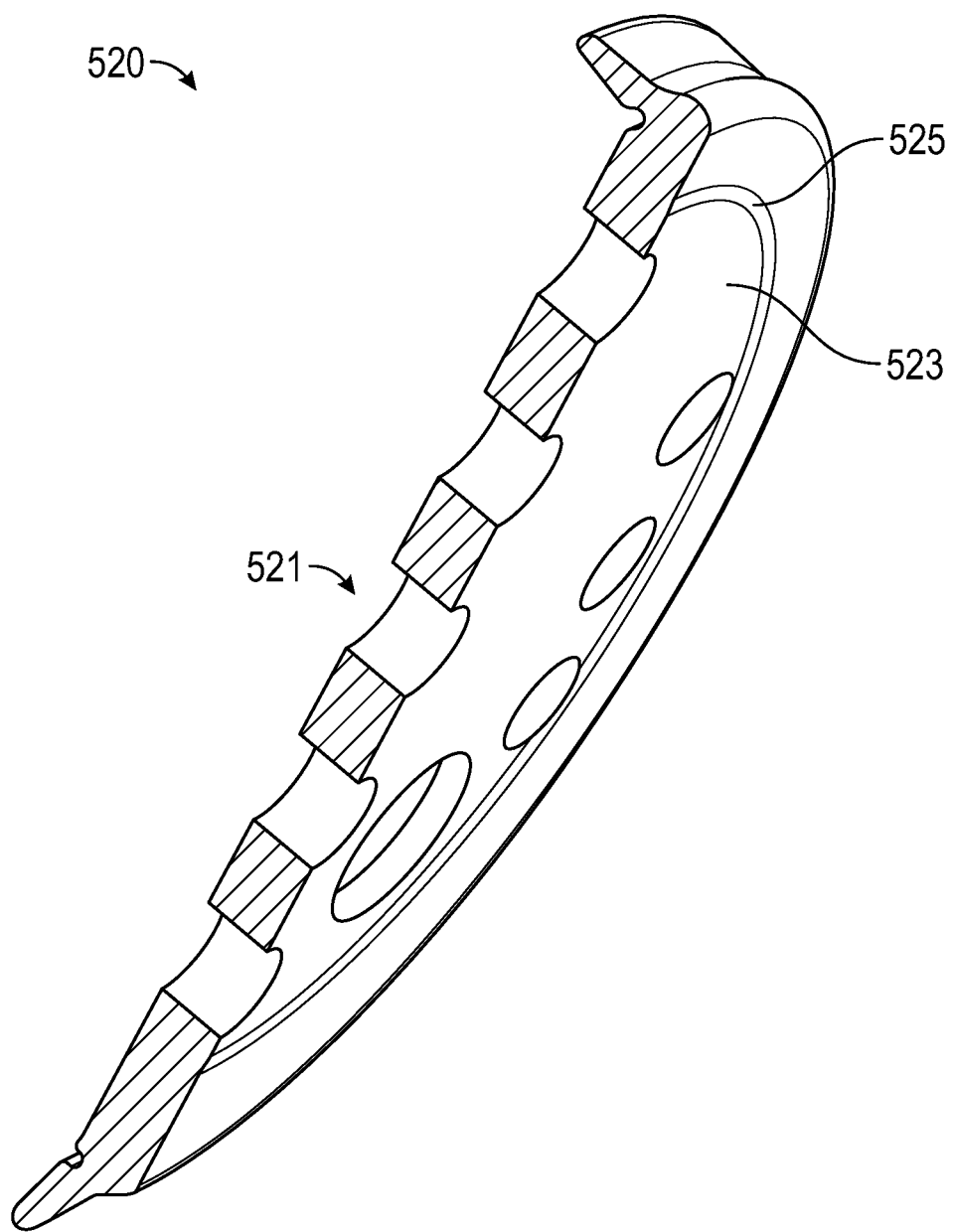
FIG. 43 is a perspective, sectioned view of the first seal element in accordance with embodiments of the present disclosure.

Referring to FIGS. 42-43, an embodiment of a third seal element is shown, and is identified with reference number 520. Third sealing element 520 will be described for being assembled on the first sealing head 304 but may be assembled on the second sealing head 306 in a similar manner. Third seal element 520 may be manufactured in an installed configuration having an elliptical shape. Third seal element 520 may be a full disc seal, as shown in FIGS. 42-43. In some embodiments, the third seal element 520 may have a ring shape. The front and back of the third seal element 520 are both flat. A cross-section of the third seal element 520, as shown in FIG. 43 may be approximated to form a variable trapezoidal shape from acute to obtuse around the profile of the third seal element 520, due to the angle of the seal gland in order to fit on the first main body 344 of the first sealing head 304. The OD of the third seal head 520 is variable around the circumference to maintain the proper interference with the pipe ID.

For the third seal element 520 having a ring-style shape, the third seal element 520 may be assembled on the first main body 344 in a manner like the first seal element 320. For example, the third seal element 520 sits between a first nose ring 324 (on the back side of the third seal element 520) and a first retainer ring 327 (on the front side of the third seal element 520). The front side of the third seal element 520 is the pressurized side, while the back side of the third seal element 520 is the non-pressurized side. The ID of the third seal element 520 sits on the cylindrical surface of the first main body 344 of the first sealing head 304. The OD of the third seal element provides an interference fit in the pipe which forms a seal. A second seal is formed by an ID sealing feature. This feature provides an interference fit and may be located on the front, back, or ID of the third seal element 520, and may seal against the first main body 344, the first nose ring 324, or the first retaining ring 327. A first stiffening ring 337 or other stiffening options discussed with respect to disclosed embodiments may be applied and used with the third seal element 520.

For the third seal element 520 having the full-disc configuration shown in FIGS. 42-43, the third seal element 520 is squeezed between two plates which are secured with one or more fasteners to the first sealing head 304. For example, on one end of the first sealing head 304. To prevent leakage through the fasteners, the third seal element 520 may include seal rings around each fastener or a circumferential seal ring 525 which encompasses all the fasteners. Fastener holes 521 extend through the disc body 523 of the third seal element 520, as shown in FIGS. 42-43.

Third seal element 520 has advantages. Third seal 520 helps prevent failure due to "bunching" when being installed due to the inherent locking nature of the parallelogram trapezoidal shaped gland. A third seal element 520 having a full-disc style seal can be held in place very robustly. Bunching issues are eliminated. Since the third seal element does not need to be stretched, installation on the first sealing head 304 is simplified.

Embodiments of the seal heads disclosed herein provides advantages over other seal heads that use cylindrically-shaped seal heads which are either inserted through a pipe branch on an angle and rotated into position, or smaller than pipe ID seals which need to be actuated. The geometry required for the seal heads for use in the sliding engagement mechanism of the pipe isolation device disclosed herein benefit from the seal assemblies disclosed herein. Embodiments of the seal heads disclosed employ cylindrical seal heads that have a slanted shape to allow for clearance to be deployed through a circular branch opening of a pipe that is smaller than the OD of the pipe to be sealed. Embodiments of the seal elements can then be deployed axially down the pipeline without the need for rotating the sealing heads with the seal elements into position.

Rings forming the seal assemblies may be changed along with the seal elements with different OD variations to allow the seal head to adapt to a range of pipe wall thicknesses. The rings are sized to provide enough clearance to prevent interference between the pipe ID and ring OD, while also reducing the radial gap between the pipe ID and ring OD to an amount that is manageable with aid from an anti-extrusion device. Extrusion resistance may be provided by any of the following anti-extrusion devices: a garter spring, fabric reinforcement, shielded backing, or a flexible ring. The movement of the seal elements through the pipe is axial, so having a reduced diameter on the backside of the seal element is advantageous. This protects the back side of the seal element while also minimizes the initial seal interference with the pipe to just the flare of the front side of the seal element. The minimized interference reduces the installation force required. When the seal element having a garter spring is pressurized, the garter spring can expand until it contacts the ID of the pipe.

Embodiments of the pipe isolation device may be configured to translate the right angle at a lateral access opening and to provide a compact tool by providing sliding engagements to withstand the challenging environments of pipelines, including high pressures, high temperatures, and different types of fluids. Depending on the application, the pipe isolation device of the present disclosure may be modified by adding additional sealing heads to become a triple, or more, block and bleed apparatus.

The sealing feature for the seal head side of the seal on the back of the seal has advantages. The bolting force from the retaining ring forms an initial seal. As the line pressure increases, the contact pressure also increases between this sealing feature and the seal head.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A pipe isolation device, comprising:
   a control bar head;
   a first sealing head having a first sliding engagement, the first sliding engagement permitting the first sealing head to slide relative to the control bar head along a first fixed path and to traverse a right angle to gain access to an interior space of a pipe;
   a second sealing head having a second sliding engagement, the second sliding engagement permitting the second sealing head to slide relative to the first sealing head along a second fixed path and to traverse the right angle to gain access to an interior space of the pipe;
   a first seal element disposed on the first sealing head, wherein the first seal element has a first axially-offset configuration such that a first top section of the first seal element is axially-offset from a first bottom section of the first seal element when the first sealing head is in a first set and sealed position; and
   a second seal element disposed on the second sealing head, wherein the second seal element has a second axially-offset configuration such that a second top section of the second seal element is axially-offset from a second bottom section of the second seal element when the second sealing head is in a second set and sealed position.

2. The pipe isolation device of claim 1, wherein the first sliding engagement is configured to permit the first sealing head to slide along the first fixed path from a first retracted position to the first set and sealed position to traverse the right angle, wherein the second sliding engagement is configured to permit the second sealing head to slide along the second fixed path from a second retracted position to the second set and sealed position to traverse the right angle, and wherein the first seal element and the second seal element have elliptical shapes.

3. The pipe isolation device of claim 2, wherein the first sliding engagement comprises a first guide track and a first guide member slidably connected, and wherein the second sliding engagement comprises a second guide track and a second guide member slidably connected.

4. The pipe isolation device of claim 3, wherein the first sealing head in the first retracted position and the second sealing head in the second retracted position are in a fully retracted position where the first sealing head and the second sealing head have an in-line orientation with the control bar head, and wherein the first sealing head in the first set and sealed position and the second sealing head in the second set and sealed position are in a fully set position where the first sealing head and the second sealing head have an aligned orientation with one another.

5. The pipe isolation device of claim 3, wherein a horizontal axis extends through the first sealing head and the second sealing head in the fully set position, and wherein the first guide track and the second guide track are at an acute angle with the horizontal axis when the first sealing head and the second sealing head are in the fully set position.

6. The pipe isolation device of claim 2, further comprising a first locking mechanism having a first locked state configured to lock the first sealing head in the first retracted position and having a first unlocked state permitting the first sealing head to slide from the first retracted position to the first set and sealed position, and further comprising a second locking mechanism having a second locked state configured to lock the second sealing head in the second retracted position and having a second unlocked state permitting the second sealing head to slide from the second retracted position to the second set and sealed position.

7. The pipe isolation device of claim 6, wherein the second locking mechanism is biased in the second locked state and releases from the second locked state to the second unlocked state in response to a first applied force meeting a first force threshold, and wherein the first locking mechanism is biased in the first locked state and releases from the first locked state to the first unlocked state in response to a second applied force meeting a second force threshold.

8. The pipe isolation device of claim 7, wherein the first force threshold is less than the second force threshold.

9. The pipe isolation device of claim 7, wherein the second locking mechanism comprises a second pin or a second latch configured to release the second locking mechanism from the second locked state to the second unlocked state, and wherein the first locking mechanism comprises a first pin or a first latch configured to release the first locking mechanism from the first locked state to the first unlocked state.

10. The pipe isolation device of claim 1, wherein the first seal element is disposed along a first outer perimeter of the first sealing head to form a first circumferential seal element, and wherein the second seal element is disposed along a second outer perimeter of the second sealing head to form a second circumferential seal element.

11. The pipe isolation device of claim 1, wherein the first seal element forms part of a first seal assembly comprising a first retaining ring, a first stiffening ring, and a first nose ring, and wherein one or more fasteners extend through fastener openings in the first retaining ring and into mating attachment openings in the first sealing head to secure the first seal assembly in an assembled position.

12. A method of isolating a pipe, the method comprising:
   locking a first sealing head and a second sealing head in a fully retracted position with a locking mechanism in a locked state;
   conveying the first sealing head and the second sealing head in the fully retracted position and with the locking mechanism in the locked state through a lateral access opening in the pipe, the first sealing head slidably connected to a control bar head and the second sealing head slidably connected to the first sealing head;
   releasing the locking mechanism from the locked state to an unlocked state in response to an applied force as the control bar head is conveyed through the lateral access opening so as to permit the first sealing head and the second sealing head to move to a fully set position; and
   sliding the first sealing head along a first sliding engagement and sliding the second sealing head along a second sliding engagement to the fully set position as the control bar head continues its travel through the lateral access opening;
   wherein a first seal element is disposed on the first sealing head and the first seal element has a first axially-offset configuration such that a first top section of the first seal element is axially-offset from a first bottom section of the first seal element when the first sealing head is in the fully set position; and
   wherein a second seal element is disposed on the second sealing head and the second seal element has a second axially-offset configuration such that a second top section of the second seal element is axially-offset from a second bottom section of the second seal element when the second sealing head is in the fully set position;

wherein the first sealing head and the second sealing head each form a seal in the pipe in the fully set position via the first seal element and second seal element respectively.

13. The method of claim 12, wherein locking the first sealing head and the second sealing head in the fully retracted position further comprises locking the first sealing head in a first retracted position in a first locked state with a first locking mechanism and locking the second sealing head in a second retracted position in a second locked state with a second locking mechanism, and wherein the first seal element and the second seal element have elliptical shapes.

14. The method of claim 13, wherein releasing the locking mechanism from the locked state to the unlocked state further comprises releasing the second locking mechanism from the second locked state to a second unlocked state in response to a first applied force meeting a first force threshold, and releasing the first locking mechanism from the first locked state to a first unlocked state in response to a second applied force meeting a second force threshold.

15. The method of claim 14, wherein the second sealing head engages an internal wall of the pipe as the second sealing head is conveyed through the lateral access opening so that the first applied force is applied to the second locking mechanism, and wherein the first sealing head engages the internal wall of the pipe as the first sealing head is conveyed through the lateral access opening so that the second applied force is applied to the first locking mechanism.

16. The method of claim 15, wherein the second sealing head is released to the second unlocked state before the first sealing head is released to the first unlocked state, and wherein the first force threshold is less than the second force threshold.

17. The method of claim 12, wherein the first sealing head slides relative to the control bar head along a first fixed path and traverses a right angle to gain access to an interior space of the pipe, and wherein the second sealing head slides relative to the first sealing head along a second fixed path and traverses the right angle to gain access to the interior space of the pipe.

18. The method of claim 17, wherein the first sliding engagement comprises a first guide track and a first guide member slidably connected, and wherein the second sliding engagement comprises a second guide track and a second guide member slidably connected.

19. The method of claim 17, wherein the pipe has a pipe fitting with a fitting sleeve fitted around the lateral access opening and extending to a first sleeve end and a second sleeve end spaced from the lateral access opening, and wherein the first seal element and the second seal element engage an internal wall of the pipe and are disposed between the first sleeve end and the second sleeve end.

20. The method of claim 12, wherein the first seal element forms part of a first seal assembly comprising a first retaining ring, a first stiffening ring, and a first nose ring, and wherein one or more fasteners extend through fastener openings in the first retaining ring and into mating attachment openings in the first sealing head to secure the first seal assembly in an assembled position.

21. A pipe isolation device, comprising:
a control bar head;
a first sealing head and a second sealing head positionable between a fully retracted position and a fully set position, and wherein the first sealing head and the second sealing head have an in-line orientation with the control bar head in the fully retracted position and have an in-line orientation with one another in a direction transverse to the control bar head when in the fully set position;
a first sliding engagement slidably connecting the first sealing head to the control bar head;
a second sliding engagement slidably connecting the second sealing head to the first sealing head;
wherein the first sliding engagement and the second sliding engagement are configured to slide the first sealing head and the second sealing head from the fully retracted position to the fully set position during a linear travel of the control bar head;
wherein a first seal element is disposed on the first sealing head and the first seal element has a first axially-offset configuration such that a first top section of the first seal element is axially-offset from a first bottom section of the first seal element when the first sealing head is in the fully set position; and
wherein a second seal element is disposed on the second sealing head and the second seal element has a second axially-offset configuration such that a second top section of the second seal element is axially-offset from a second bottom section of the second seal element when the second sealing head is in the fully set position.

22. The pipe isolation device of claim 12, further comprising a locking mechanism configured to lock at least one of the first sealing head and the second sealing head in the fully retracted position and to unlock at least one of the first sealing head and the second sealing head in response to an applied force, and wherein the first seal element has an elliptical shape.

23. The pipe isolation device of claim 21, wherein the first seal element forms part of a first seal assembly comprising a first retaining ring, a first stiffening ring, and a first nose ring, and wherein one or more fasteners extend through fastener openings in the first retaining ring and into mating attachment openings in the first sealing head to secure the first seal assembly in an assembled position.

* * * * *